(12) United States Patent  
Solomon

(10) Patent No.: US 8,577,759 B2  
(45) Date of Patent: Nov. 5, 2013

(54) INVENTORY CONTROL SYSTEM PROCESS

(75) Inventor: Stanley B. Solomon, Rolling Hills Estates, CA (US)

(73) Assignee: Worthwhile Products, Rolling Hills Estates, CA (US)

(*) Notice: Subject to any disclaimer, the term of this patent is extended or adjusted under 35 U.S.C. 154(b) by 0 days.

(21) Appl. No.: 13/550,521

(22) Filed: Jul. 16, 2012

(65) Prior Publication Data

US 2012/0271742 A1  Oct. 25, 2012

Related U.S. Application Data

(63) Continuation of application No. 13/039,215, filed on Mar. 2, 2011, which is a continuation-in-part of application No. 12/718,791, filed on Mar. 5, 2010, which is a continuation-in-part of application No. 11/854,246, filed on Sep. 12, 2007, now Pat. No. 7,850,411, and a continuation-in-part of application No. 11/854,232, filed on Sep. 12, 2007, now Pat. No. 7,837,424, said application No. 11/854,246 is a continuation-in-part of application No. 11/308,791, filed on May 4, 2006, now Pat. No. 7,689,480, said application No. 11/854,232 is a continuation-in-part of application No. 11/308,791, filed on May 4, 2006, now Pat. No. 7,689,480, which is a continuation-in-part of application No. 11/195,248, filed on Aug. 1, 2005, now Pat. No. 7,168,905, said application No. 13/039,215 is a continuation-in-part of application No. 12/967,513, filed on Dec. 14, 2010, which is a continuation-in-part of application No. 11/854,246, filed on Sep. 12, 2007, now Pat. No. 7,850,411, which is a continuation-in-part of application No. 11/308,791, filed on May 4, 2006, now Pat. No. 7,689,480, which is a continuation-in-part of application No. 11/195,248, filed on Aug. 1, 2005, now Pat. No. 7,168,905.

(51) Int. Cl.  
*G07F 19/00* (2006.01)  
*G06Q 10/00* (2012.01)

(52) U.S. Cl.  
USPC .............................................. 705/30; 705/28

(58) Field of Classification Search  
USPC ......................................................... 705/30  
See application file for complete search history.

(56) References Cited

U.S. PATENT DOCUMENTS

| | | |
|---|---|---|
| 1,965,161 A | 7/1934 | Sheflin |
| 2,089,341 A | 8/1937 | Cocks |
| 2,451,120 A | 10/1948 | Rossetter |
| 2,617,700 A | 11/1952 | Christie et al. |

(Continued)

FOREIGN PATENT DOCUMENTS

| WO | 2008061253 A2 | 5/2008 |
|---|---|---|
| WO | 2009005290 A2 | 1/2009 |

*Primary Examiner* — Garcia Ade  
(74) *Attorney, Agent, or Firm* — Lowry Blixseth LLP; Scott M. Lowry

(57) ABSTRACT

The inventory control system process includes storing product information in a database. Location information is also accepted and stored in the database in association with the product information. The system receives a command associated with the database and analyzes the command for an instruction and one or more keywords. Next, the database is searched for one or more products associated with the one or more keywords. A list of products related to the one or more keywords is then displayed. The system then accesses, modifies, retrieves, or deletes database information in response to the instruction.

20 Claims, 58 Drawing Sheets

(56) References Cited

U.S. PATENT DOCUMENTS

| | | |
|---|---|---|
| 2,718,317 A | 9/1955 | Strauss et al. |
| 2,762,489 A | 9/1956 | O'Sullivan |
| 3,763,991 A | 10/1973 | Batik |
| 3,860,130 A | 1/1975 | Frangos |
| 3,987,915 A | 10/1976 | Conner |
| 4,191,435 A | 3/1980 | Lehman |
| 4,217,070 A | 8/1980 | Groger |
| 4,422,554 A | 12/1983 | Lichti |
| 4,615,430 A | 10/1986 | Satoh |
| 4,772,176 A | 9/1988 | Montgomery |
| 4,869,634 A | 9/1989 | Carter |
| 5,090,863 A | 2/1992 | Lichti et al. |
| RE34,016 E | 8/1992 | Hankes |
| 5,176,484 A | 1/1993 | Kuperman et al. |
| 5,199,840 A | 4/1993 | Castaldi et al. |
| 5,222,855 A | 6/1993 | Bernard et al. |
| 5,334,822 A * | 8/1994 | Sanford .................. 705/28 |
| 6,021,394 A | 2/2000 | Takahashi |
| 6,026,378 A | 2/2000 | Onozaki |
| 6,131,399 A | 10/2000 | Hall |
| 6,148,291 A | 11/2000 | Radican |
| 6,345,948 B1 | 2/2002 | Irish |
| 6,377,296 B1 | 4/2002 | Zlatsin et al. |
| 6,411,916 B1 | 6/2002 | Pellerin |
| 6,519,578 B1 | 2/2003 | Reddy |
| 6,737,600 B2 | 5/2004 | Takizawa |
| 6,792,935 B2 | 9/2004 | Matusaitis et al. |
| 6,842,665 B2 | 1/2005 | Karlen |
| 6,850,252 B1 | 2/2005 | Hoffberg |
| 6,870,464 B2 | 3/2005 | Okamura |
| 6,923,612 B2 | 8/2005 | Hansl |
| 6,927,692 B1 | 8/2005 | Petrinovic |
| 6,996,538 B2 | 2/2006 | Lucas |
| 7,043,426 B2 | 5/2006 | Roberge et al. |
| 7,083,090 B2 * | 8/2006 | Zuili ..................... 235/383 |
| 7,123,988 B2 | 10/2006 | Russell et al. |
| 7,128,521 B2 | 10/2006 | Hansl |
| 7,136,465 B2 | 11/2006 | Glynn et al. |
| 7,231,380 B1 | 6/2007 | Pienkos |
| 7,287,001 B1 | 10/2007 | Falls et al. |
| 7,292,678 B2 | 11/2007 | Glynn et al. |
| 7,307,245 B2 | 12/2007 | Faries et al. |
| 7,321,296 B2 | 1/2008 | Engellenner |
| 7,378,969 B2 | 5/2008 | Chan et al. |
| 7,516,890 B1 | 4/2009 | Spremo et al. |
| 7,552,333 B2 * | 6/2009 | Wheeler et al. ........ 713/176 |
| 7,580,699 B1 | 8/2009 | Shaw et al. |
| 7,580,866 B2 | 8/2009 | Church |
| RE41,080 E | 1/2010 | Mahoney |
| 7,791,471 B2 | 9/2010 | Glynn et al. |
| 7,797,204 B2 * | 9/2010 | Balent ..................... 705/28 |
| 7,802,724 B1 * | 9/2010 | Nohr ..................... 235/384 |
| 7,805,383 B2 | 9/2010 | Veit et al. |
| 7,827,200 B2 | 11/2010 | Rowe et al. |
| 7,844,505 B1 | 11/2010 | Arneson et al. |
| 7,860,917 B2 | 12/2010 | Moriwaki |
| 7,930,556 B2 | 4/2011 | Shih |
| 7,974,714 B2 | 7/2011 | Hoffberg |
| 2003/0009394 A1 | 1/2003 | Malkin et al. |
| 2003/0036985 A1 | 2/2003 | Soderholm |
| 2004/0072575 A1 | 4/2004 | Young et al. |
| 2004/0103034 A1 | 5/2004 | Reade et al. |
| 2005/0065950 A1 | 3/2005 | Chaganti et al. |
| 2005/0137943 A1 | 6/2005 | Holzman |
| 2006/0047546 A1 | 3/2006 | Taylor et al. |
| 2006/0190340 A1 | 8/2006 | Mysokowski |
| 2007/0112649 A1 | 5/2007 | Schlabach |
| 2007/0124077 A1 | 5/2007 | Hedlund |
| 2007/0124216 A1 | 5/2007 | Lucas |
| 2007/0136140 A1 | 6/2007 | Smith, Jr. |
| 2007/0250411 A1 | 10/2007 | Williams |
| 2008/0052201 A1 | 2/2008 | Bodin et al. |
| 2008/0077512 A1 | 3/2008 | Grewal |
| 2009/0037244 A1 | 2/2009 | Pemberton |
| 2009/0099943 A1 | 4/2009 | Bodin et al. |
| 2009/0159684 A1 | 6/2009 | Barber et al. |
| 2010/0052853 A1 | 3/2010 | Hilton |
| 2010/0211218 A1 * | 8/2010 | Breitenbach et al. ........ 700/237 |
| 2010/0241467 A1 | 9/2010 | Saw et al. |
| 2011/0029360 A1 | 2/2011 | Gollapalli |

\* cited by examiner

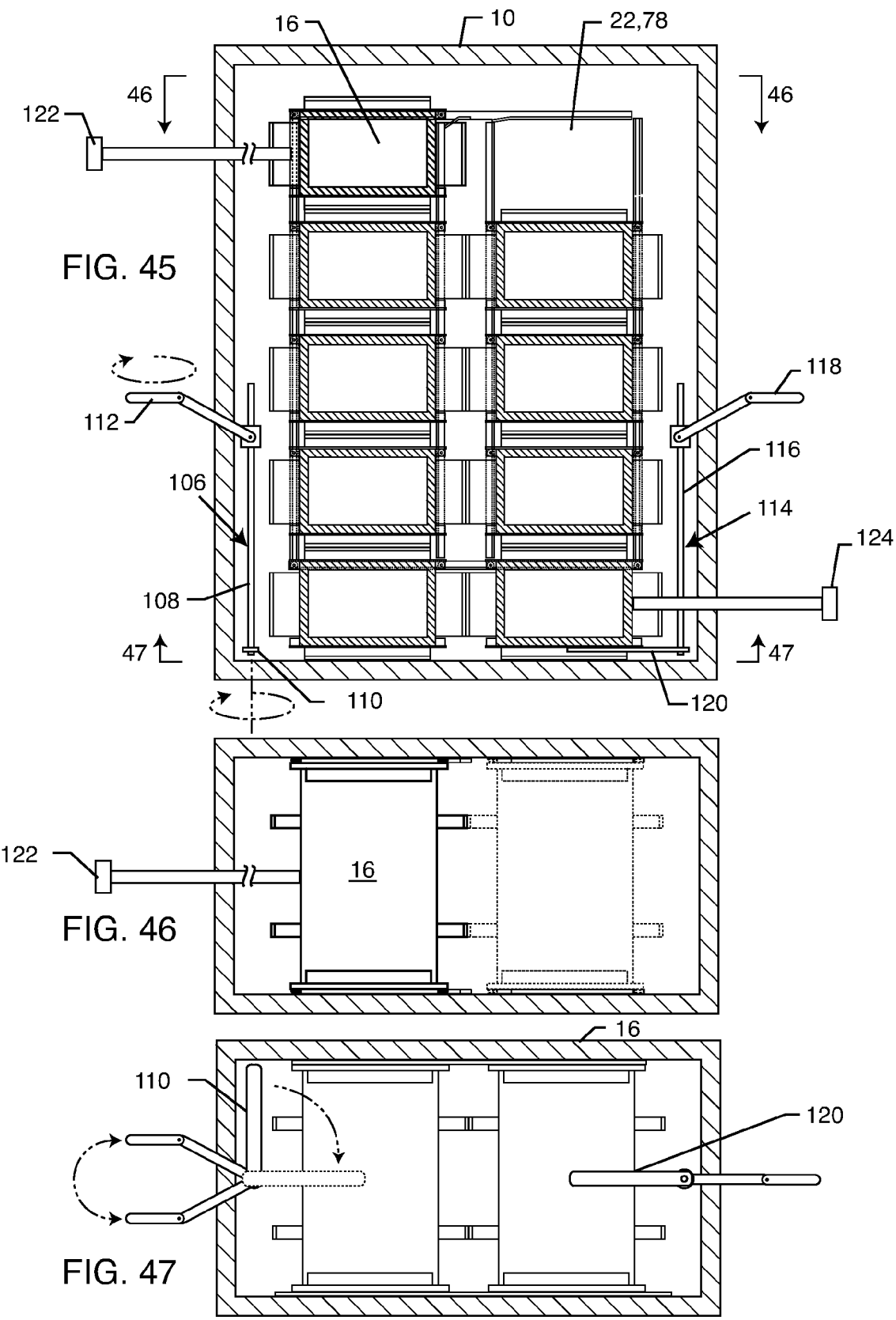

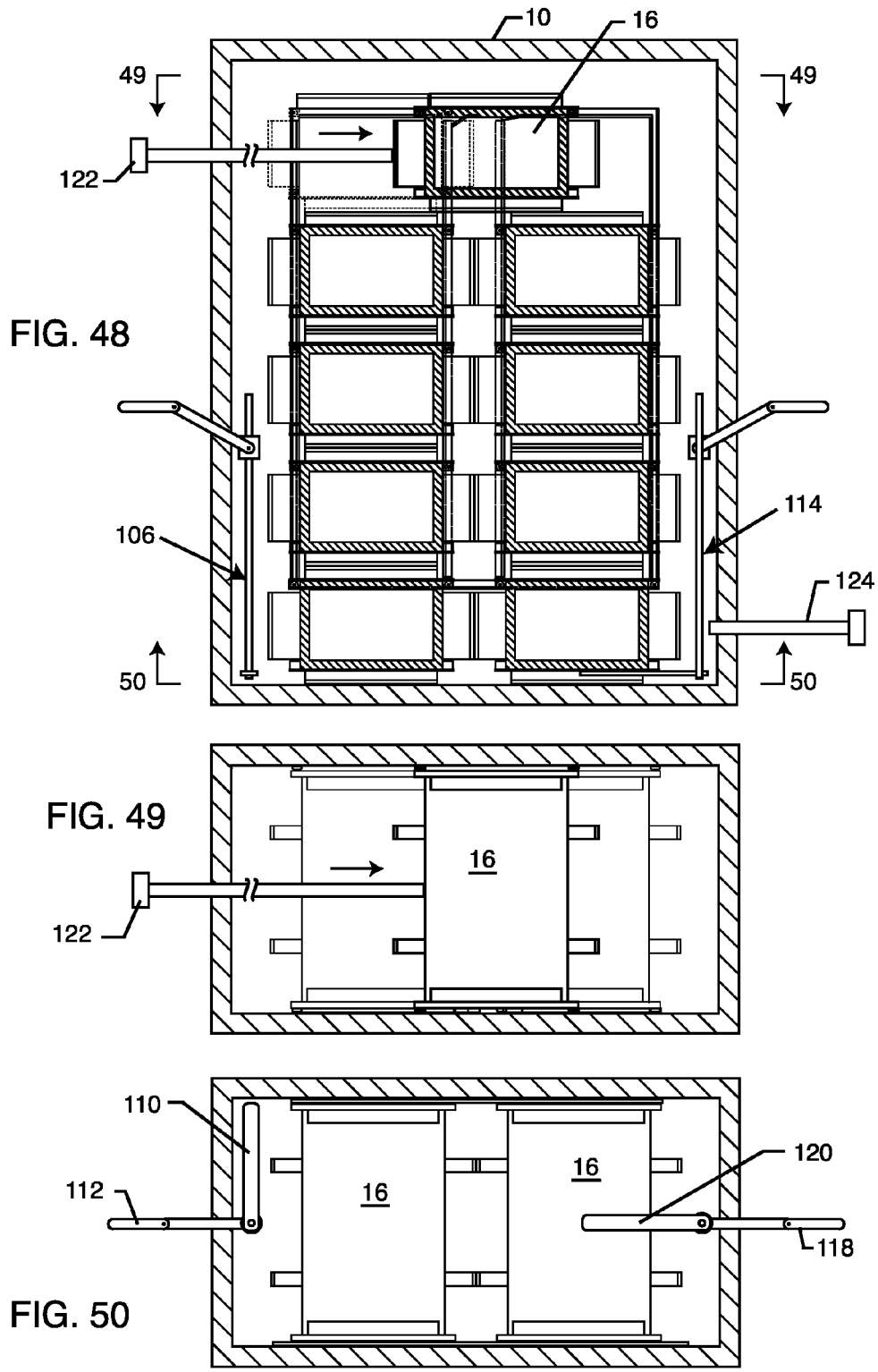

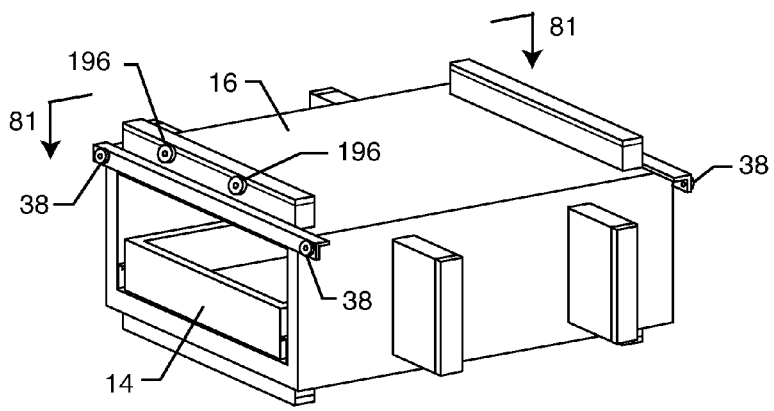
FIG. 79
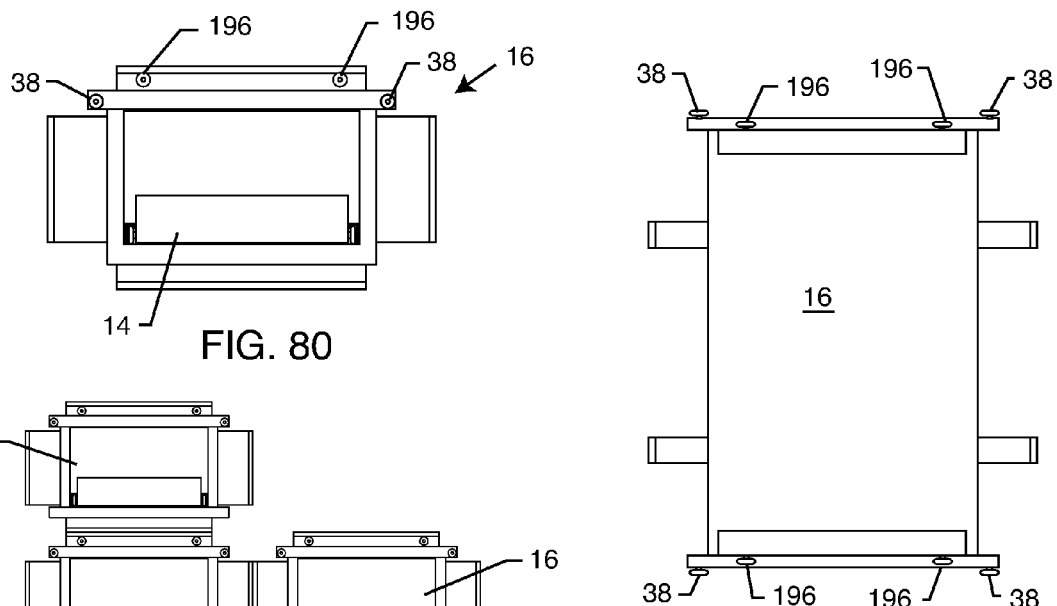
FIG. 80
FIG. 81
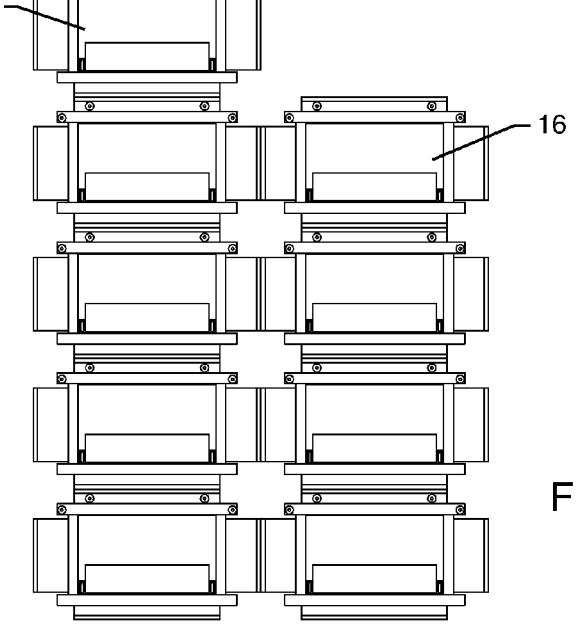
FIG. 82

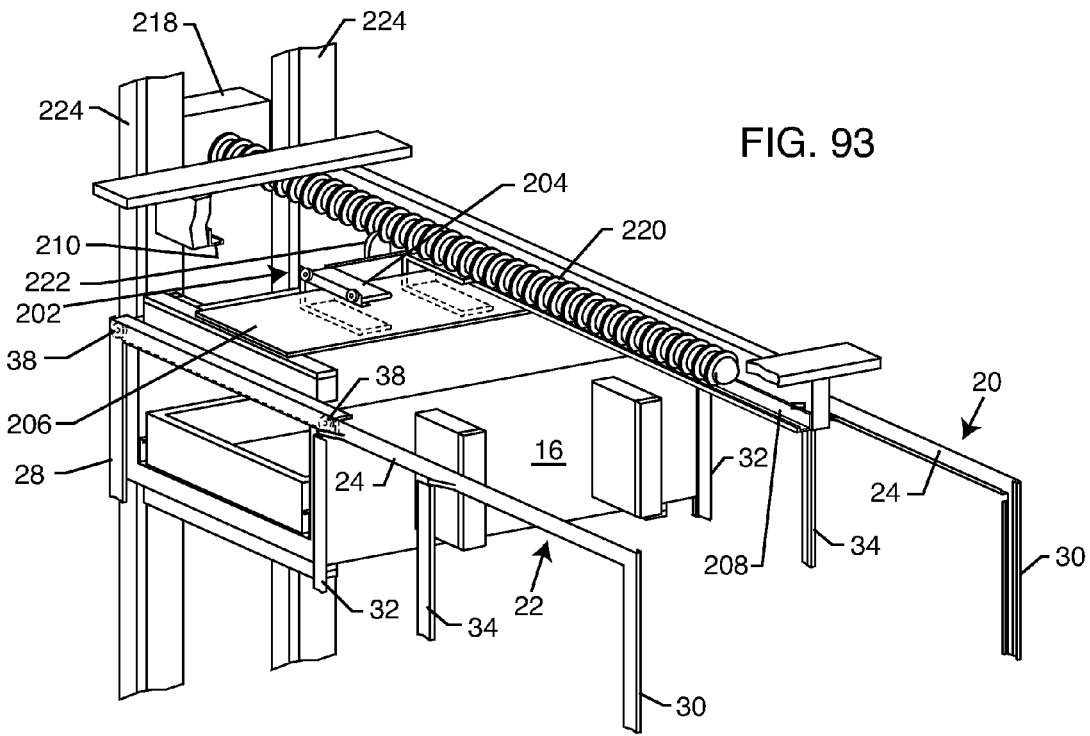
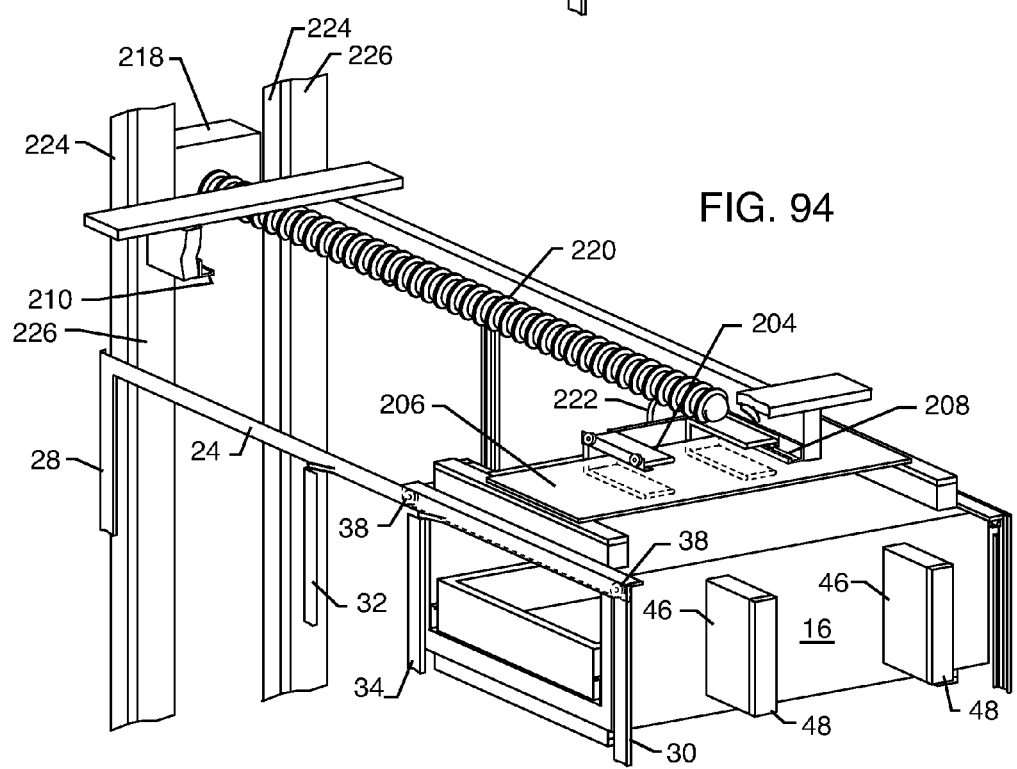

INVENTORY CONTROL SYSTEM PROCESS

BACKGROUND OF THE INVENTION

The present invention generally relates to an inventory control system process. More particularly, the present invention is directed to an inventory control system process responsive to a command for accessing, modifying, retrieving or deleting information in association with a database. Such an inventory control system process may be used with a storage and retrieval system employing a plurality of movable storage units.

In the kitchen, pots, pans, flour, condiments, boxes and cans of food, mixers and other items are usually stored in drawers and cupboards which are scattered throughout the kitchen. Pots and pans are ordinarily kept in cupboards which are dark, difficult to access and maintain. The average person is subjected to considerable exercise and rummaging through cupboards in an attempt to locate a pot or pan of the desired shape and size. Many cupboards are either below sinks or stoves, or elevated. This requires bending down to find the desired container, pot or food article or standing on a chair to retrieve these items. The storage of such kitchen equipment and food take up a large number of cubic feet of space, some of which is wasted as the items are not readily retrievable in corners and the like.

A similar problem is encountered with closets, which are used to store shoes, pants, blouses, dresses, socks and other non-clothing items. Oftentimes, shoes are stored on the floor, clothes are hung on elongated rods in the closet (which often do not provide sufficient storage space) and other items are stacked on shelves—often at a considerable height. Such an arrangement presents many of the same disadvantages of kitchen storage.

Retrieving items in such settings is particularly difficult for those individuals who are taller than usual, shorter than usual, elderly or handicapped. Much of the space in corners and near ceilings is wasted space in a household.

The present invention seeks to provide a simplified, efficient and comparatively inexpensive storage conveyor apparatus for easy installation in a kitchen, closet, or the like. The invention can utilize adjacent wasted spaces above stairways, beneath floors, above ceilings, in corners, etc.

Various conveyor systems for a wide variety of goods, including elevating conveyors, horizontal conveyors, and combination types, are known in the prior art. This so-called "dumb-waiter" for elevating various articles in homes, restaurants and the like between different floor levels has long been known. The art relating to storage and display cases provides a number of devices in which two adjacent columns of containers are disposed one behind the other with the upward movement of one column and a downward movement of the adjacent one being obtained by associating the various containers with chains or cables passing over suitable wheels or sprockets. However, such devices present various drawbacks. For example, the type of movement from one column to another characteristic of the chain or cable type mechanism is such that a considerable amount of clearance is required for the containers. Moreover, the sprockets and cables operate under considerable loads and the bearings necessary to support these loads must be mounted upon sufficient structures to adequately carry the stresses to the floor. An elaborate shifting sequence must take place as the tension members pass over the pulleys in order to avoid inverting the containers during the process.

One of the main drawbacks encountered in automatic and semi-automatic storage systems relates to the complexity of the mechanisms used. Such complexity adds to the cost of installing the system, and adversely affects the reliability of such systems. Incorporating chain and pulley systems, unique lifting mechanisms, etc., renders the systems complicated and expensive to build, prone to breakage, and increases maintenance time and costs.

Another drawback encountered with storage systems relates to an owner of an object not being able to remember or locate where that object was stored in their home. The owner of the object may know that the object is stored somewhere in their house but may not be able to remember in which room or in what storage device the object is located. An inventory control system that can identify and keep track of objects is therefore highly desirable. While some objects, such as products purchased from commercial entities (e.g., retail stores, wholesalers or the like) have identifying indicia, such as Uniform Product Code (UPC) numbers, many objects do not. For example, UPC numbers are used on can labels and tags attached to clothing. However, many objects either do not have such labels or tags in the first place or they were removed from the object after purchase.

Accordingly, there is a continuing need for an automated inventory control system that is simple, efficient and comparatively inexpensive. Such an inventory control system should be capable of storing product information in a database, accepting location information for those products, receiving a command to execute a function in relation to the products in the database, searching the database for one or more products associated with a keyword, and displaying those products in regard to executing the command. The present invention fulfills these needs and provides other related advantages.

SUMMARY OF THE INVENTION

The inventory control system process disclosed herein includes steps for storing product information in a database and accepting location information for storage in the database in association with the product information. The location information preferably includes at least two pieces of information. First, a physical location where the product is stored. This enables the user to identify the general area where the product is stored. The second being the specific product location where the product is stored at the physical location. In one embodiment, the physical location may be a GPS coordinate. This allows the user to pinpoint the location of the product at the physical location. The product information and the location information are preferably categorized in a hierarchal database accessible by a portable electronic device such as a universal remote.

The inventory control system receives a command associated with information in the database. The command may include a verbal command, a keyboard entry or a touch screen entry. Preferably, the command is spoken into a microphone integrated into the universal remote and the universal remote communicates the command to the database for processing. The command is analyzed to obtain an instruction and one or more keywords associated with the instruction. Thereafter, the database is searched for one or more products associated with the one or more keywords. The search includes simultaneously searching multiple levels of the hierarchal database to find matches to the search keyword(s). At the end of the search, a list of products related to the one or more keywords in the command is displayed. Preferably, the displaying step includes displaying a photograph of the product, a photograph of the physical location of the product, a UPC code, or a product description. Information in the database is then accessed, modified, retrieved or deleted in response to the instruction.

The universal remote may be capable of reading a barcode or communicating with an RFID chip associated with the product. Here, the database may be automatically populated with product information supplied by the barcode or the RFID chip. In one embodiment, the system retrieves database information from a third party supplier. Since the universal remote has access to a plethora of information in the database, the universal remote is preferably secured against unauthorized use with biometric data. That is, the universal remote will not operate or disclose information in the inventory control system unless the user verifies their identity by supplying a matching thumbprint scan, a retinal scan, or a facial scan.

Additionally, each tangible product input into the system may be assigned a sequential number specific to the local database. The sequential number is preferably programmed for use with a local barcode or a local RFID chip that can be automatically read by the universal remote. In this respect, it may be necessary to print a barcode that is selectively attachable to the product. Alternatively, the system may print a barcode that is selectively attachable to the physical location or the product location so the user may easily identify items stored in general storage locations. Of course, the user can customize any line item field in the database and the database preferably correlates a field number with certain product information. Moreover, the product quantity is updated as a result of modifying, retrieving, or deleting information in the database.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 45 is a diagrammatic view of the storage system, utilizing a manually operated actuating system;

FIG. 46 is a cross-sectional view taken generally along line 46-46 of FIG. 45;

FIG. 47 is a cross-sectional view taken generally along line 47-47 of FIG. 45;

FIG. 48 is a diagrammatic view of the storage system, illustrating the movement of a storage unit from one column to an adjacent second column;

FIG. 49 is a cross-sectional view taken generally along line 49-49 of FIG. 48;

FIG. 50 is a cross-sectional view taken generally along line 50-50 of FIG. 48;

FIG. 79 is a perspective view of another storage unit having two sets of wheels;

FIG. 80 is an end view of the storage unit in FIG. 79;

FIG. 81 is a top plan view of the storage unit in FIG. 79;

FIG. 82 is a diagrammatic view of a plurality of storage units arranged in two columns;

FIG. 93 is a perspective view illustrating a conveyor apparatus with a worm drive actuator;

FIG. 94 is a perspective view similar to FIG. 93, but illustrating the hook assembly and storage unit moved from one end of the track to the opposite end of the track;

DETAILED DESCRIPTION OF THE PREFERRED EMBODIMENTS

Figure 1:
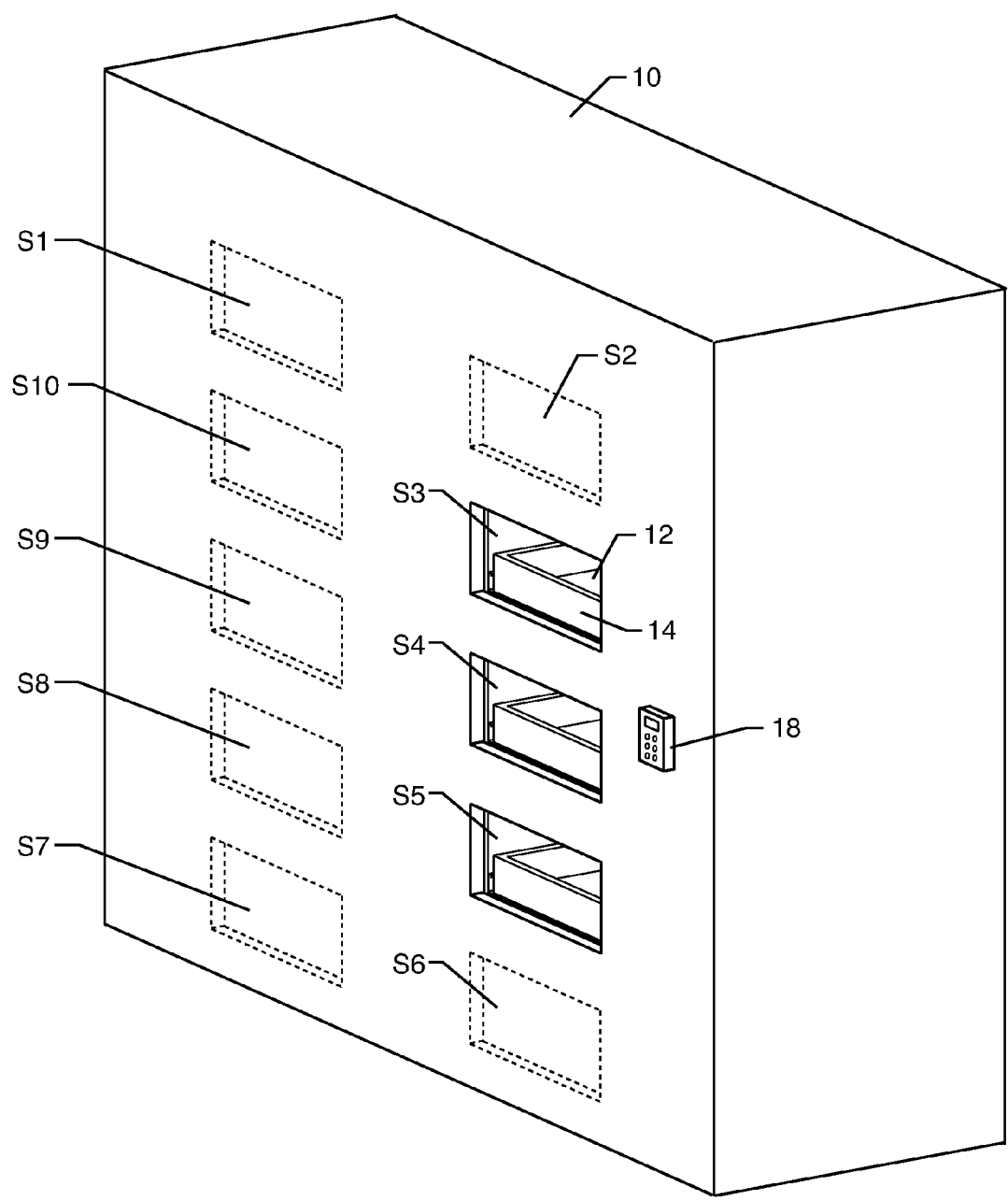
FIG. 1 is a front perspective view of a storage system.

As shown in the drawings for purposes of illustration, the present invention for an inventory control system process is shown generally with respect to FIGS. 95-110. The inventory control system process is designed to be used in association with electronic devices, and preferably portable electronic devices. In general, any electronic device usable with the inventory control system is referred to and described in more detail below as a "universal remote". The universal remote may be capable of operating different equipment, and namely interacting with the inventory control system. A person of ordinary skill in the art will readily recognize that such a universal remote may include many different types of electronic devices that include cell phones, laptops, tablet PCs, personal digital assistants (PDAs), single or multiple purpose remote controls, wristwatches, etc.

The operation of the inventory control system process analyzes commands (e.g. voice-activated commands) to execute instructions and search for keywords and input information into the database. With that information, the user may retrieve the location of tangible items stored within the database by simply speaking one or more commands. The inventory control system recognizes and responds to the command to present the user with information without the need to navigate a hierarchal menu system. The inventory control system is designed to enhance the efficient storage and retrieval of tangible items through enhanced usability and organization. Such a system may be used alone or in combination with a storage and retrieval system to maximize storage capacities virtually anywhere (e.g. in a home or business). Preferred storage and retrieval systems include the below described storage and retrieval system and the storage and retrieval system described in U.S. patent application Ser. No. 12/967,513, the contents of which are herein incorporated by reference. Furthermore, the storage and retrieval system provides easy access and retrievability for anyone, whether tall, short or handicapped (e.g. in a wheelchair). Preferably, the inventory control system and the storage and retrieval system should be user friendly such that virtually any person may easily store, locate and retrieve items.

FIG. 1 illustrates one embodiment of a storage and retrieval system that may be used with the aforementioned inventory control system. For example, FIG. 1 illustrates the storage system as an upright box structure 10 defining a housing or the like. It will be understood by those skilled in the art that the system need not necessarily be housed in such a structure 10, but instead can be built into cabinetry, walls of a home or business, etc.

One or more apertures 12 are formed in the structure 10 for access to drawers 14 which are preferably slidably mounted within a storage unit 16. As will be more fully explained herein, the storage units 16 are stacked upon one another so as to form a plurality of columns. In FIG. 1, the structure 10 has two columns of spaces S1-S10. A total of nine storage units 16 occupy the spaces S1-S10. One of the spaces S1-S10 is generally left vacant (typically in one of the corners of the columns) for operational purposes, as described in more detail below. However, it will be readily understood by those skilled in the art that the number of columns and the number of stacked storage units 16 can vary. For example, there can be as few as two columns with three storage units 16 in a total of four spaces. Alternatively, there can be a plurality of columns each with two or more storage units 16 stacked upon one another to form the columns. The fewer the columns and larger number of storage units 16, the more vertical in operation is the system. Conversely, the more columns and the fewer number of storage units 16, the more horizontal the system. Thus, although two adjacent end columns with a total of nine storage units are used for purpose of illustration and example, the invention is not intended to be limited to such.

In a particularly preferred embodiment, the system presents multiple apertures 12, such that multiple drawers 14 or storage units 16 can be accessible at any given time. The apertures or openings 12 are preferably arranged such that a relatively tall person can access the upper most position, and shorter individuals, such as children, or even those in wheelchairs or the like can access a lowermost opening to a storage unit 16.

In a preferred embodiment, a controller 18 is mounted to the structure 10 or a wall. The controller 18 may also be in the form of a wireless controller or even a controller wired to the system but placed in another room or the like. The controller 18 is used by the end user to select which storage unit 16 to be present in one of the openings 12 to be accessed. The controller 18 includes or communicates with electronic control circuitry for controlling the movement of the storage units 16, as will be more fully described herein. In this manner, the end user can select which storage unit 16 is to be moved into which desired opening 12 by simply entering the commands into the controller 18 such as by using a keypad or the like. Use of a wireless controller would allow one in the kitchen to point the controller 18 to the system and select a given storage unit 16, which might contain a given pot, ingredient, can of food, etc. Similarly, the controller 18 can be placed in another room, such as in a bedroom, so that an individual can select a given storage unit 16, which may contain cold cereal or other breakfast item, to be moved into a given opening 12 while the individual showers or traverses the distance between the bedroom and the kitchen. Preferably, the system rotates the storage unit 16 in a relatively rapid manner so that a long wait is not necessary, even if the command is given at the structure 10 itself.

Figure 2:
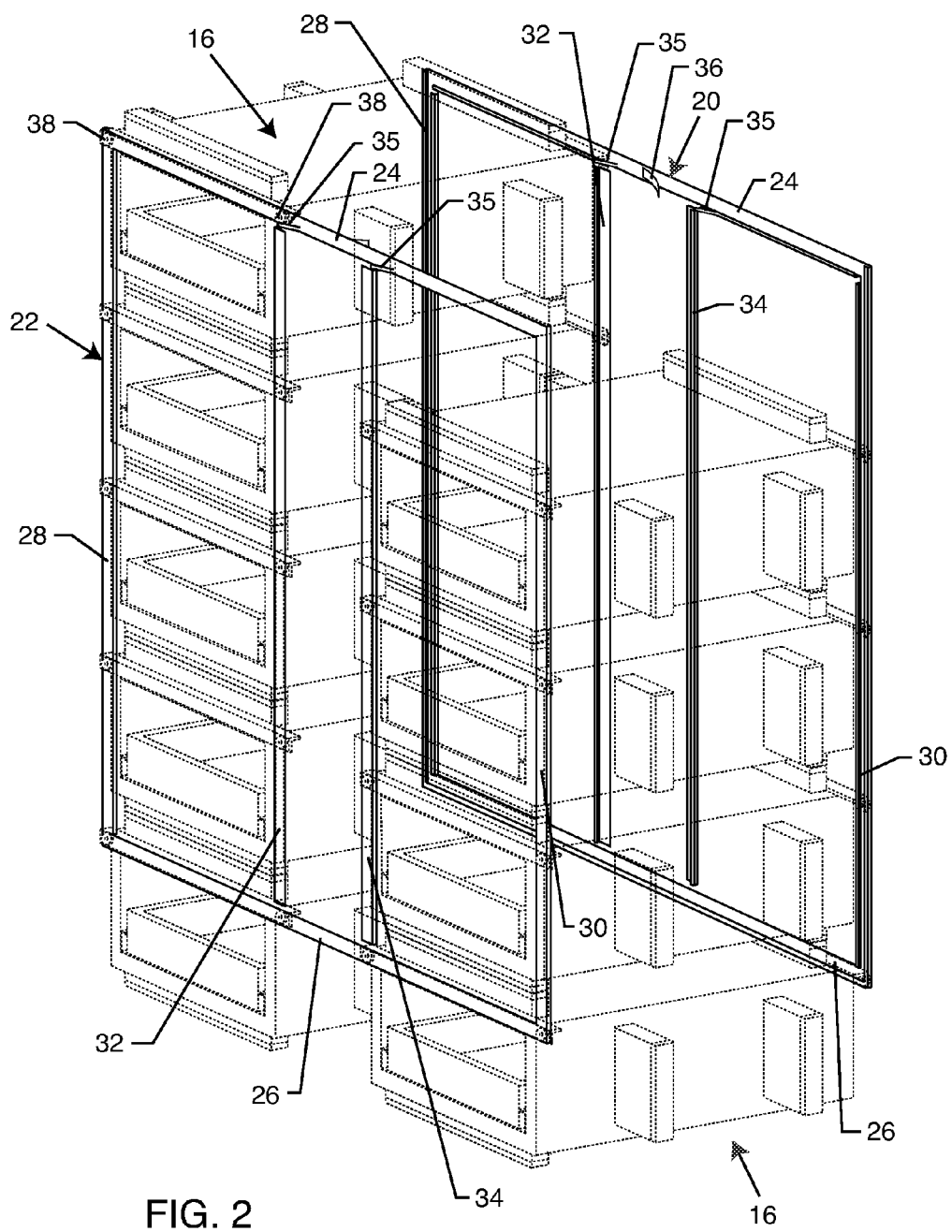
FIG. 2 is a perspective view of a single track system showing a plurality of stacked storage units operably connected thereto, in phantom.
Figure 3:
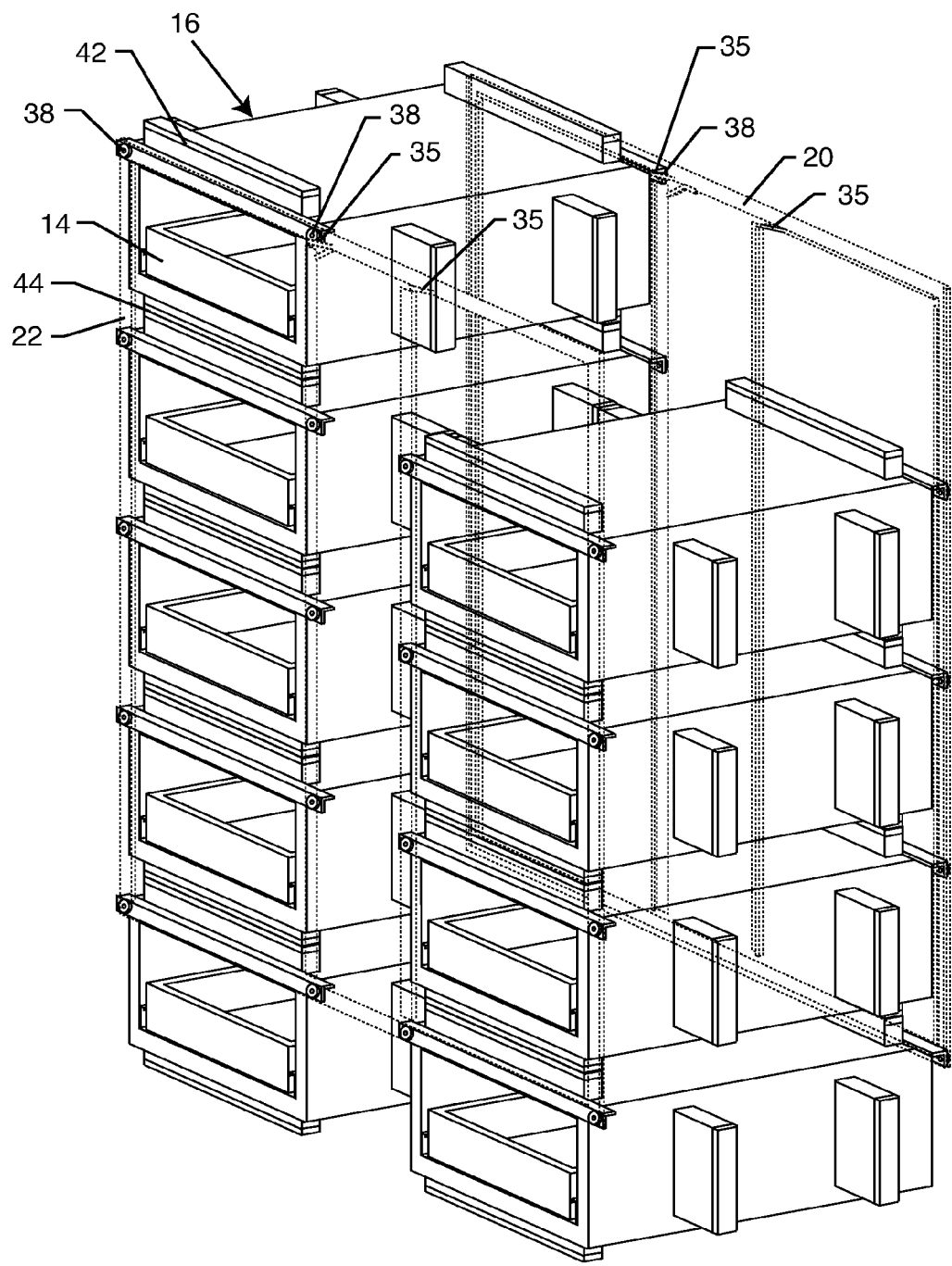
FIG. 3 is a perspective view of the stacked storage units, with the single track illustrated in phantom.
Figure 4:
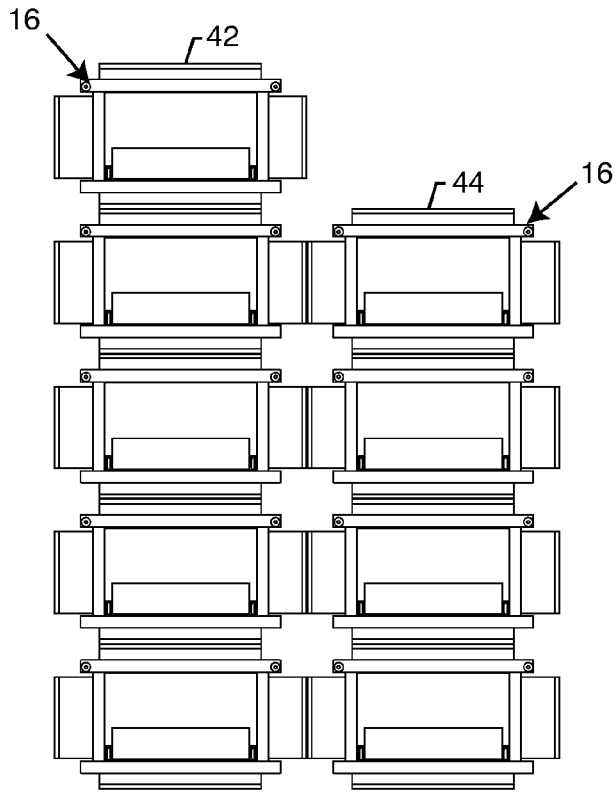
FIG. 4 is a front elevational view of the stacked storage units.
Figure 5:
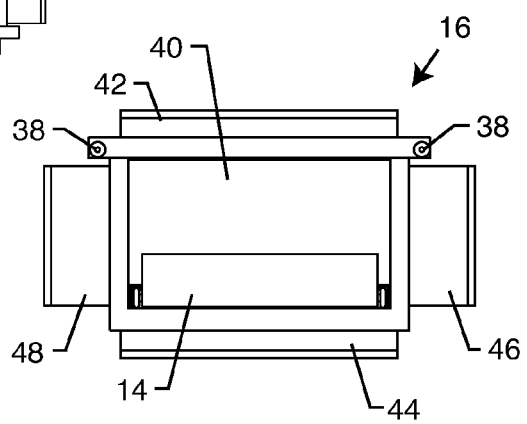
FIG. 5 is a front elevational view of a single storage unit.
Figure 6:
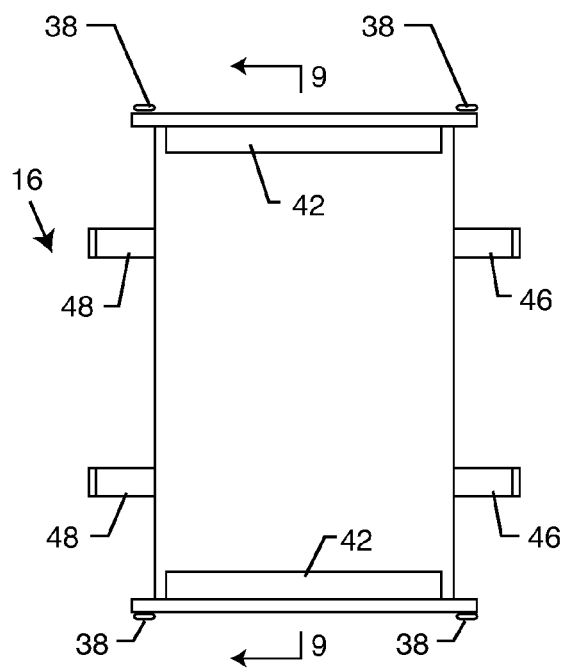
FIG. 6 is a top plan view of the storage unit of FIG. 5.
Figure 7:
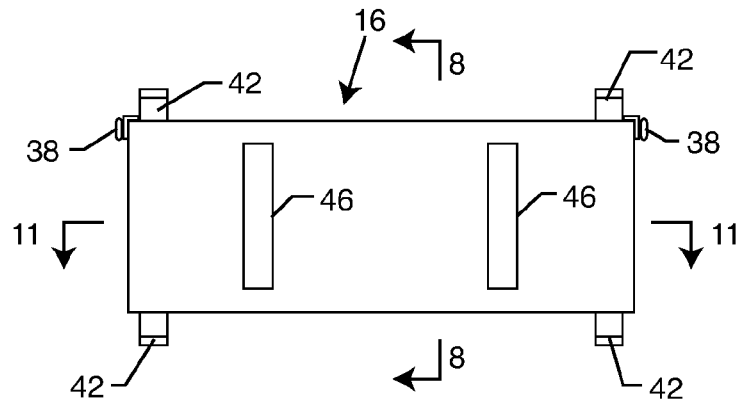
FIG. 7 is a side elevational view of the storage unit of FIG. 5.
Figure 8:
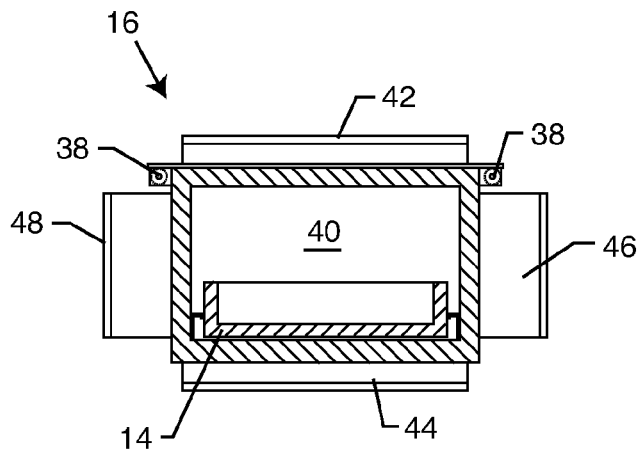
FIG. 8 is a cross-sectional view taken generally along line 8-8 of FIG. 7.
Figure 9:
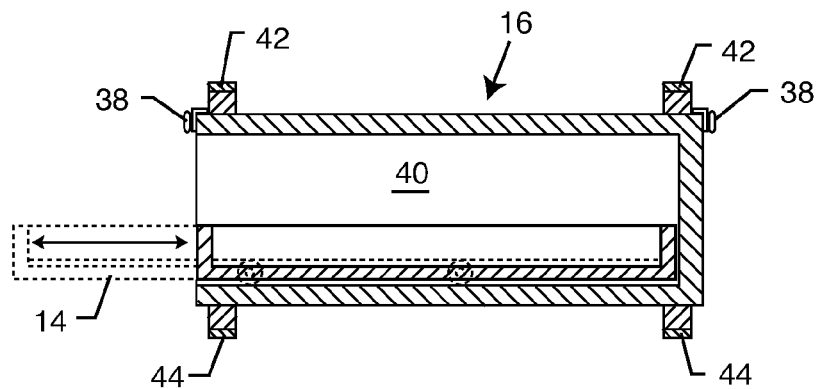
FIG. 9 is a cross-sectional view taken generally along line 9-9 of FIG. 6, illustrating a slidable drawer.

With reference now to FIGS. 2-4, an endless track is shown in FIG. 2 comprising tracks 20 and 22 which are positioned generally parallel to one another and spaced apart a distance substantially equal to the length of a storage unit 16. The word "endless" is used herein to convey the meaning that the storage unit 16 can travel in the pre-defined path, typically a circular path, continuously without end. The track system 20 and 22 illustrated in FIG. 2 comprises what is referred to herein as a single track system. That is, each track 20 and 22 includes upper and lower horizontal rails 24 and 26 vertically spaced from one another and positioned along the same plane. The rails 24 and 26 are interconnected with first and second end vertical rails 28 and 30. First and second intermediate rails 32 and 34 are spaced apart from one another and extend from the upper rail 24 to the lower rail 26. The first and second intermediate rails 32 and 34 are disposed intermediate the ends of the upper and lower rails 24 and 26. The first track 20 and the second track 22 are minor images of one another, and are spaced apart and generally parallel to one another so as to form a continuous track. Moreover, the first end vertical rail 28 and its adjacent intermediate rail 32 form a portion of a first vertical track. The corresponding end vertical rail 28 and adjacent intermediate rail 32 form the other portion of the first vertical track, which the storage units 16 ride upon in their vertical motion at one end of the continuous track. Similarly, the second end vertical rail 30 of each track 20 and 22 and the intermediate rail 34 adjacent thereto form portions of a second vertical track which supports a column of storage units 16 at the opposite end of the continuous track.

Although the tracks 20 and 22 are generally square or rectangular, it will be appreciated by those skilled in the art that the movement of the storage unit 16 thereon is generally circular and continuous. The upper rails 24 may include a pair of ramps 35 to facilitate smooth transition of storage units 16 from one column to the next. The ramps 35 prevent the binding of the wheels 38 in the vertical track as the storage unit 16 moves horizontally to the right column.

As will be more fully discussed herein, each track 20 and 22 includes a flexible stop 36, typically along the upper rail 24, and possibly on the lower rail 26. The stop 36 is biased outwardly such that the storage unit 16 can pass thereby. But, the stop 36 is designed to spring back to prevent the storage unit 16 from reversing travel.

As can be seen in FIGS. 2 and 3, each storage unit 16 includes wheels 38 which engage the tracks 20 and 22 so that the storage unit 16 is slidably movable along the pair of tracks 20 and 22.

As can be seen from FIG. 2, the wheels 38 of a given storage unit 16 engage corresponding rails 28 and 32 or 30 and 34, when in a vertical motion, and upper rail 24 when positioned at an uppermost position, or bottom rail 26 when in a lower position.

Throughout the description hereof, similar functional structure or components in different embodiments may be labeled with the same reference number. Thus, as can be seen from the description above, the tracks 20 and 22 are substantially identical and minor-imaged structures.

Of particular reference now to FIGS. 3 and 4, two columns of storage units 16 are illustrated. As discussed above, in the illustrated exemplary embodiment, a total of ten spaces or cavities are available within the structure 10. However, to provide movement of the storage unit 16 in sequential fashion, an empty space is provided, as illustrated in FIGS. 3 and 4. As will be seen herein, this empty space is typically in one of the four corners, or in the upper most and lower most spaces of the end columns. Each storage unit 16 travels in a sequential, or generally circular, path during the course of operation.

With reference now to FIGS. 3-9, each storage unit 16 defines an inner cavity 40 for the storage of items therein. In a particularly preferred embodiment, the drawer 14 is disposed within the cavity 40, and is slidably extended and retracted out of and into the cavity 40, such as by rollers, cabinet sliders, tongue and groove inter-connection, etc. Such would enable the end user to pull out the drawer 14 and retrieve selected items therefrom during operation. The storage units 16 are typically and preferably relatively the same size. There may be as few as a single drawer 14 within the inner compartment 40, or a plurality of drawers 14 within the inner compartment 40. Thus, for example, a storage unit 16 with a single drawer 14 could accommodate larger or taller items, such as a two liter bottle of soda. However, placing two or three drawers 14 within the same inner space 40 would enable the storage of smaller cans or other smaller items in each drawer 14. Of course, it will be appreciated that the drawer 14 is not necessary because, in an alternative embodiment, the items can be stored directly within the inner storage cavity 40.

In a particularly preferred embodiment, spacers 42 and 44 extend from the top and bottom of each storage unit 16. As illustrated in FIGS. 3 and 4, the lower spacers 44 of one storage unit 16 contact and rest or slide upon the upper spacers 42 of a storage unit 16 immediately below. Preferably, spacers 46 and 48 extend from the sides of each storage unit 16 as well, such that the storage units are in fixed spaced relationship with one another. In a particularly preferred embodiment, the spacers 42-48 are comprised of or include an outermost layer of relatively friction free material, such as Teflon, plastic, smooth metal, etc. which enable the storage unit 16 to slide past one another relatively easy even if the spacers 42-48 come into contact with one another during the movement of the storage unit 16.

Preferably, the wheels 38 extend from an upper portion of the storage unit 16, such that the storage unit 16 is essentially suspended from the upper or lower rails 24, 26. Suspension renders it relatively easy for the storage unit 16 to be horizontally moved across the upper or lower rails 24 or 26.

With reference to FIGS. 10-13, the storage units 16 are preferably loaded with items such that they are substantially balanced or such that the weight of the items placed therein are centered or substantially spread across the inner cavity 40 or drawer 14 of the storage unit 16. Extreme unbalancing may potentially cause the wheels 38 of the storage unit 16 to bind. Accordingly, means are contemplated for indicating balance of the storage unit 16.

Such means can be in the form of visual aids for the end user. For example, a bubble level device 50 can be placed on the storage unit, such as the front panel of the drawer 14. The individual can determine that the bubble of the level device 50 is within a safe range to ensure the storage unit 16 is substantially balanced.

Figure 11:
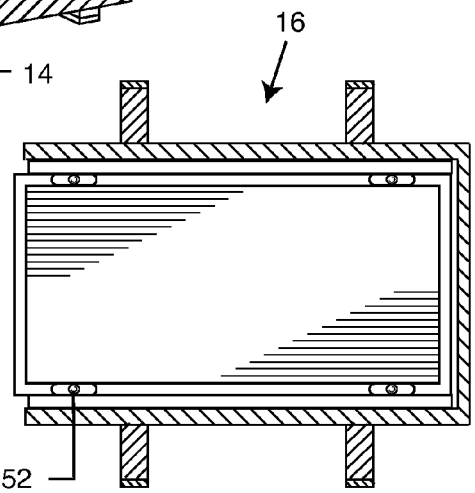
FIG. 11 is a cross-sectional view taken generally along line 11-11 of FIG. 7.

Alternatively, as illustrated in FIG. 11, the storage unit 16 may include electronic sensors 52 which detect when the storage unit 16 becomes unbalanced. When unbalanced, an alarm, such as a visual or audible alarm, may activate to alert the end user of the unbalanced situation.

Figure 10:
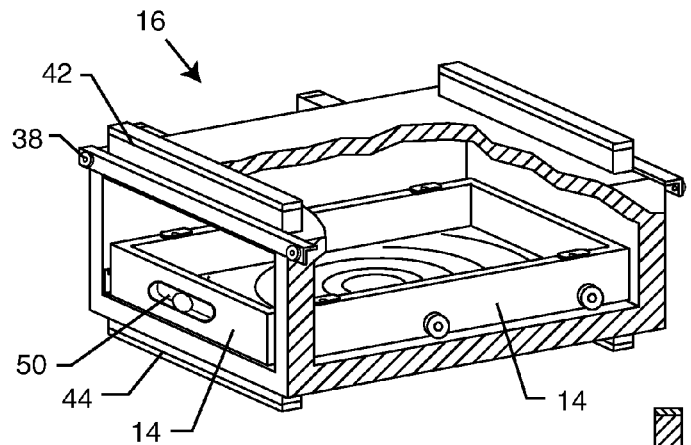
FIG. 10 is a partially sectioned and fragmented perspective view of a storage unit having balancing means incorporated therewith.
Figure 12:
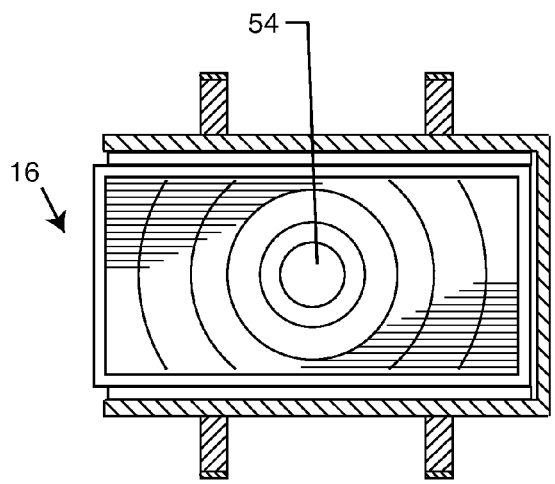
FIG. 12 is another cross-sectional view of the storage unit of FIG. 11, illustrating an alternative balancing means.
Figure 13:
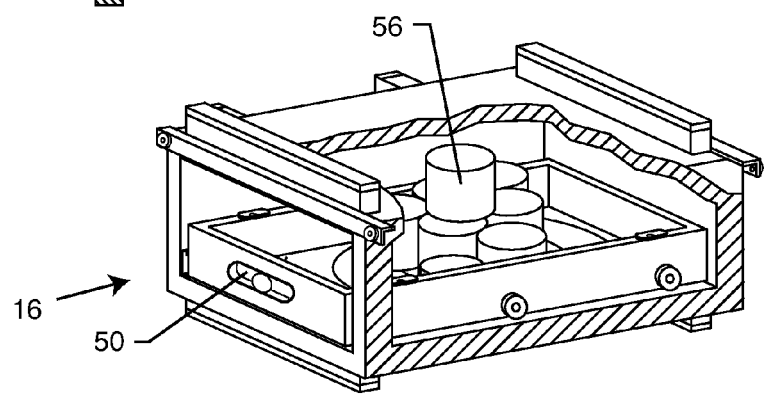
FIG. 13 is a view similar to FIG. 10, further illustrating containers within a drawer of the storage unit.

With reference to FIGS. 10 and 12, another visual means for identifying balance is illustrated. This is referred to herein as the "bulls-eye" method wherein concentric circles are formed in the bottom of the storage unit 16 or drawer 14. The inner most concentric circles 54 could be painted green, and then surrounding circles yellow, even further surrounding circles orange, and the outermost circles red. In addition, a free-floating disc or the like could be placed between the bottom panel of the storage unit 16 or drawer 14 and a clear floor such that if the storage unit 16 were unbalanced, the free-floating disk would travel into an orange or red area, indicating to the end user that the storage unit 16 was imbalanced. In this manner, as illustrated in FIG. 13, items 56 could be placed towards the center of the storage unit 16, or in a substantially uniform manner, such that the storage unit 16 would be more or less balanced.

Other means of balancing the storage unit 16, to the extent necessary, may be used. For example, each storage unit 16 could attach to a movable weight that slides on an independent track. The movable weight is used to counter the imbalance of weight within the storage unit 16 in both the X and Y planes. Placing the weight on an independent track minimizes the potential for binding since the storage unit 16 moves along the tracks 20 and 22 on wheels 38.

Figure 14:
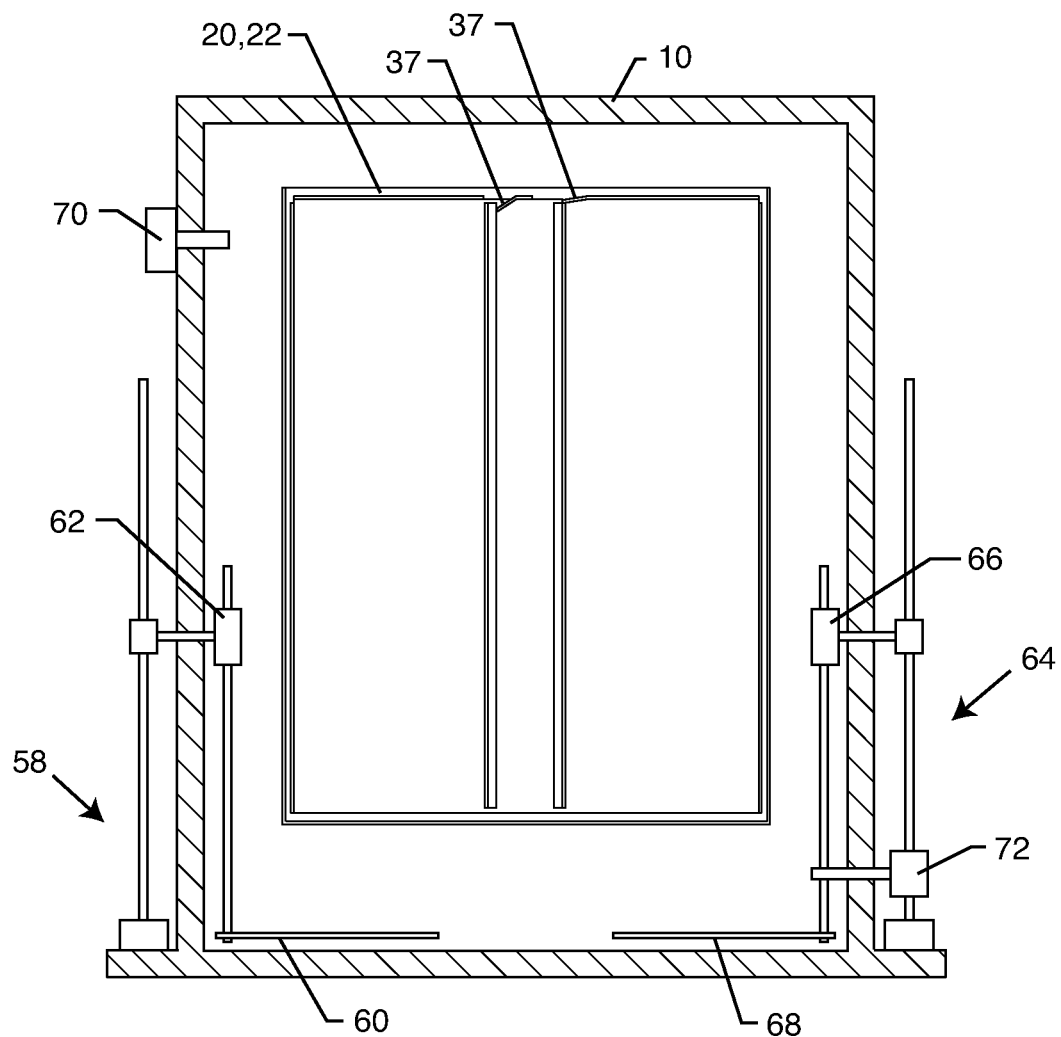
FIG. 14 is a diagrammatic view of a storage system with power-driven actuators positioned about the single track system.

With reference now to FIG. 14, the operation of the system with respect to the single track system will now be described. As discussed above, the tracks 20 and 22 are typically disposed within a housing and/or other structure, such as a cabinet or behind a wall. These structures may extend into a ceiling or span multiple floors. Although the tracks 20, 22 appear to be completely suspended within the structure 10, it will be understood that support members or the like hold the tracks 20 and 22 in place within the structure 10. The storage units 16, as illustrated and described above, are suspended and stacked between the parallel tracks 20, 22 so as to be at least partially supported by the tracks 20 and 22.

Actuators are used to move the storage units. Typically, as discussed above, the actuators are operated with control circuitry and are power-driven so as to be capable of lifting substantial weight. However, as will be more fully discussed herein, it is also possible to have a manual back-up system.

The system includes a first vertical actuator 58 which, as will be more fully described herein, serves to lift a column of storage units. The vertical actuator 58 includes an arm 60 which is selectively moveable over an arc, typically approximately a 90° arc, so as to be positioned below the storage units or to the side of the storage units. The vertical actuator 58 can comprise a linear actuator, such as that offered by Jaeger Industrial Co., Ltd., under the SuperTak trade name. Such linear actuators are capable of lifting 500 or even 1000 pounds. When a vertical linear actuator is utilized, a rotary actuator 62 is also required to rotate the arm 60 over its arc under and away from the storage units. Other vertical actuators 58 are also feasible, such as those referred to as "pick and place" actuators which are capable of both vertical as well as rotary motion. The cost and design of the system may dictate whether a "pick and place" actuator or multiple actuators 58 and 62 are utilized. Similarly, a second vertical actuator 64, and if necessary a second rotary actuator 66 to rotate a second arm 68, is disposed on the opposite end column to lower the stacked storage units 16, as will be more fully described herein.

A horizontal actuator 70 is disposed towards an upper left portion of the system and positioned so as to extend a ram or rod inwardly to move a storage unit 16 horizontally, as will be more fully described herein. Similarly, a horizontal actuator 72 is positioned in the lower right hand corner of the system so as to be positioned to push a storage unit 16 from a bottom position of one column to an adjacent column, as will be more fully described herein. This positioning, of course, relies upon a clockwise rotation or sequence of the storage units. If another sequence is desired, the actuators 58, 64, 70 and 72 are repositioned accordingly.

It will be appreciated by those skilled in the art that the system does not necessarily need to have a certain or predefined start position or sequence. Typically, the storage units 16 travel in either a clockwise or counter-clockwise manner. The position of the storage unit 16 does not need to be placed at a start point or the like. Instead, the storage unit 16 can be moved from their current position until the desired storage unit is accessible.

Figure 15:
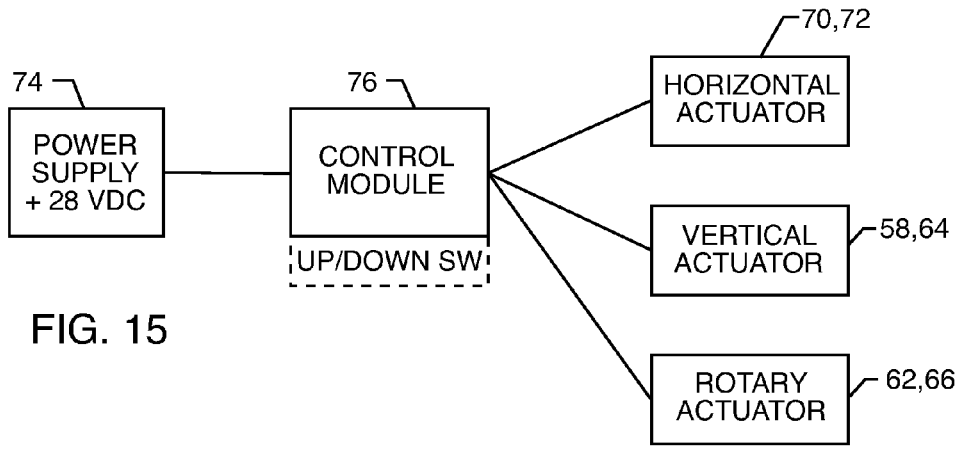
FIG. 15 is a diagrammatic view illustrating control of the power-driven actuators.
Figure 16:
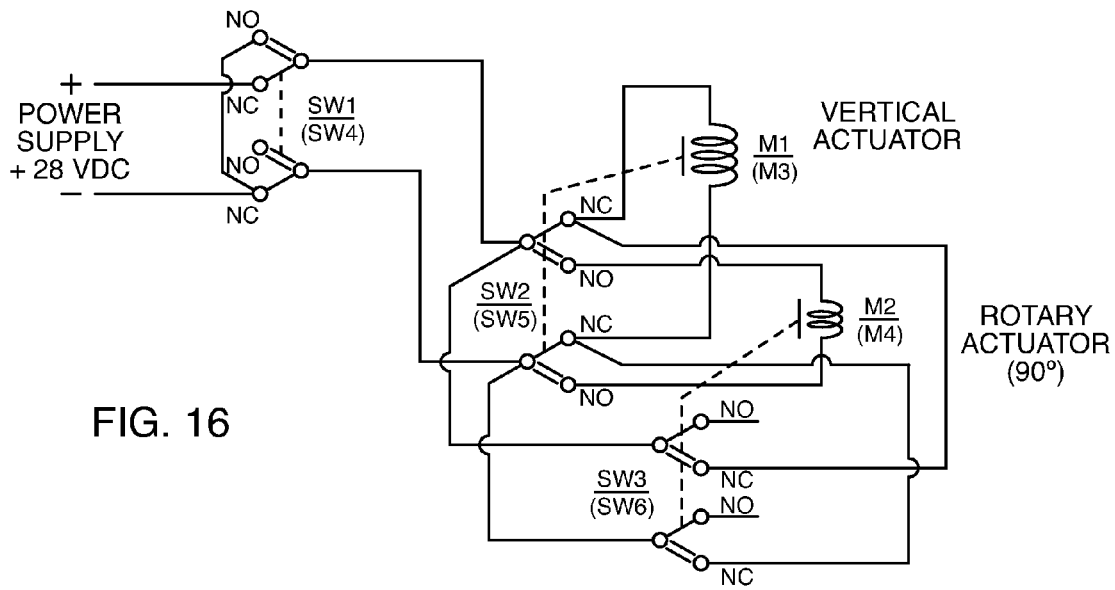
FIG. 16 is an electronic schematic illustrating the control circuitry for vertical and rotary actuators.
Figure 17:
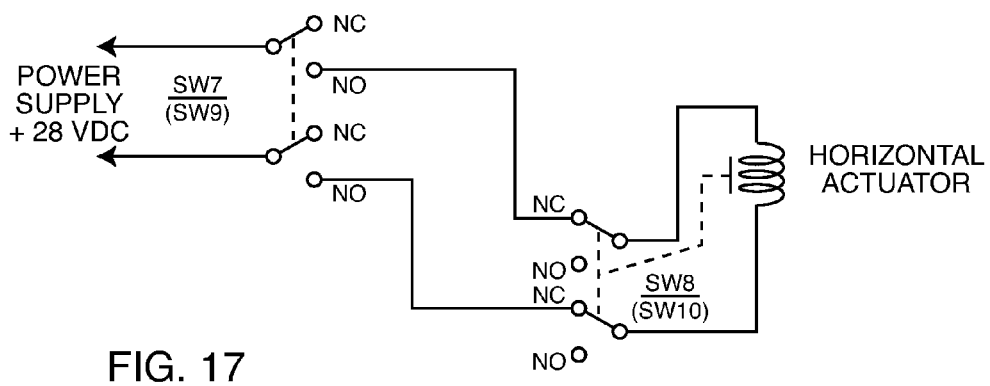
FIG. 17 is an electronic schematic of the control circuitry for operating the horizontal actuators.

In a preferred embodiment, the actuators are power-driven. As such, control circuits control the timing and movement of each of the actuators 58, 64, 70 and 72. With reference now to FIG. 15, a power supply 74, such as a twenty-eight volt direct current power supply, supplies power to a control module 76 (e.g. controller 18 in FIG. 1) which controls the horizontal actuators 70 and 72, the vertical actuators 58 and 64 and the rotary actuators 62 and 66, if necessary. The controller 18 may include a power switch to power the control module 76 to cause the storage units 16 to rotate until the desired storage unit is available and accessible to the individual. Alternatively, circuitry can be implemented such that a particular storage unit 16 may be moved into a particular location, as determined by the individual. The control module 76 would then power on the actuators 58, 62, 64, 66, 70 and 72, if necessary. FIGS. 16 and 17 illustrate switches, such as the double-pole, double-throw switches which would be sequentially activated to supply power to the respective actuator. The control module 76 would determine the timing of such switch activation.

The operation of the system will now be described with reference to FIG. 18. In the configuration illustrated, for exemplary purposes in this application, two columns having essentially ten vacancies or spaces S1-S10 are provided. Storage units 16 occupy all but one of these vacancies, as described above. It will be readily understood by those skilled in the art that regardless of the configuration of number of storage units, columns, etc., there must be one vacancy in order to sequentially move the storage unit 16. Accordingly, as will be described more fully herein, the vacancy is either present at the uppermost or lowermost position of the end columns.

Figure 18:
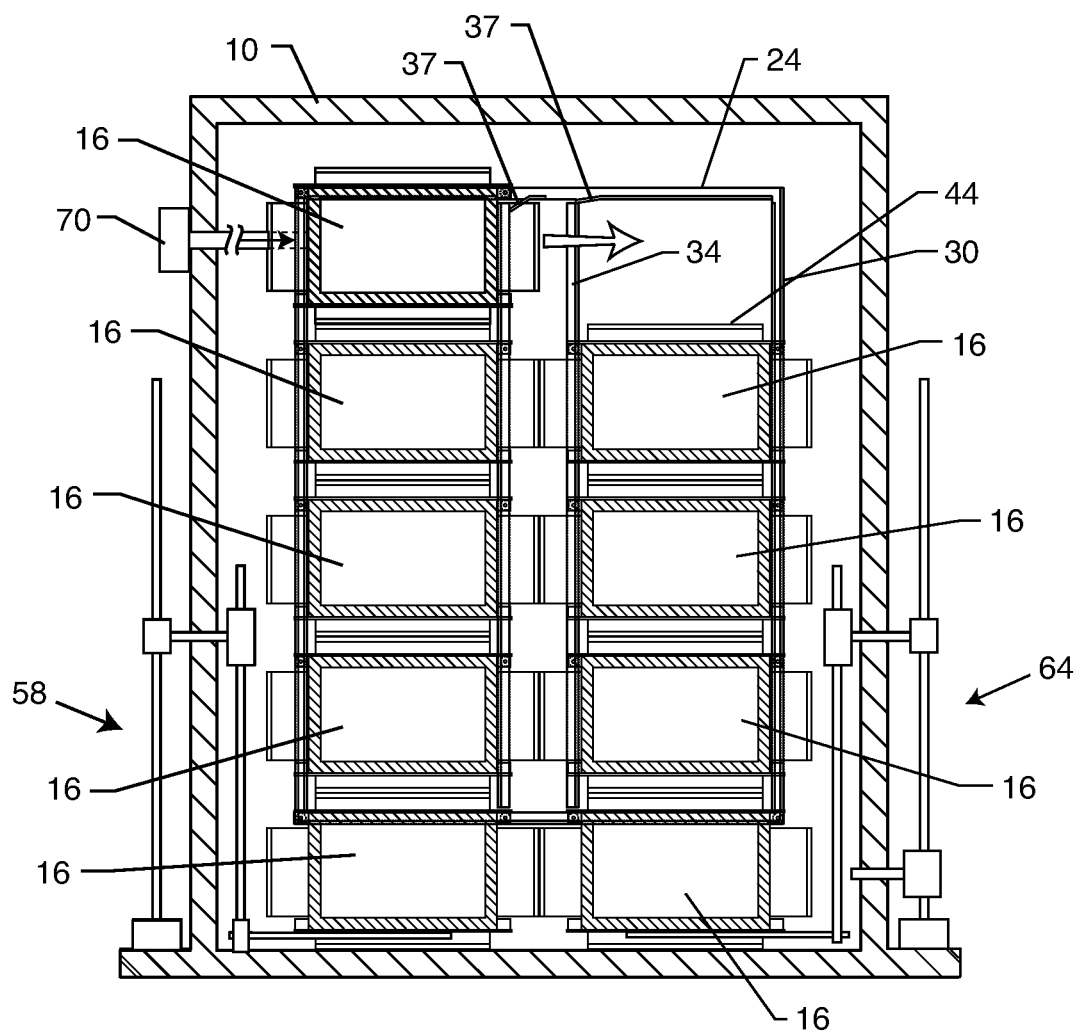
FIG. 18 is a diagrammatic view similar to FIG. 14, further illustrating two columns of storage units and the operation of the actuators moving a top storage unit from one column to an adjacent column.
Figure 19:
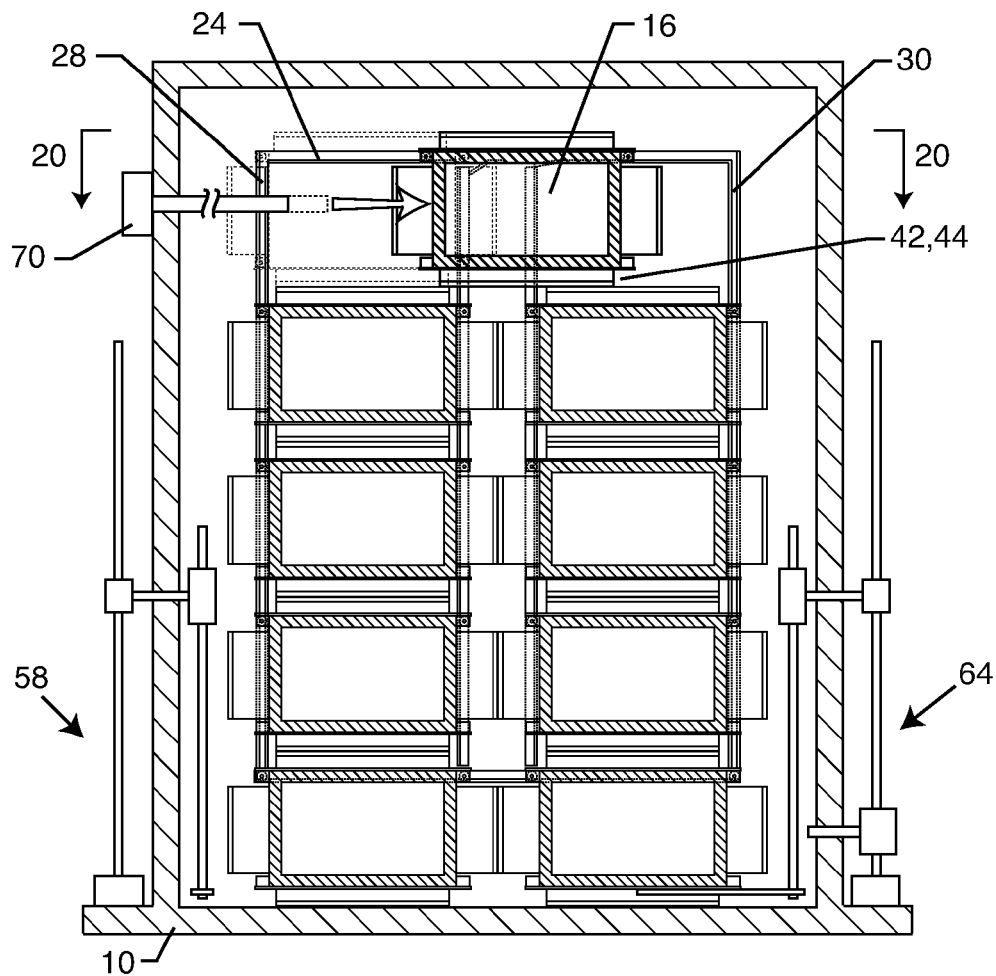
FIG. 19 is a diagrammatic view similar to FIG. 18, illustrating the top storage unit being moved.
Figure 20:
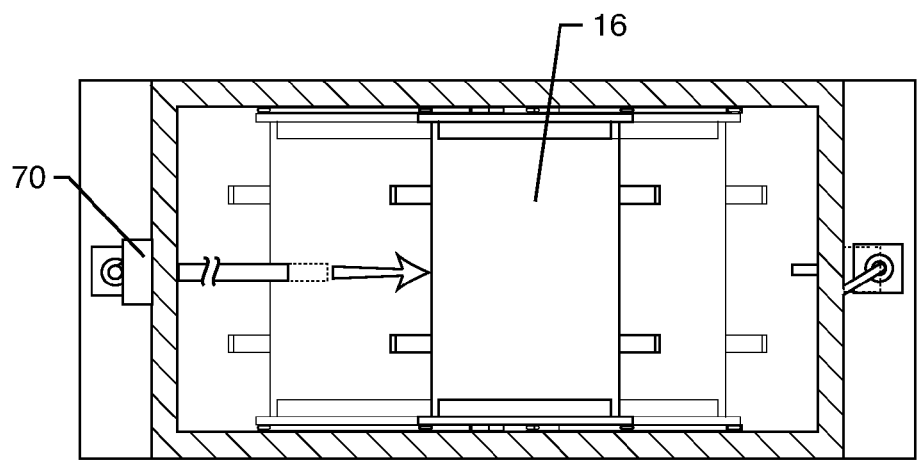
FIG. 20 is a cross-sectional view taken generally along line 20-20 of FIG. 19, illustrating the movement of the storage unit.
Figure 21:
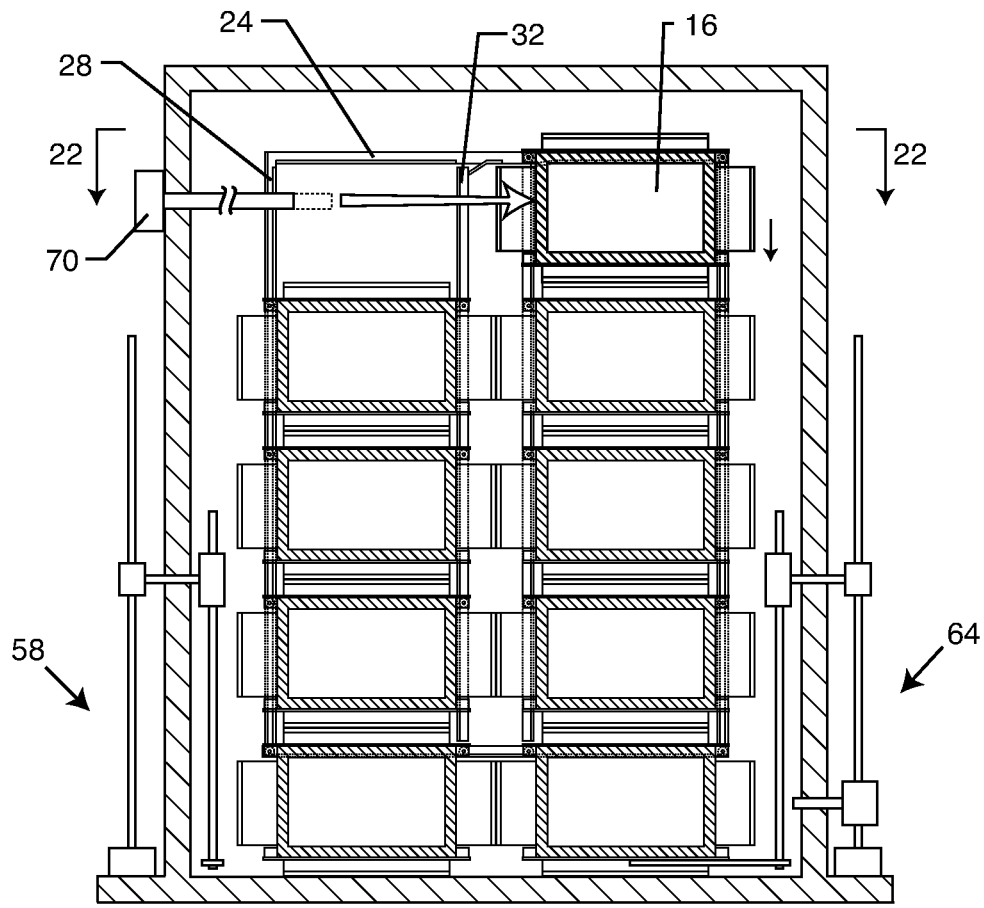
FIG. 21 is a diagrammatic view illustrating the repositioning of the storage unit from one column to another column.
Figure 22:
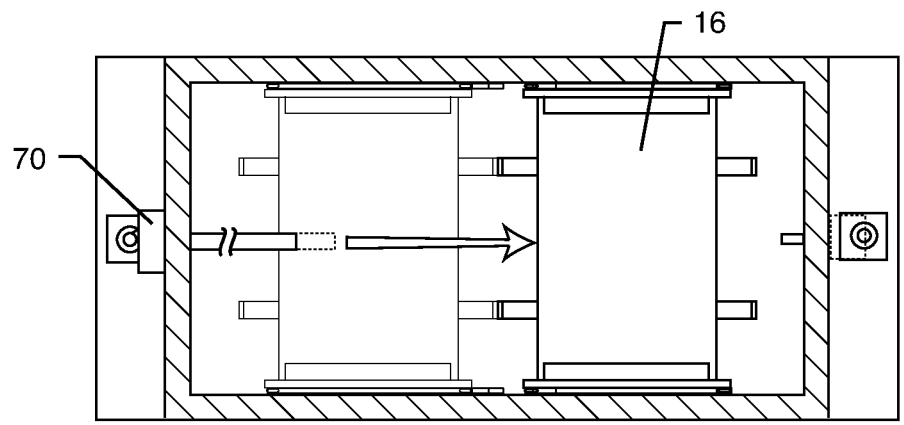
FIG. 22 is a cross-sectional view taken generally along line 22-22 of FIG. 21, illustrating the repositioned storage unit in another column.
Figure 23:
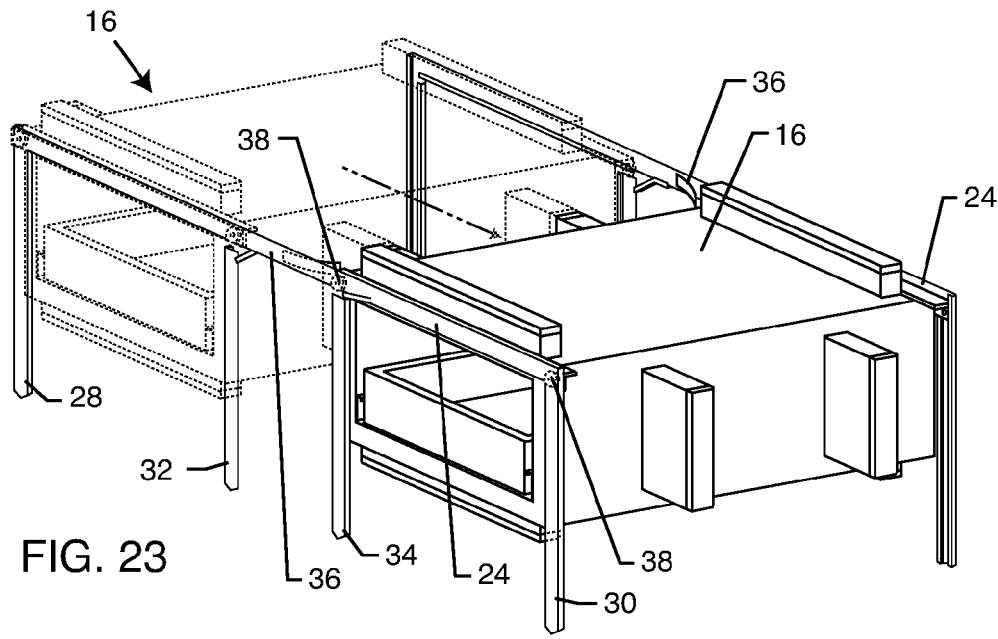
FIG. 23 is a perspective view illustrating the movement of the top storage unit from one column to an adjacent column along the single track system.
Figure 24:
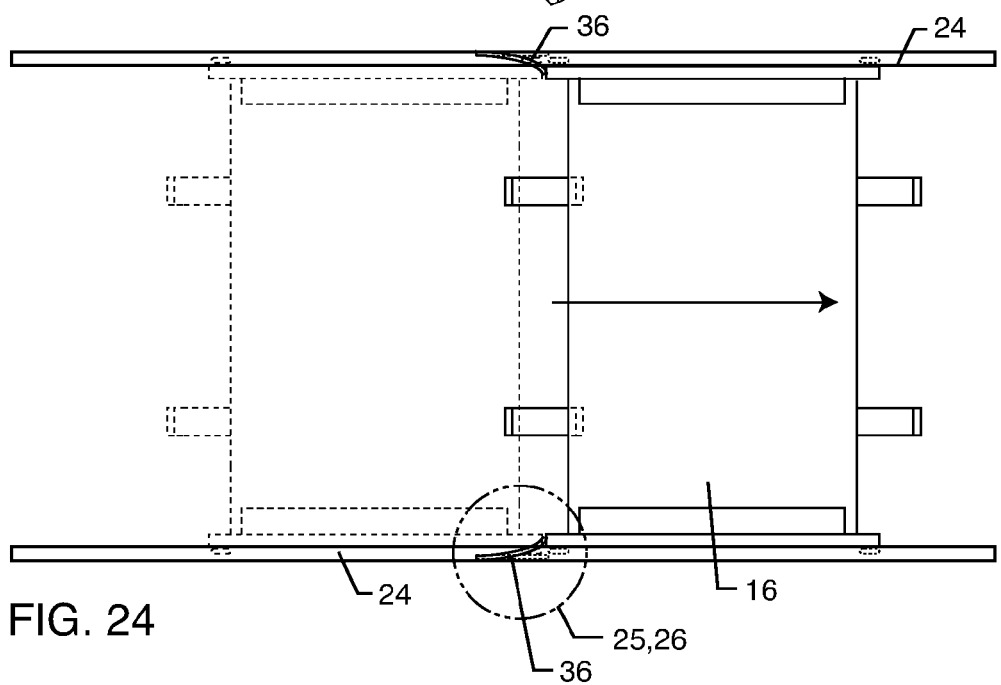
FIG. 24 is a top view of FIG. 23, illustrating the use of stops in the rails of the single track system to prevent reverse travel of the storage unit.

In FIG. 18, a vacancy is present in the upper right hand corner of the second column. When a user desires to have access to a storage unit 16 which is not currently available through an aperture 12, the end user may manually operate the system by depressing a button or the like. Alternatively, the system may automatically retrieve the desired bin when the user inputs the identity of a storage unit into the system through the control module 76. In the illustrated embodiment, the storage units 16 are moved sequentially in a clockwise direction.

Accordingly, the control module 76 supplies power to the horizontal actuator 70, such as by activating switches SW7 and SW8. Typically, this will cause horizontal actuator 70 to extend a rod or ram outwardly into engagement with the storage unit 16 occupying space S1, as shown in FIG. 1. The rod or ram comprising the horizontal actuator 70 may telescope so as to be able to extend outwardly, yet telescope inwardly within a relatively small space in a housing or the like. Alternatively, the horizontal actuator 70 may comprise a screw or any other means necessary for physically moving the storage unit 16 as needed. The storage unit 16 is moved along the upper rails 24 of the tracks 20 and 22 and is partially supported by the low friction surface of spacers 42 and 44 until it is fully moved into space or vacancy S2, as illustrated in FIGS. 18-22. Ramps 35 minimize any binding effect of the wheels 38 bridging the gaps in the rails 24 created by the vertical rails 32 and 34.

At this point, the storage unit 16, now residing in space S2, is positioned at the top of the second column. Typically, the storage units 16 are stacked on to one another. This is due to the fact that the wheels 38 of the storage unit 16 travel from the vertical rails 28 and 32, across the upper rails 24, to the vertical rails 30 and 34 and to the second column of storage units. The spacers 42 and 44 are designed to enable an upper storage unit 16 to slide over the lower storage units 16 and into the desired position thereby avoiding contact with nearby storage units.

With reference now to FIGS. 23-26, in the single track system, the stop 36 is operably disposed on both of the upper rails 24 of the tracks 20 and 22. The purpose of the stop 36, as described above, is to prevent the storage unit 16 from traveling backwards once it has been moved into position. This is merely a precaution in the event that the overall system is not completely level, or that the storage unit 16 would reverse its course when the rod of the horizontal actuator 70 retracts.

Figures 25, 26:
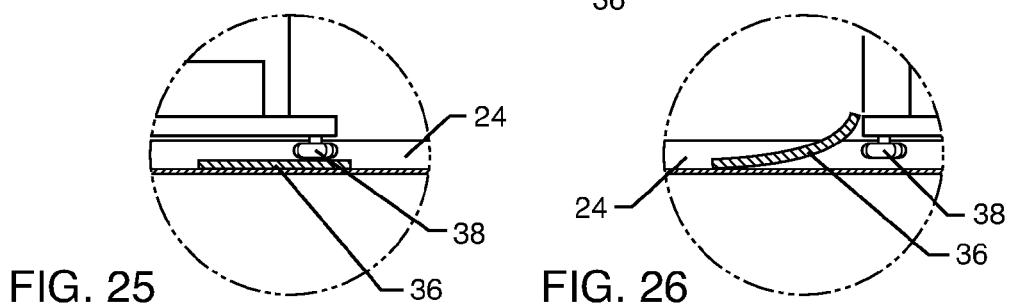
FIG. 25 is an enlarged view of area "25" of FIG. 24, illustrating the stop deflected as a wheel of the storage unit passes thereby.
FIG. 26 is an enlarged view taken generally of area "26" of FIG. 24, illustrating the stop biased outwardly to prevent reverse travel of the storage unit.

As can be seen in FIGS. 23-26, the stop 36 is typically biased away from the rail 24. Preferably, the stop 36 comprises a leaf spring. As the storage unit 16 moves past the stop, as illustrated in FIG. 25, the stop 36 deflects into and against the rail 24 to permit the wheel 38 to pass thereby. Once the wheel 38 passes by the stop 36, the stop 36 biases outwardly from the rail 24, again, preventing rearward travel of the storage unit 16.

Figure 27:
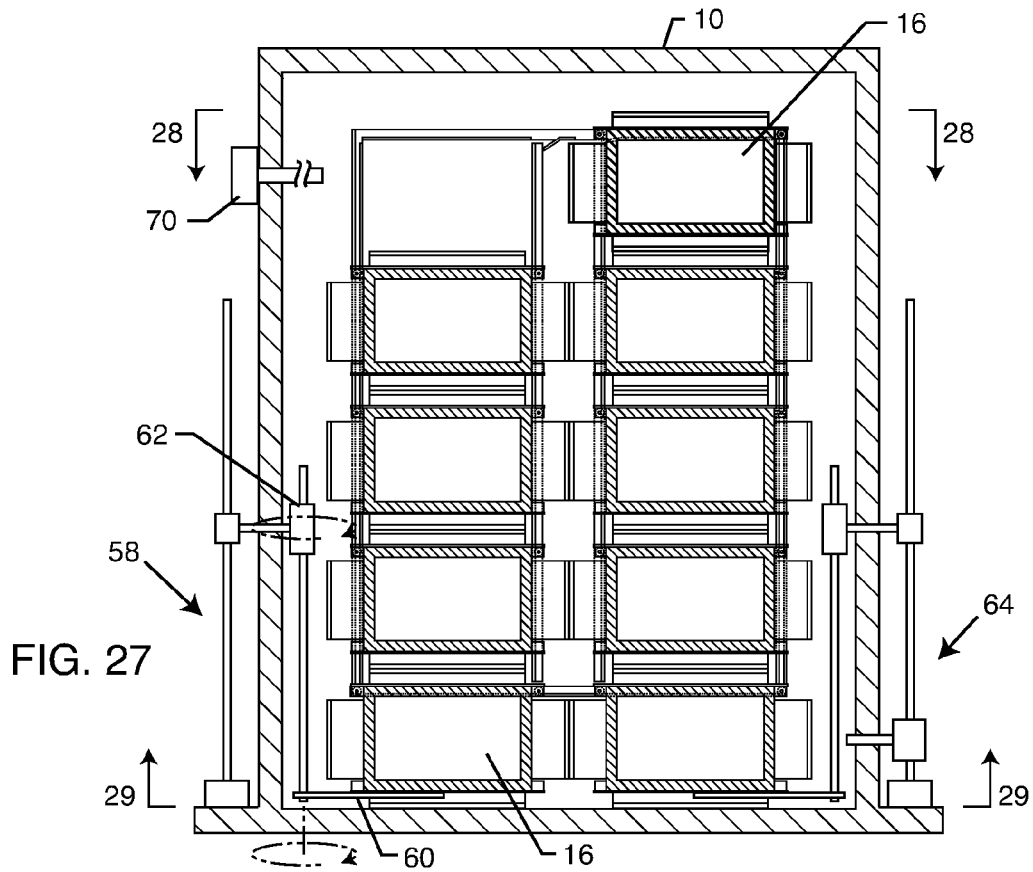
FIG. 27 is a diagrammatic view of the storage system with an actuator positioned below the first column of storage units.
Figure 28:
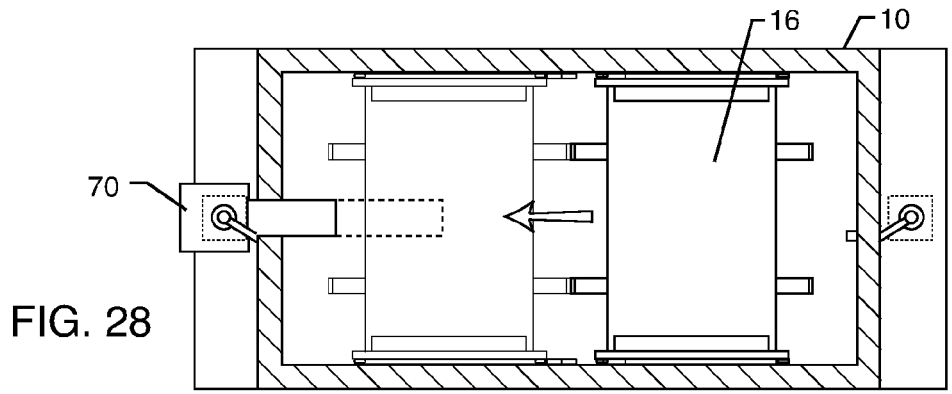
FIG. 28 is a cross-sectional view taken generally along line 28-28 of FIG. 27, illustrating the retraction of a ram of an upper horizontal actuator.
Figure 29:
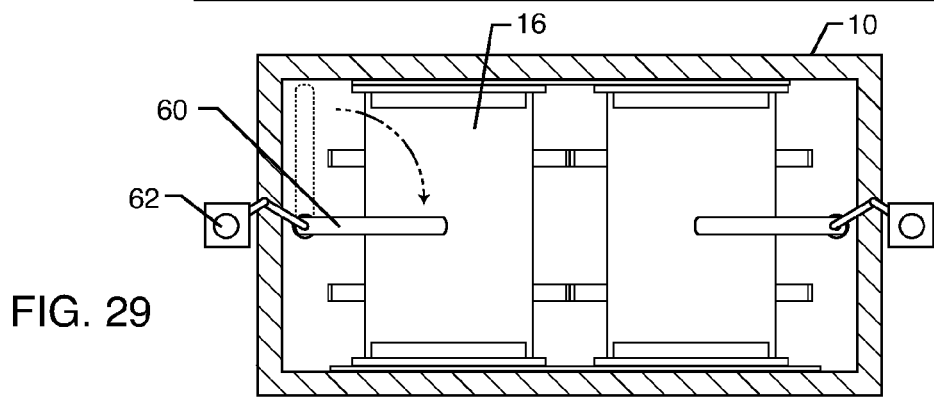
FIG. 29 is a cross-sectional view taken generally along line 29-29 of FIG. 27, illustrating the positioning of a swing arm by a vertical actuator.

With reference now to FIGS. 27-29, after the storage unit 16 moves from the top of the first end column to its adjacent column (in this case the second end column), the control module 76 activates the vertical actuator 58 such that the arm 60 swings approximately ninety degrees to rest under the bottommost storage unit 16 of the first column. In the event that the vertical actuator 58 includes the rotary actuator 62, this would be done, for example, by powering the switches SW1, SW2 and SW3, so as to power the rotary actuator M2.

Figure 30:
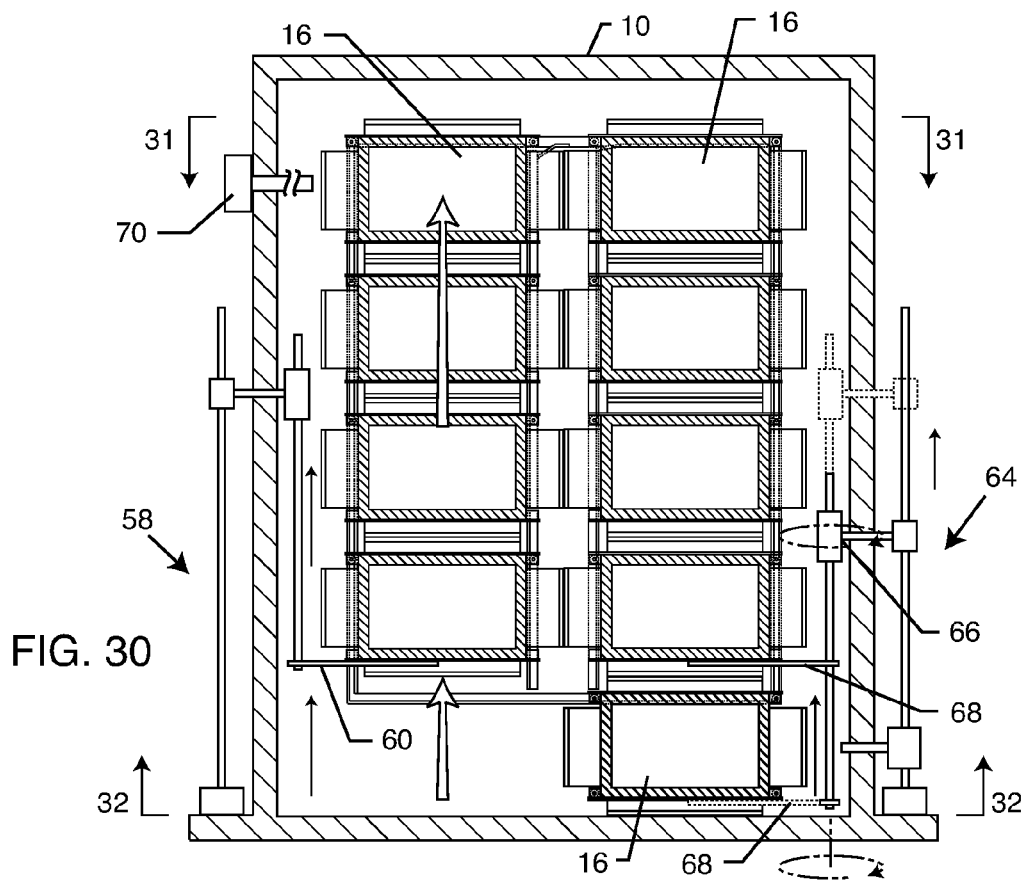
FIG. 30 is a diagrammatic view of the storage system, illustrating a vertical actuator lifting the first column of storage units.
Figure 31:
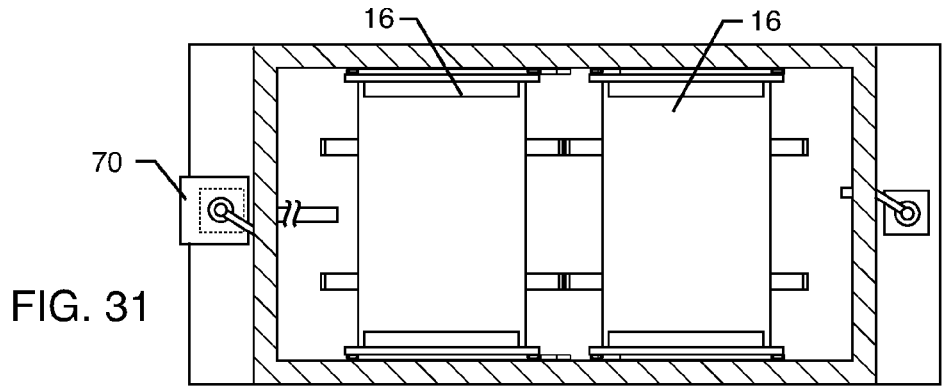
FIG. 31 is a cross-sectional view taken generally along line 31-31 of FIG. 30, illustrating the top two storage units of the adjacent columns.
Figure 32:
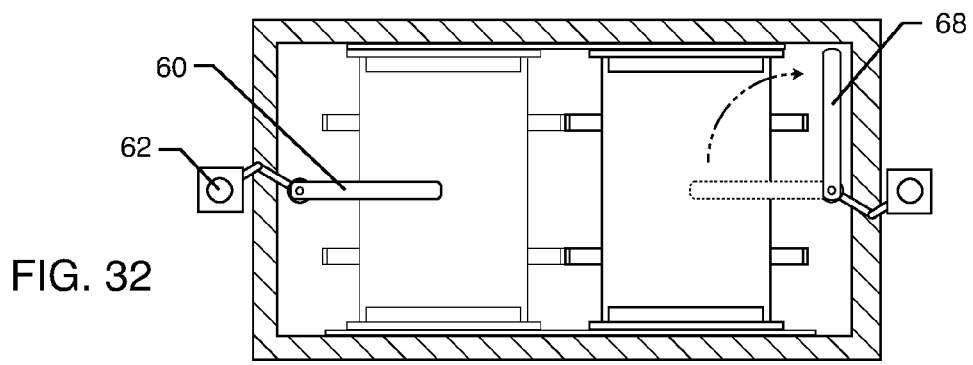
FIG. 32 is a cross-sectional view taken generally along line 32-32 of FIG. 30, illustrating movement of another swing arm by an actuator.

With reference now to FIGS. 30 and 31, once the arm 60 is positioned under the storage unit 16 occupying space S7, with the vacancy in space S1, the vertical actuator 58 activates to lift the first column of stacked storage units 16 such that the uppermost storage unit 16 now resides in space S1, creating a vacancy in space S7, as illustrated.

Figure 33:
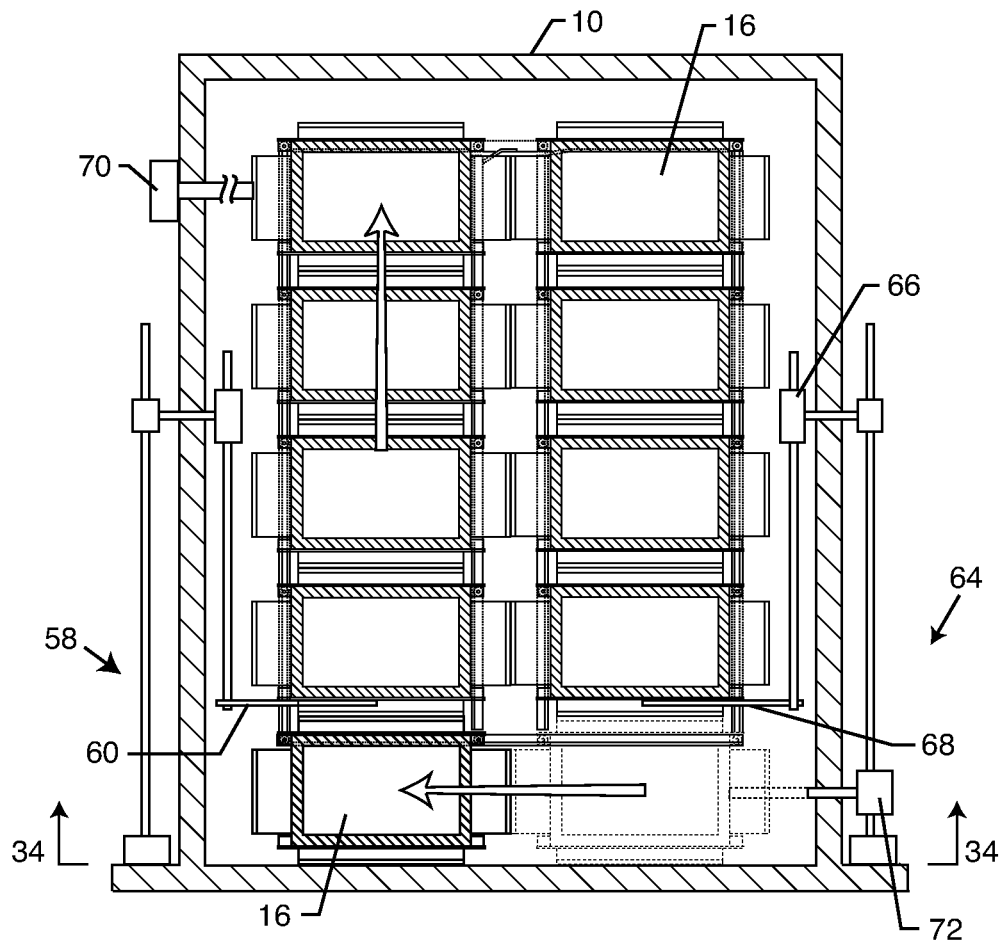
FIG. 33 is a diagrammatic view of the storage system, illustrating the supporting of all but the bottom storage unit of the second column, and the repositioning of the bottom storage unit from one column to another column.

With reference to FIGS. 30-33, preferably simultaneously, or immediately thereafter, the second vertical actuator 64 rotates the second swing arm 68, as necessary, from under the lowermost storage unit in the second column, such as by using the rotary actuator 66 to rotate the arm 68 ninety degrees. The vertical actuator 64 then lifts the arm 68 and the rotary actuator 66 repositions the arm 68 under the storage unit 16 immediately above the lowest storage unit 16, as illustrated in FIGS. 30 and 33.

Figure 34:
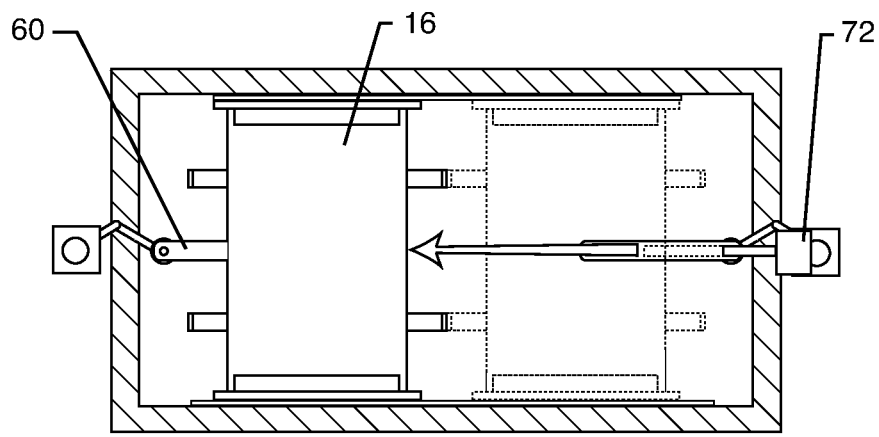
FIG. 34 is a cross-sectional view taken generally along line 34-34 of FIG. 33, illustrating the movement of the bottom storage unit from one column to an adjacent column.

With reference now to FIGS. 33 and 34, the second vertical actuator 64 either holds the stack of storage units 16 in the second column, or slightly lifts the column, with the exception of the bottommost storage unit 16. The second horizontal actuator 72 is now activated. Referring back to FIGS. 15 and 17, this occurs when control module 76 powers the necessary switches, such as switches SW9 and SW10. A rod or ram is then extended outwardly, as shown in FIG. 33, to move the lowermost storage unit 16 from space S6 in the second column to space S7 in the adjacent first column. Stops 36 may be used in the bottom horizontal rail 26, if necessary, to prevent the storage unit 16 from reversing its course, as discussed above.

Figures 35, 36, 37:
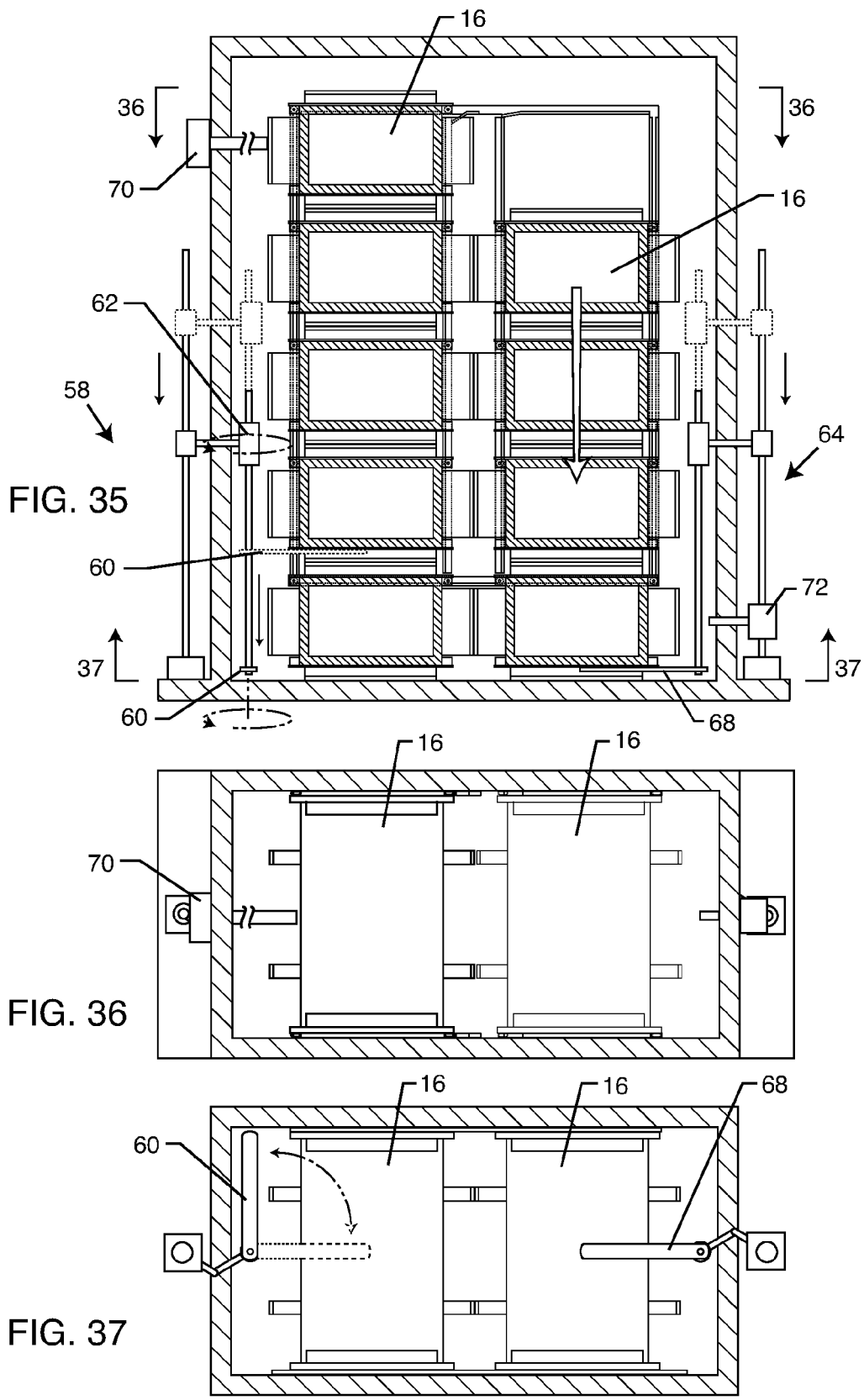
FIG. 35 is a diagrammatic view of the storage system, illustrating the lowering of the storage units in the second column to create a vacancy in a top position thereof.
FIG. 36 is a cross-sectional view taken generally along line 36-36 in FIG. 35, illustrating the position of the storage units in the adjacent columns.
FIG. 37 is a cross-sectional view taken generally along line 37-37 of FIG. 35, illustrating the positioning of the swing arms of the respective actuators.

Once the storage unit 16 moves into the open vacancy at the bottom of the first column, the second column of stacked storage units is lowered, as illustrated in FIG. 35. This can be done using the control module 76 and the vertical actuator switches SW4 and SW5 to activate the vertical actuator M3. This creates a vacancy in space S2, similar to the situation illustrated in FIG. 18. Preferably, simultaneously, or immediately thereafter, the vertical actuator 58 activates so as to rotate the arm 60 out from under the second to the bottom storage unit 16 to either a rest position, as illustrated in FIGS. 35 and 37, or to under the lowermost storage unit end space S7. The process then repeats itself until the desired storage unit 16 is presented within the desired open space 12 for access by the end user.

Figure 38:
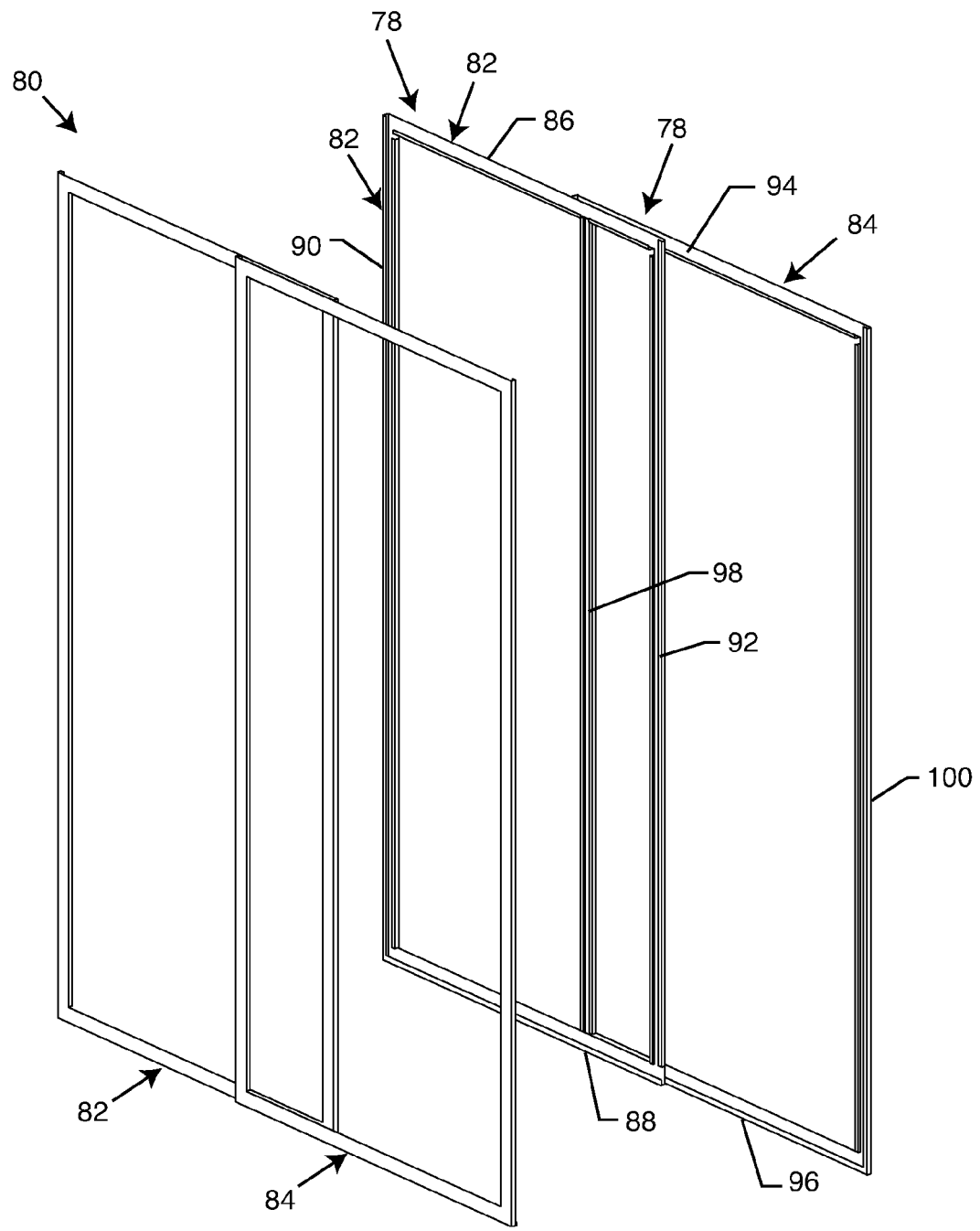
FIG. 38 is a perspective view of a dual track storage system.
Figure 39:
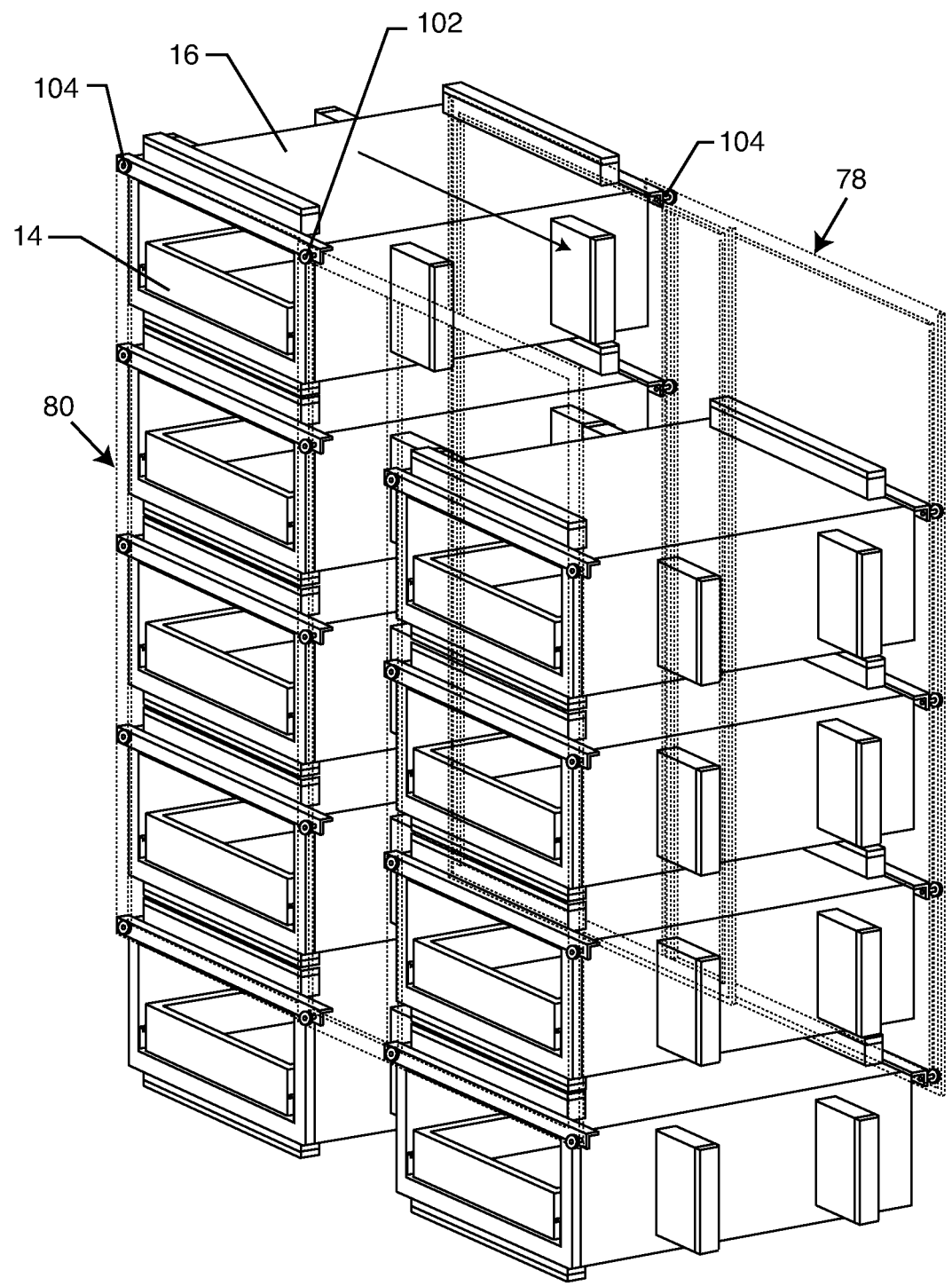
FIG. 39 is a perspective view of a plurality of stacked storage units operably connected to the dual track.

With reference now to FIGS. 38 and 39, a "dual track" embodiment is illustrated and will now be described. The dual track comprises first and second sets of tracks 78 and 80 which are substantially similar mirror images of one another, and spaced apart in generally parallel relation to one another approximately the width or length of a storage unit. Each track 78 and 80 comprises a first rail 82 in a first plane, and a second rail 84 in a second plane so as to be in a slightly overlapping arrangement with the first rail 82, as illustrated in FIG. 38. Essentially, each rail 82 and 84 form a generally circular path. The first rail 82 forms this path with upper and lower rails 86 and 88, as well as vertical side rails 90 and 92. Similarly, the second rail 84 forms a generally circular path with upper and lower rails 94 and 96 as well as vertical side rails 98 and 100. Each rail is generally circular, so as to be continuous and endless. This enables the wheels of the storage unit 16 to ride continuously within the rails 82 and 84, as will be more fully described herein. As mentioned above, the second track 80 is substantially similar to the first track 78 in structure and function.

As illustrated in FIG. 39, multiple columns of multiple storage units 16 stacked on one another operably engage the opposing tracks 78 and 80. The sequence of movement and the operation of the actuators 58, 64, 70 and 72 to selectively move the storage units 16 are described above with respect to the "single track" embodiment.

Figure 40:
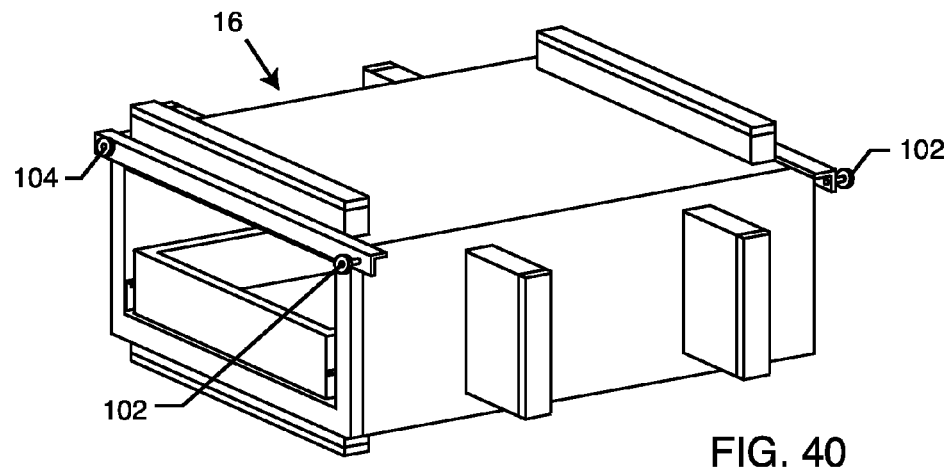
FIG. 40 is a perspective view of a storage unit having sets of wheels extending therefrom for use in the dual track embodiment.
Figure 41:
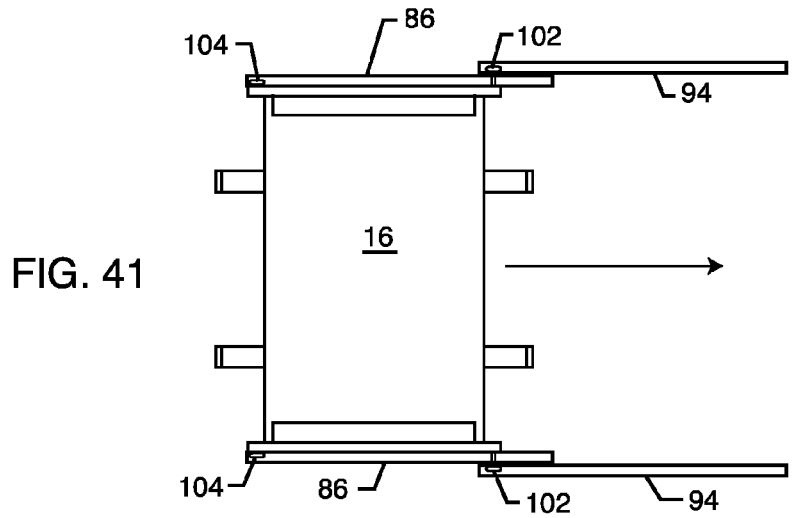
FIG. 41 is a top view illustrating a first set of wheels of the storage unit engaged with a first rail of the dual track.
Figure 42:
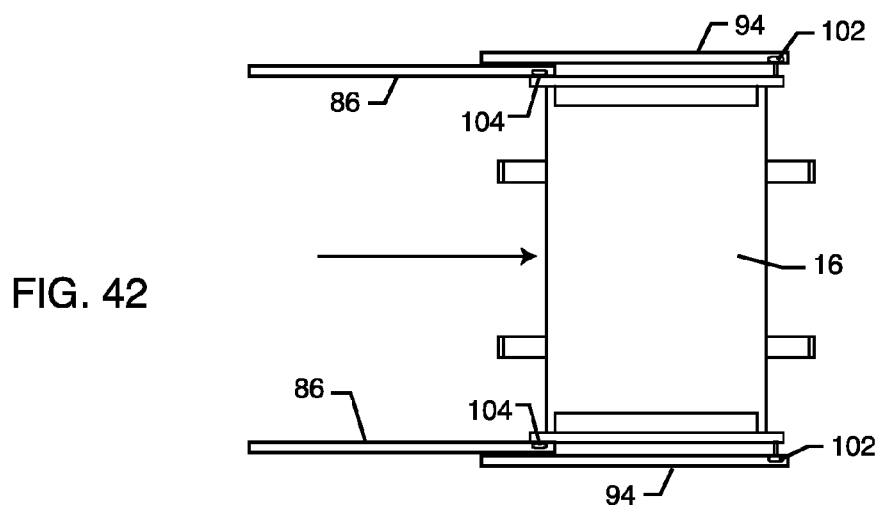
FIG. 42 is a top view illustrating a second set of wheels of the storage unit engaged with a second rail of the dual track.
Figure 43:
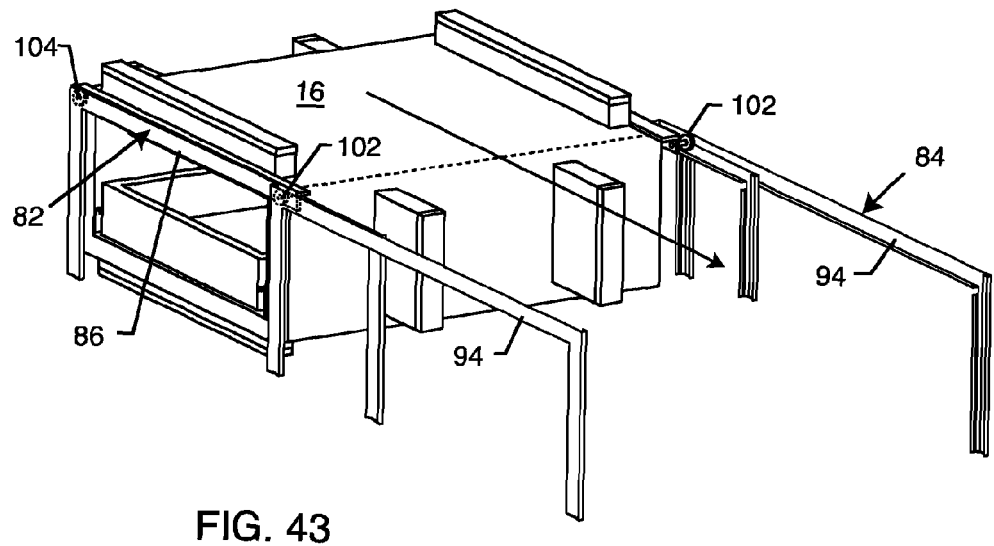
FIG. 43 is a perspective view illustrating movement of the storage unit along the dual track rails.
Figure 44:
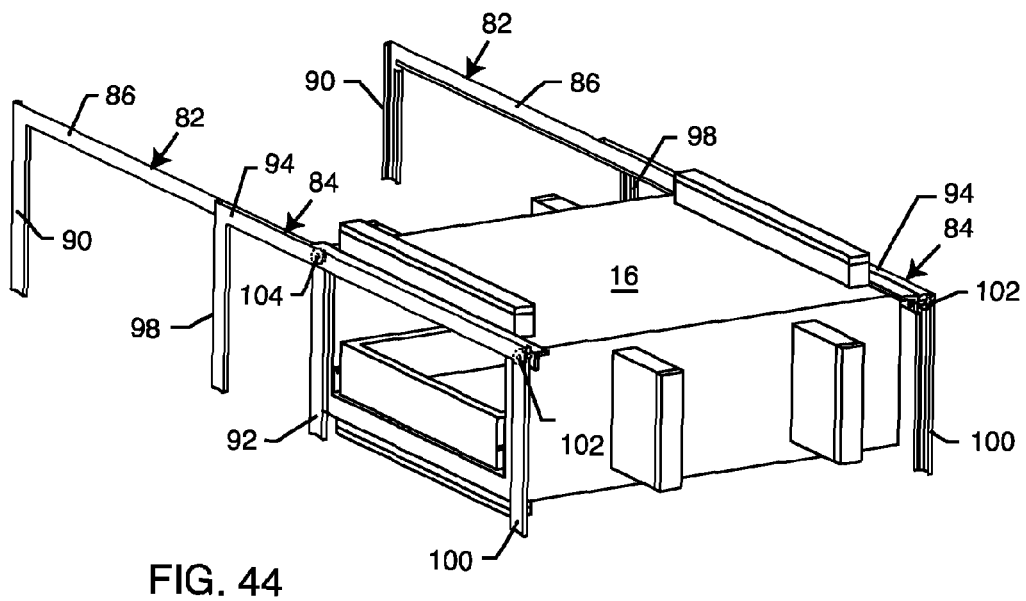
FIG. 44 is another perspective view illustrating movement of the storage unit along the dual track rails.

With reference now to FIGS. 40-42, an exemplary storage unit 16 used in this embodiment is illustrated. It will be noted that the storage unit 16 has two sets of wheels, 102 and 104, each set extending outwardly from the storage unit 16 at a different distance. In the illustrated embodiment, wheels 102 on one side of the storage unit 16 extend out farther than the wheels 104 on the opposite side of the storage unit 16. Each set of wheels 102 and 104 reside and travel within a separate rail 84 and 82 of the track 78 or 80, as illustrated. Thus, the front wheels 102 travel in track or rail 84, including sub-rail portions 94, 96, 98 and 100. The back wheels 104 travel in the second set of tracks or rails 82, including sub-rail sections 86, 88, 90 and 92. As the rails 82 and 84 are in adjacent planes, the wheels 102 and 104 extend from the storage unit 16 at different distances to engage the respective rails 82 or 84. This will be seen in FIGS. 43 and 44, wherein the wheels 102 are engaged with the upper rail 94 of the second rail 84, while the opposite wheels 104 remain engaged with the upper rail 86 of the first rail 82 while the storage unit 16 is moved from one column to a vacancy in an adjacent column. When traveling downwardly, the first set of wheels 102 travel downwardly on the vertical rail section 100 of the second rail 84, or rails 84, while the second set of wheels 104 travel down the vertical side rail 92 of the first rail 82. When moving horizontally across the bottom of the tracks 78 and 80, the outer wheels 102 engage with the lower rail 96, while the inner wheels 104 engage the lower rail 88. When moving upwardly, the outer wheels 102 travel along the vertical side 98 of the second rail 84, while the inner wheels 104 travel along the vertical side rail 90 of the first rail 82. Thus, the wheels 102 and 104 are in continuous travel and engagement with each respective rail 82 and 84 while the storage unit 16 is moved into the various spaces S1-S10 of the columns.

FIG. 15 illustrates that both the single track and dual track embodiments may be controlled electronically using the control module 76 to power the various actuators in a timed sequence so as to move the storage unit 16, as described above. This requires the power supply 74, typically in the form of a direct current voltage. Thus, a transformer or the like is typically used to transform the 120V or 240V (or 12 volts or 24 volts, if available) alternating current voltage to the appropriate direct current voltage. In the event of a power outage or the like, a battery back-up system may be used to power the control module 76 and the actuators 58, 62, 64, 66, 70 and 72. Such a battery can be built into the system and periodically or continuously recharged, or one or two twelve volt automobile batteries may be connected to the system.

Alternatively, the system can rely upon manual movement of the storage units 16. Such is illustrated in FIGS. 45-64. A plurality of storage units 16 are stacked upon one another in multiple columns within the structure 10, as described above. The structure 10 may be a housing or built within walls and ceilings or spaces within houses and business establishments or the like. Access to the storage units 16 is provided through the sides of the end columns, as illustrated in FIG. 45. It will be understood by those skilled in the art that the manual system can be a separate system entirely, or be incorporated into the power-driven system described above. For example, the manual system may be used in emergency situations where power is not available to drive the power-driven actuators. As such, the manual system will be described herein as if completely separate from the power-driven actuators, although this is not necessarily the case.

A vertical actuator 106 is operably positioned at the lower left hand corner, or the bottom of the first end column. The vertical actuator 106 includes a rod 108 and an arm 110. A lever 112 is used to rotate the arm 110, such as by rotating the rod 108, and lifting the rod 108 and the arm 110. Such may be accomplished by simple mechanical advantage, using lever principles. However, as the storage units 16 may have a considerable amount of aggregate weight, the vertical actuator 106 may take the form of a screw lift or hydraulic lift or jack. A similar vertical actuator 114 is positioned on the lower portion of the opposite end column, as illustrated in FIG. 45. Such would include a rod or screw 116, a lever 118, as well as a swingable arm 120.

The levers 112 and 118 extend through the structure 10 into operable engagement with the vertical actuators 106 and 114, respectively. Similarly, the passageway is available for the insertion of a pair of rods 122 and 124 to move the storage unit 16 from a top position of an end column to a top position in a vacancy of an adjacent column and from one bottom position of a column to another, respectively.

With reference now to FIGS. 45-52, in the manual system, the rod 122 is inserted to be in engagement with the top storage unit 16 in the end column. The rod 122 pushes the storage unit 16 along the single or dual tracks to the vacancy (in this case space S2) of the adjacent column, as illustrated. The vertical actuator 106 rotates the arm 110, as necessary, to a rest position insertable underneath the lower most storage unit 16 of the left end column.

Figure 51:
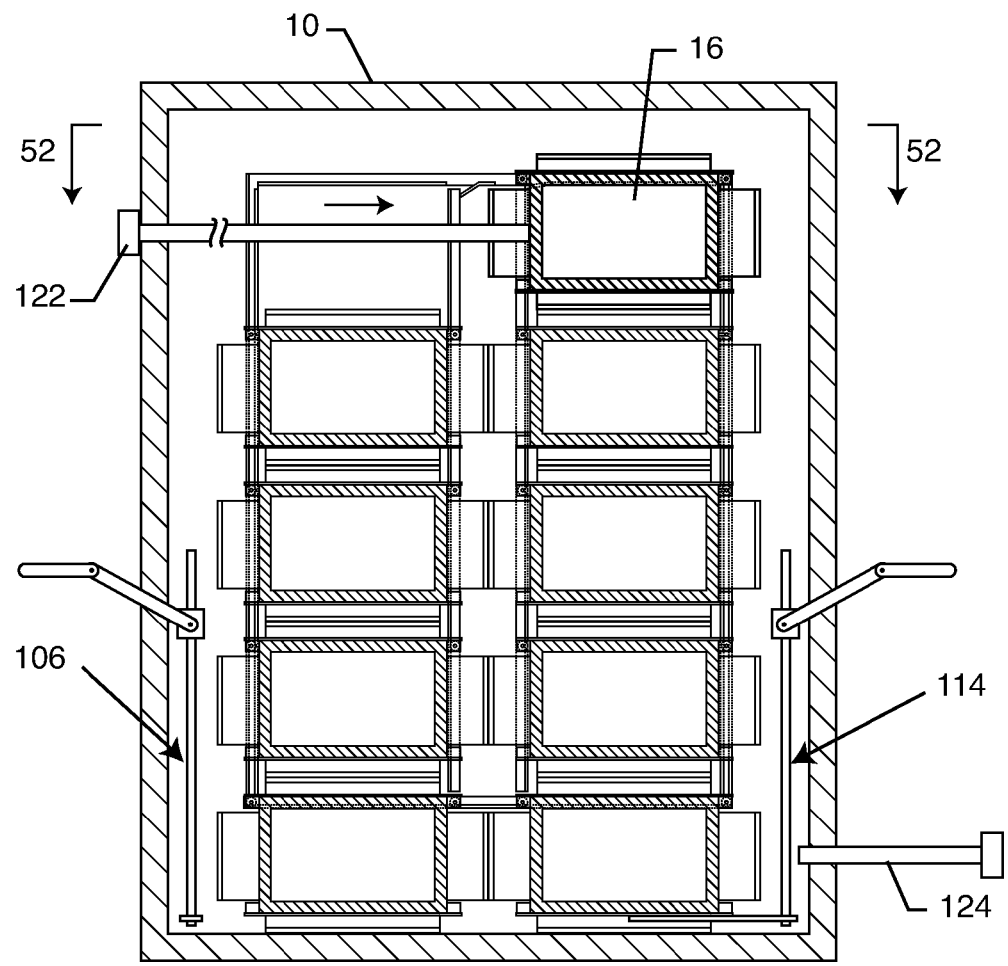
FIG. 51 is a diagrammatic view of the storage system, illustrating the final placement of the top storage unit from one column to an adjacent column.
Figure 52:
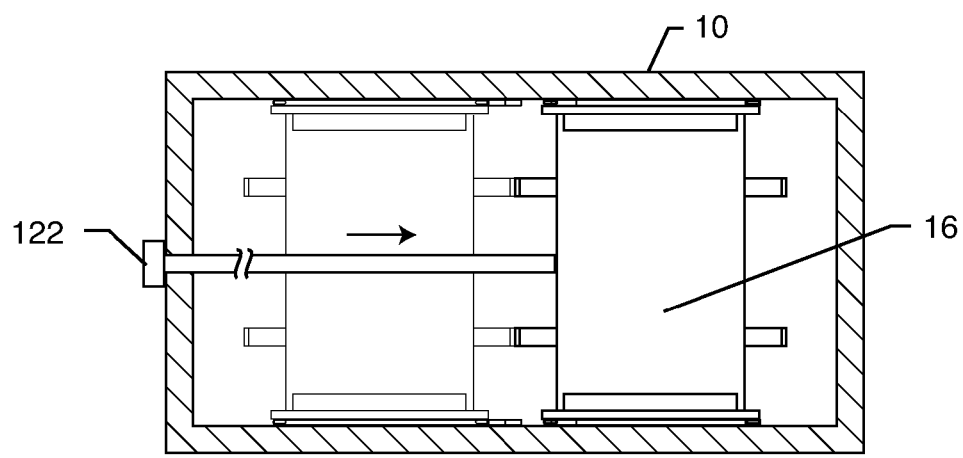
FIG. 52 is a cross-sectional view taken generally along line 52-52 of FIG. 51.
Figure 53:
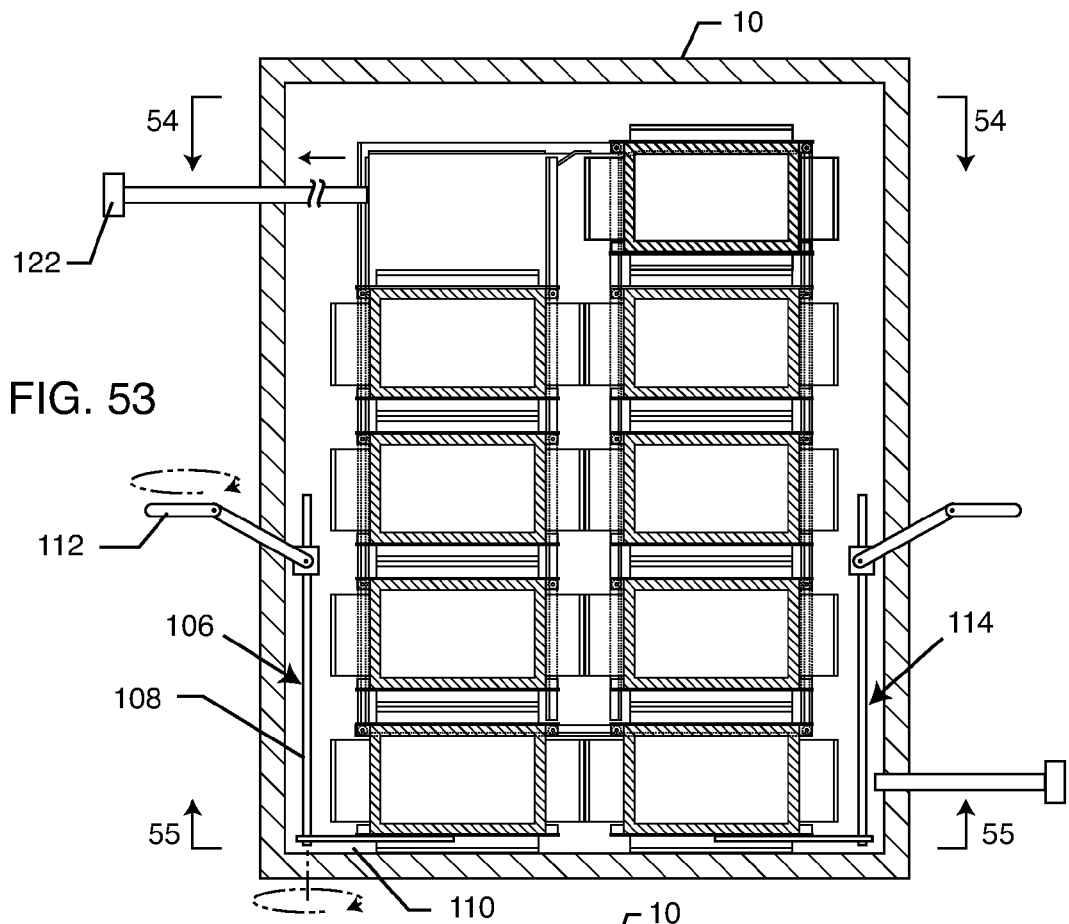
FIG. 53 is a diagrammatic view of the storage system, illustrating placement of a swing arm under the storage units of the first column.
Figure 54:
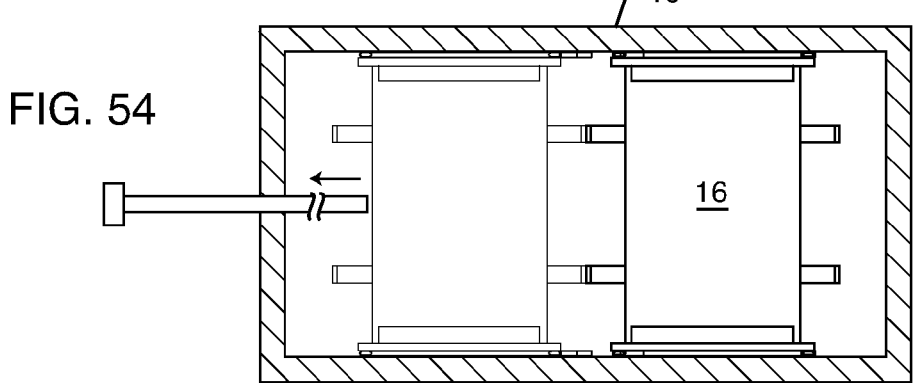
FIG. 54 is a cross-sectional view taken generally along line 54-54 of FIG. 53, illustrating retraction of the upper horizontal actuator.
Figure 55:
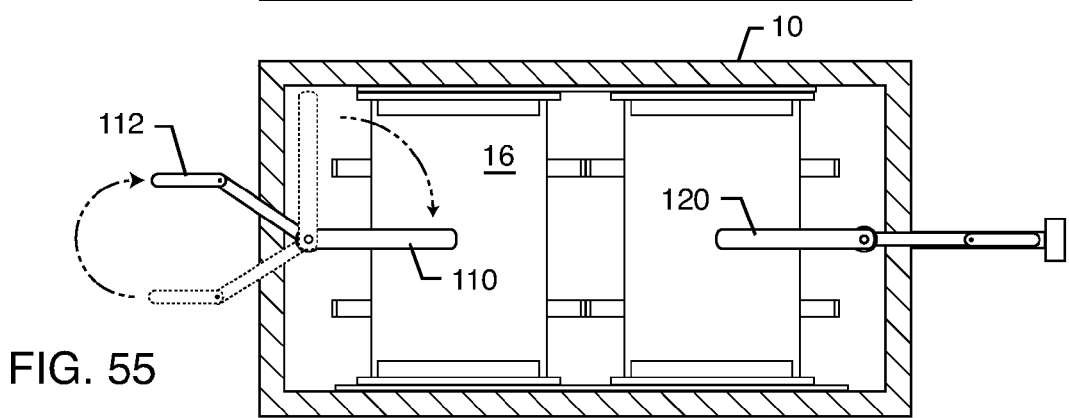
FIG. 55 is a cross-sectional view taken generally along line 55-55 of FIG. 53, illustrating placement of the swing arm under the first column of storage units.
Figure 56:
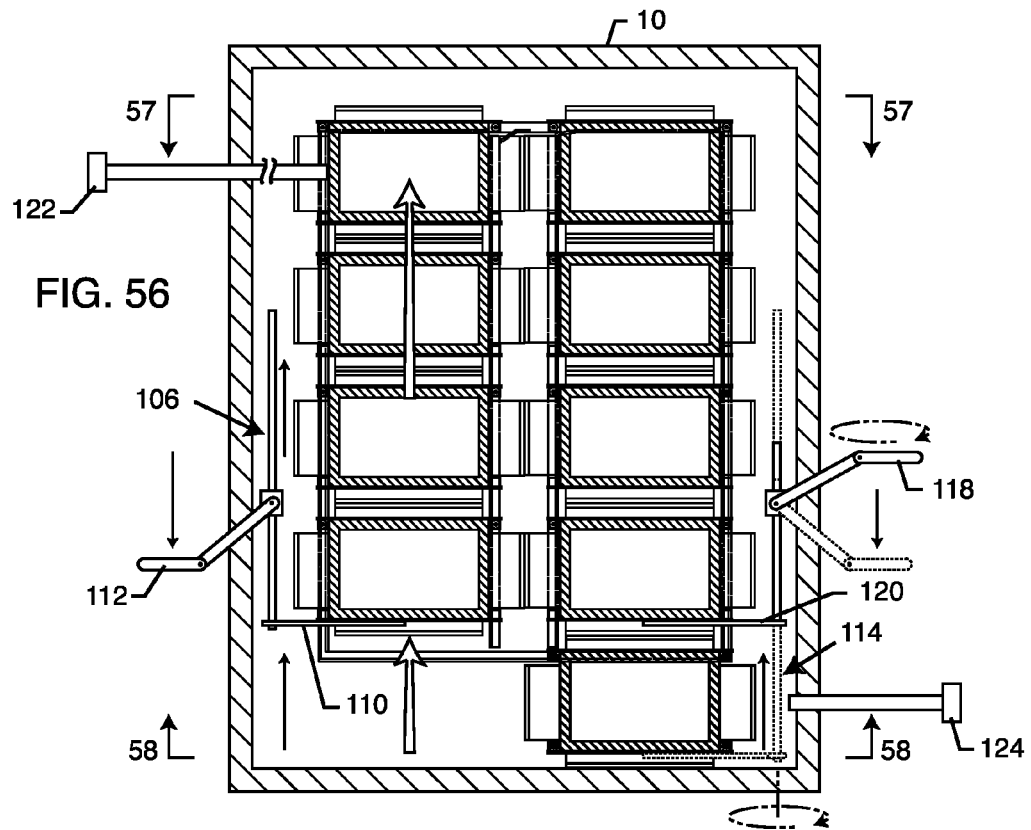
FIG. 56 is a diagrammatic view of the storage system, illustrating the lifting of the first column of storage units using a vertical actuator.

Once the upper most storage unit 16 (space S1) moves from the end column to the vacancy (space S2) in the adjacent column, as illustrated in FIGS. 51 and 52, the rod 122 retracts out of the housing or track path. The arm 110 then swings into position under the storage unit 16 at the bottom of the first end column, as illustrated in FIGS. 53 and 55, using the lever 112. The stack of storage units 16 and the end column is then lifted upwardly to create a vacancy in space S7, as shown in FIG. 56. As discussed above, given the weight of the storage units 16, a screw lift, hydraulic lift or jack may be used in this step.

Figure 57:
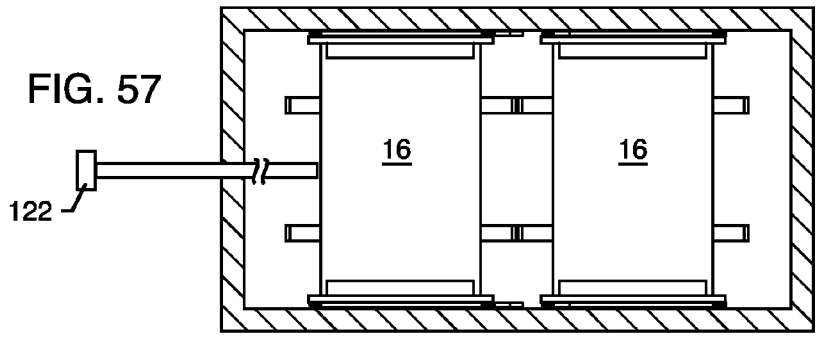
FIG. 57 is a cross-sectional view taken generally along line 57-57 of FIG. 56.
Figure 58:
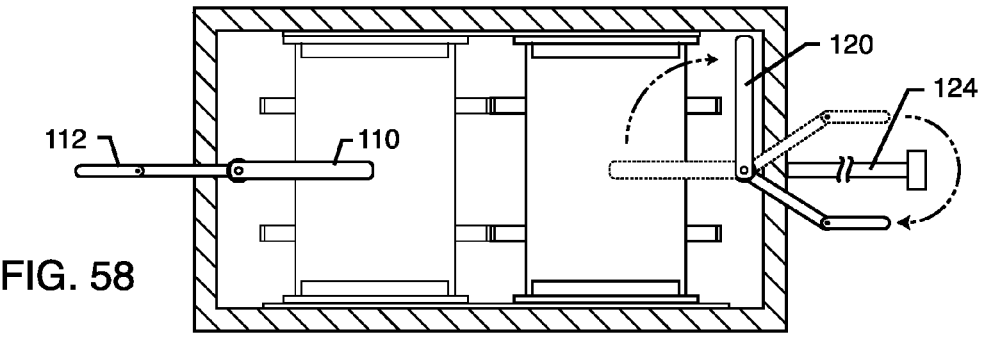
FIG. 58 is a cross-sectional view taken generally along line 58-58 of FIG. 56, illustrating placement of the swing arms.
Figure 59:
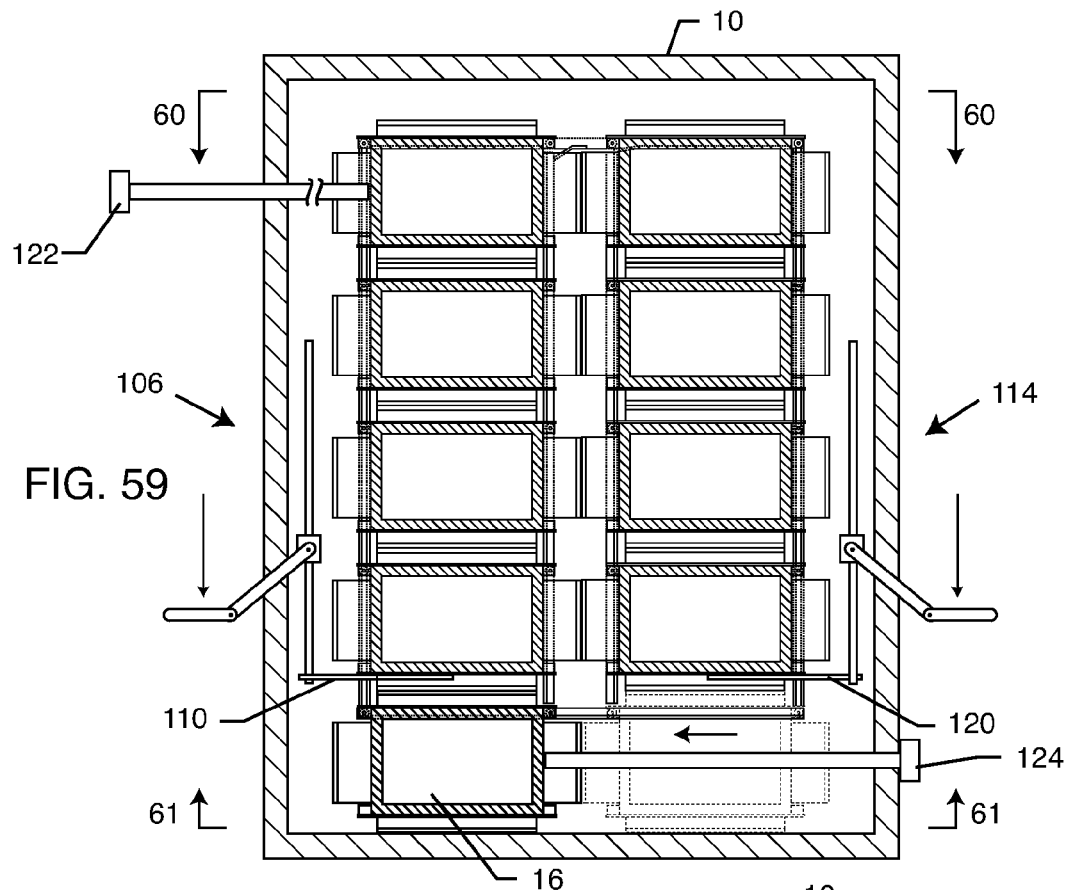
FIG. 59 is a diagrammatic view of the storage system, illustrating movement of a bottom storage unit from one column to another column.
Figure 60:
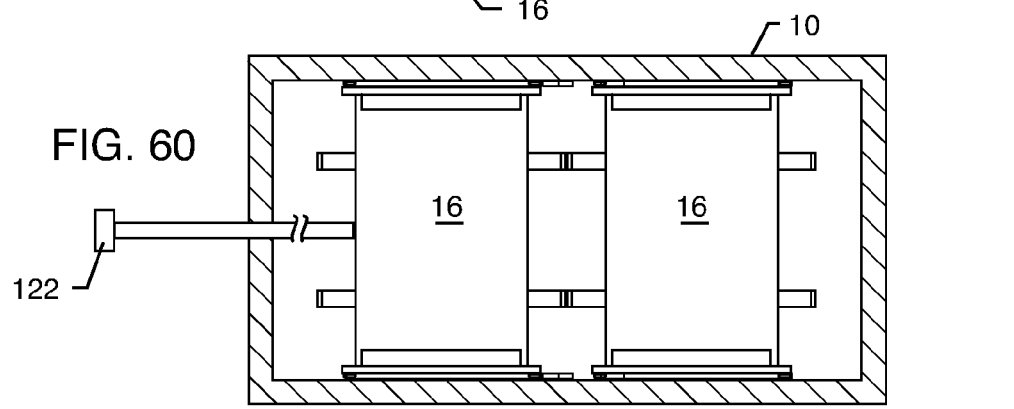
FIG. 60 is a cross-sectional view taken generally along line 60-60 of FIG. 59.
Figure 61:
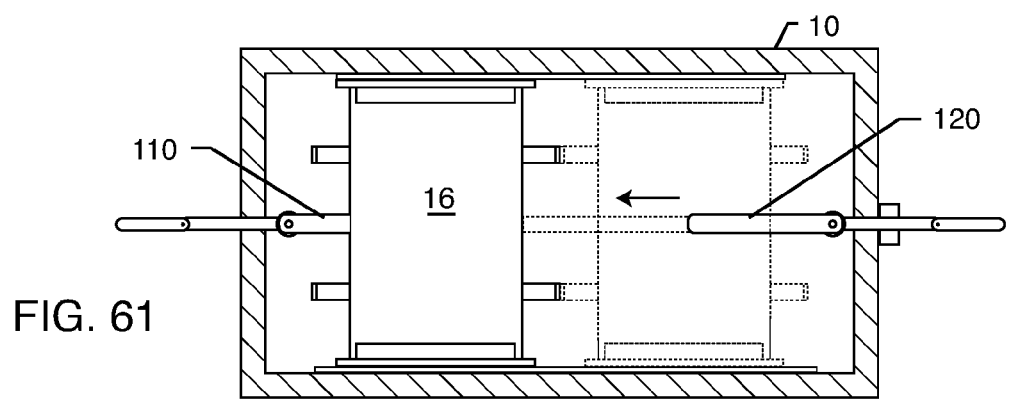
FIG. 61 is a cross-sectional view taken generally along line 61-61 of FIG. 59.

The arm 120 then moves into position using the vertical actuator 114, such that it rests between the two bottommost storage units 16, as illustrated in FIG. 56. The rod 124 pushes the lowermost storage unit from space S6 into space S7 in the first end column, as illustrated in FIGS. 56-59. In FIGS. 56-58, FIG. 58 illustrates an intermediate step in the movement of the handle, levers and arms, with FIG. 56 illustrating an initial and end position of these structures.

Figure 62:
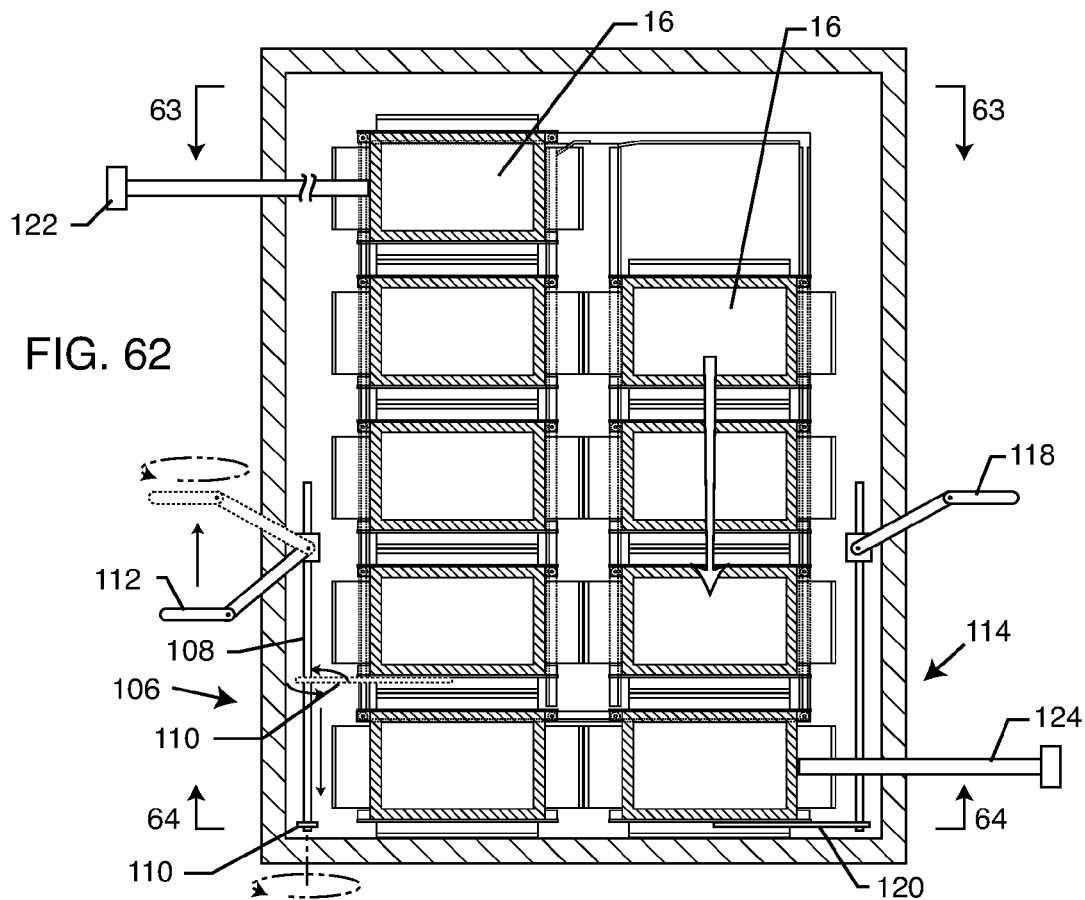
FIG. 62 is a diagrammatic view of the storage system, illustrating the lowering of the second column of storage units.
Figure 63:
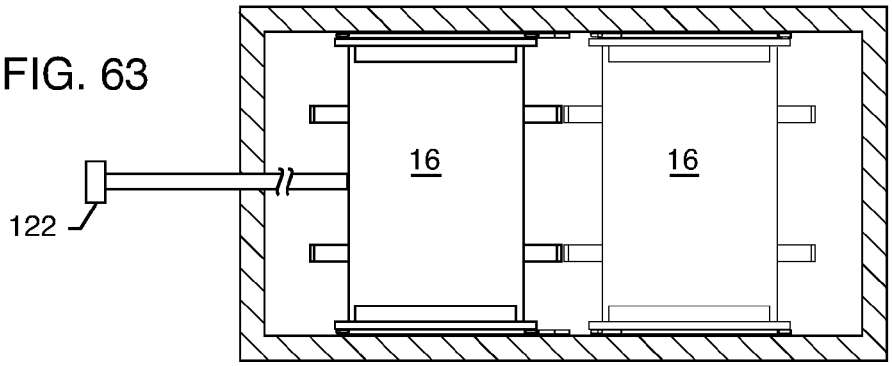
FIG. 63 is a cross-sectional view taken generally along line 63-63 of FIG. 62.
Figure 64:
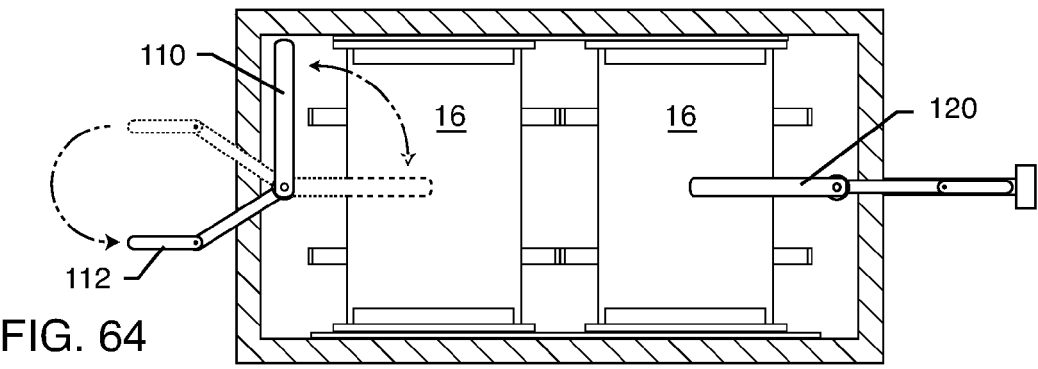
FIG. 64 is a cross-sectional view taken generally along line 64-64 of FIG. 62, illustrating placement of the swing arms.

The rod 124 then retracts away from the track system and the second end column to lower the four stacked storage units 16 to create a vacancy in space S2, as illustrated in FIG. 62. Thereafter, the arm 110 pivots, such as by rotating the rod 108 using the lever 112, from the bottom of the second of the lowest stacked storage unit into a rest position, as illustrated in FIGS. 62 and 64. The sequence then repeats as necessary until the desired storage unit is accessible.

Figure 65:
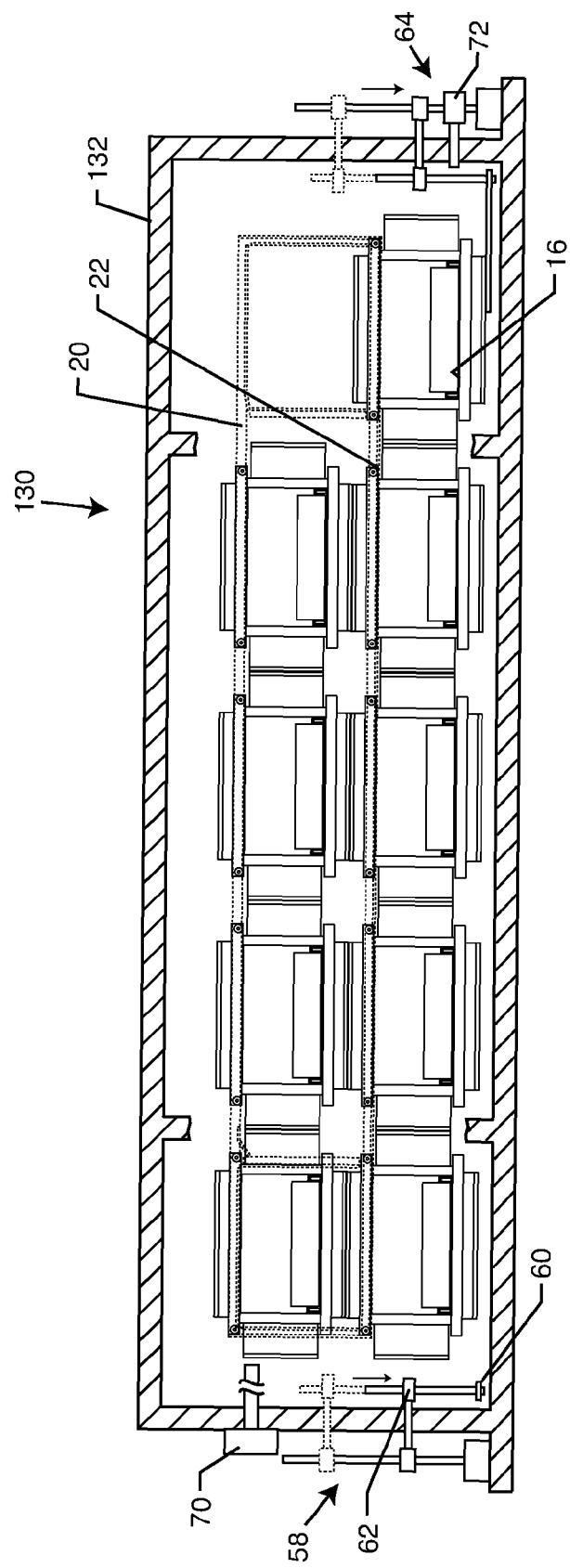
FIG. 65 is a diagrammatic view of a horizontal storage system having two rows of storage units.

In FIGS. 1-64, the system was described as primarily having two adjacent vertical columns. But, a person of ordinary skill in the art will readily understand that this is not the only configuration of the system. For example, with reference to FIG. 65, a horizontal system 130 is shown having two horizontal rows of storage units 16. The storage units 16 may be similar in configuration as described above, and partially supported and slidably movable along tracks 20 and 22. However, in this case, there are only two rows of storage units 16 with a plurality of storage units (in this case five) horizontally aligned. The storage units 16 may be contained within a counter or filing cabinet 132. This configuration is particularly adapted and designed for office drawer systems wherein elongated rows of drawers with a relatively low table or counter space are found. Such applications can also be found in other settings, such as the kitchen where an elongated and relatively low counter is present. The vertical actuators 58 and 64 and the horizontal actuators 70 and 72 are used in a similar manner as described above with respect to FIG. 35 to rotate the storage units 16 to the desired position for access by the end user. The two end columns (in this case only two storage units 16 in height) are lifted, supported, and moved as discussed above. The difference being that instead of a storage unit 16 moving from one vertical column to an adjacent column, the storage unit 16 is moved into a horizontal row of storage units until it is positioned in one of the four corners comprising the vertical columns, as illustrated.

Figure 66:
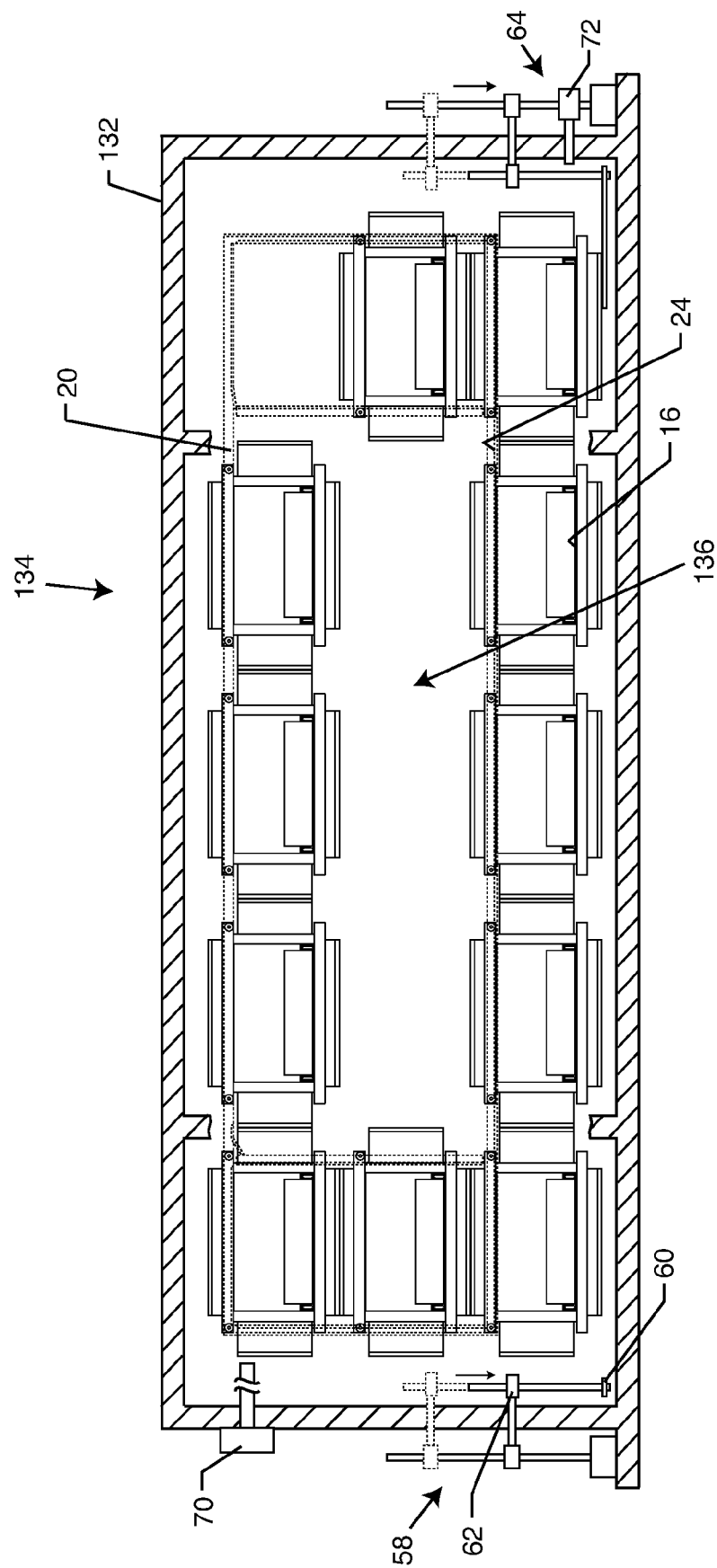
FIG. 66 is a diagrammatic view of an alternative horizontal storage system having three stacked storage units at opposite end columns.

With reference now to FIG. 66, an alternative storage system 134 is shown wherein it will be appreciated that the end columns need not be restricted to two drawers in height. Instead, three or more storage units 16 may form the end vertical columns, with the uppermost and lowermost storage unit 16 resting on the horizontal portions of tracks 20 and 24 to form the elongated row of storage units 16, as illustrated in FIG. 66. In this embodiment, a space or cavity 136 exists between the end columns and the upper and lower rows of storage units 16. The space or cavity 136 is versatile and may be used for storage or to house wiring, an appliance, or other items that are not easily removable, and which must have the alternative storage system 134 built around it. Using an example of a kitchen, the individual storage units 16 can store condiments and other food items. The cavity 136 between the storage units 16 can be a counter or work space, or additional slide-out drawers or the like which house frequently accessed items such as spoons, bowls, etc.

The contents of the individual storage units 16 may be tracked, such as using bar code symbols or the like, so that the contents of any given storage unit 16 are readily ascertainable. A user may access a keypad or electronic interface to determine in which storage unit a given object is located. Alternatively, the user may automatically move a given storage unit 16 into the desired location by inputting its assigned number, scanning a bar code from a product, etc.

Figure 67:
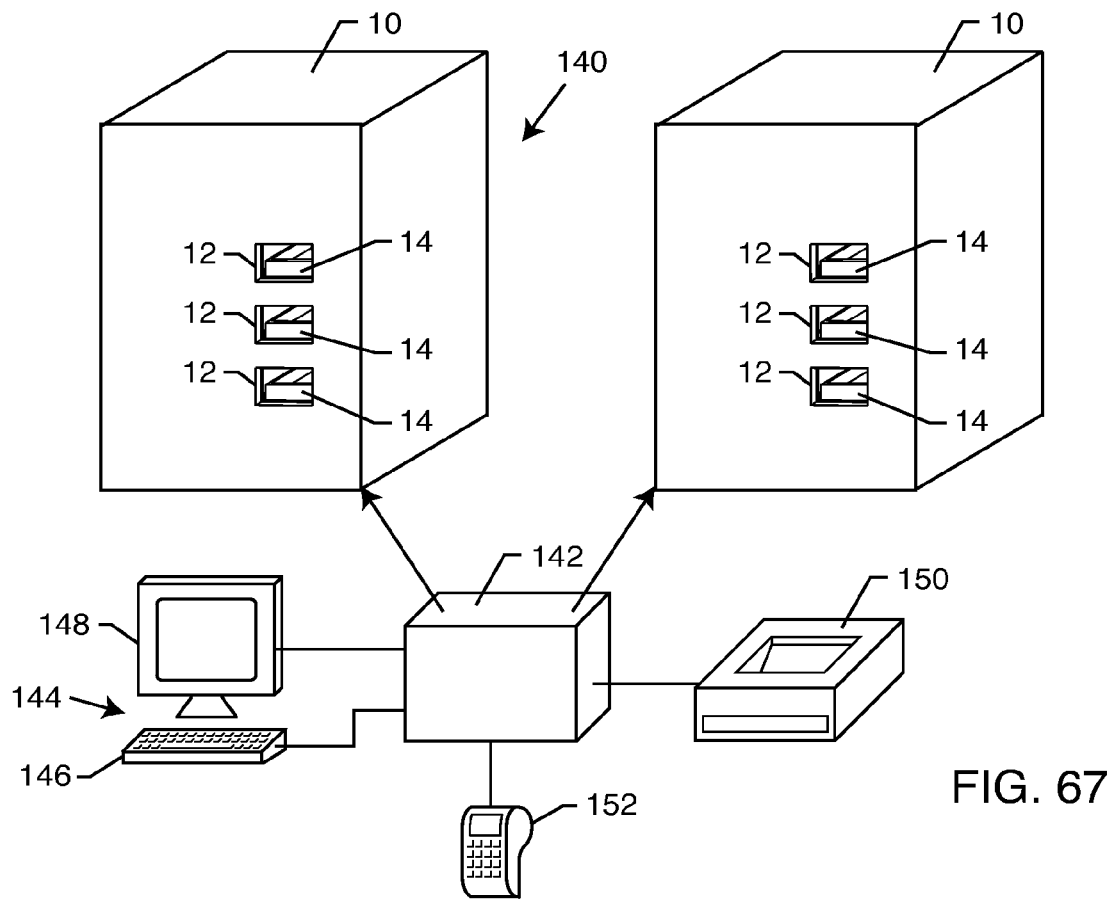
FIG. 67 is a perspective view of an inventory control system for use with one or more storage modules.

To more efficiently store and retrieve items, the above-described storage and retrieval system may further be used in association with an inventory control system 140. With reference to FIG. 67, the inventory control system 140 operationally controls one or more of the storage modules (e.g. in the form of the upright box structures 10 described above) with controller 142, similar to the controller 18 and the control module 76 described above. The controller 142 may mount to the structure(s) 10, a wall, or mount to a location in another room. Alternatively, the controller 142 may be in the form of a wireless controller. As described above, each box structure 10 has a continuous track and a plurality of individual storage units 16 stacked in multiple columns. Each storage unit 16 is engaged with the track for selective movement along the track. The box structures 10 may be in the same room, placed in different rooms or even in different buildings (e.g., one box structure 10 in a house and another box structure 10 in a detached garage, guest house, pool house or the like). One of the upright box structures 10 may be refrigerated or contain one or more individually refrigerated storage units 16. The controller 142 is operationally connected (i.e., electrically, mechanically, wirelessly, and/or electronically) to a user interface 144 (e.g., keyboard and/or keypad 146, a display or monitor 148 or the like), and a printer 150. The controller 142 associated with the box structure(s) 10 is operationally connected to and/or includes a mechanism 152 for inputting object information, including storage unit placement, associated with a particular item 56. The controller 142 may be built into a portable electronic device such as a personal digital assistant (PDA) or a cell phone. The controller 142 allows a user to determine whether or not an object (i.e., an item 56) is in a storage location (i.e., within a home, office; box structure 10 within the home or office, the storage unit 16, etc.); in which part of the storage location the object is located (i.e., which room the box structure 10 is located in); and find the object no matter where the object is stored (i.e., provide a searchable inventory database that provides object information as well as the location where the object is stored). The inventory control system 140 can use pre-existing object information to associate that object with a particular location as well as associate certain information with an object to identify that object and its location. The controller 142 is adapted to receive and store object information from all the structures 10 that are part of the inventory control system 140.

Figure 68:
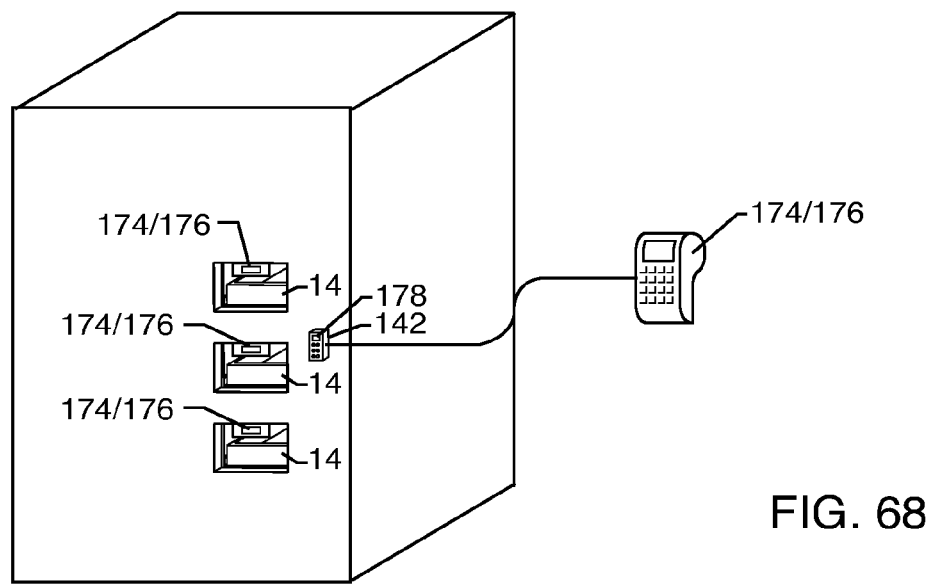
FIG. 68 is a perspective view of a storage module using data readers.
Figure 69:
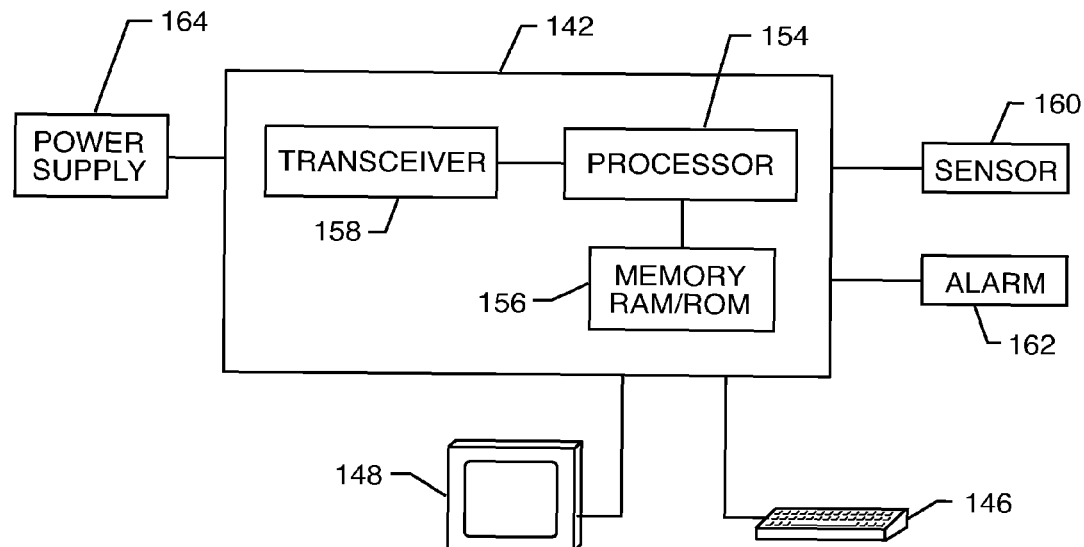
FIG. 69 is a diagram illustrating connections between a control unit and various devices of the inventory control system.

With reference now to FIGS. 68 and 69, the controller 142 includes control circuitry that performs the functions described with respect to the controller 18 and the control module 76. The controller 142 includes a digital computer including, without limitation, a processor 154, a memory 156 (including RAM and ROM) operationally connected to the processor, and a transceiver 158 for allowing the controller 142 to communicate with the upright box structure(s) 10. The controller 142 may be operationally connected to a number of sensors 160 (temperature sensors, movement sensors, humidity sensors) and at least one audio alarm 162. A power supply 164 is connected to the controller 142 and the box structure(s) 10.

The processor 154 receives the object information associated with a particular item 56 from the inputting mechanism 152, and stores the object information in the memory 156 for user access therefrom via the user interface 144. In a preferred embodiment, the inputting mechanism 152 comprises at least one data reader adapted to read machine readable codes associated with the items 56. However, the inputting means can also comprise the keyboard/keypad 146, or other inputting means.

The controller 142 coordinates and controls the functions of the box structure(s) 10 (including the temperature of refrigerated storage units 16), the printer 150, the user interface 144 and the data reader 152. The processor 154 of the controller 142 coordinates movement of the storage units 16 and the items 56 associated therewith. The processor 154 is adapted to provide an inventory of the items 56 in the storage units 16 of the box structure(s) 10 as well as to review object information to determine if an expiration date has been exceeded.

The user interface 144 allows a user to program and operate the inventory control system 140. The user interface 144 is adapted to access information about a particular item, search for a particular item using one or more pieces of information about the item 56, locate a particular item 56 within the structure 10, and input information about a particular item 56 into the memory 156. In addition to the keypad or keyboard 146, the user interface 144 may also include, without limitation, knobs, dials, switches, buttons or the like. The display 148 provides a user with a graphical user interface, liquid crystal display or the like. A computer mouse, light pen or stylus may be used in conjunction with the user interface 144. A computer program stored within the memory 156 includes at least one program, executed by the processor 154, which operates the various functions including, without limitation, control, monitoring, and printing functions, when the processor 154 receives electrical signals from the user interface 144 and/or identification information based on a barcode scan or RFID scan from the data reader 152. The information may be input manually by keyboard 146 to the inventory control system 140 as well via a graphical user interface 148.

Figure 70:
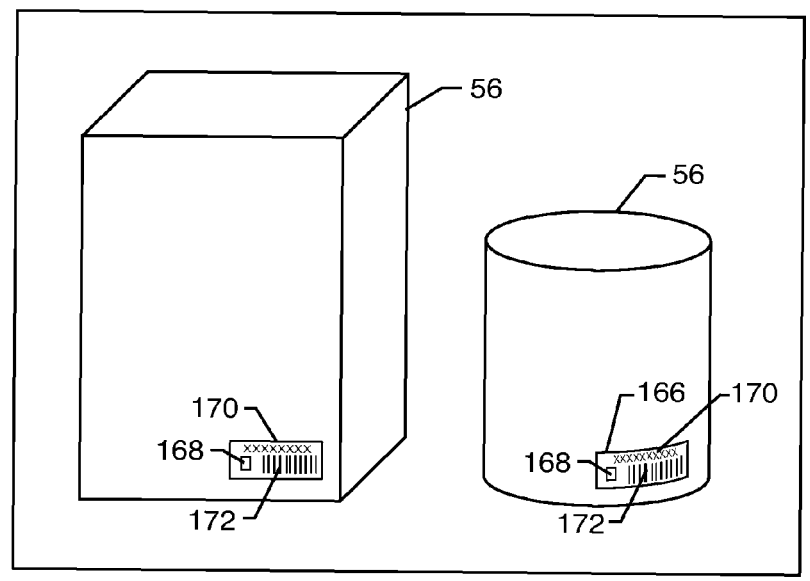
FIG. 70 is a perspective view of labeled objects for storage within a storage unit of a storage module.

The printer 150 is for printing human and machine readable indicia on a label 166 for attachment to an item 56, as seen in FIG. 70. The printer 150 is electrically, electronically, wirelessly and/or mechanically connected to the controller 142. The printer 150 may be built into the box structure 10. The printer 150 may be selected from one of several types, including impact printers (e.g., dot matrix, typewriter-like imprint), ion deposition printers, ink jet printers, laser printers, direct thermal printers, and thermal transfer printers. Alternatively, identification information may also be printed directly on the items 56 by laser etching. If direct thermal printing is used, an imaging coating must be provided on any label 166 to be attached to an item 56. The label 166 may include an adhesive surface that allows the label 166 to be attached to the item 56. Information, including but not limited to identifying data (e.g., description of the item 56), expiration dates, etc., may be placed on the label 166 prior to the label 166 being applied to the item 56. The label 166 may also have an RFID inlet or receiver (i.e., chip & antenna) 168 attached, with the information about the item 56 also written to the RFID inlet 168 as well as on the label 166 attached to the side of the item 56. Alternatively, the RFID inlet 168 may be attached to the item 56, either by being embedded within the item 56 or attached to the item 56 by an adhesive or the like either prior to or after the identifying data and the like are imparted to the RFID inlet 168. The item 56 may have had a pre-existing RFID inlet 168 as the RFID inlet 168 may be embedded within a label of a grocery item during the manufacture of the label, just as a UPC number is printed on the label. Identifying data and the like of the item 56 may be written to the RFID inlet 168 on the label 166 either prior to or after the label 166 is attached to the item 56. Human and machine readable text includes, but is not limited to, text indicia 170, bar code indicia 172 (including, but not limited to UPC number), graphical indicia or the like.

At least one software program is stored in the memory 156 to be operated on by the processor 154 within the controller 142. This program may include a first sub-routine for operating the user interface 144. The program may also include a second sub-routine for printing information on the label 166 to be attached to an item 56. The program may further include a third sub-routine for receiving information transmitted to the controller 142 via RFID or barcode reader technology. A data reader 152 including, but not limited to, bar code readers/laser scanners 174 and RFID readers 176 is electrically, electronically, and mechanically connected to the controller 142 such that the reader 152 is able to scan the barcode 172 or the RFID inlet 168 associated with a particular item 56 so that the information can be stored in the memory 156 of the controller 142. Information relating to that particular barcode 172 or RFID inlet 168 may have already been downloaded to the controller 142 which is then able to correlate the scanned barcode 172 or the RFID inlet 168 with particular information relating to the item 56, such as how many identical items 56 are already in one or more storage units 16. The controller 142 can differentiate otherwise identical items 56 by differing expiration dates. A sub-routine may be dedicated to monitoring whether the expiration dates of various items 56 in the storage units 16 have been exceeded. Another sub-routine may be dedicated to creating an inventory of all items 56 held within the storage units 16. The controller 142 may include a sub-routine for associating a particular scanned barcode 172 or RFID transmitted information with a particular item 56 that the controller 142 then directs the printer 150 to print out a label containing that particular barcode on a label 166 for attachment to that item 56. For example, this would allow a user to scan in the barcode on a tag attached to a newly purchased shirt which will soon have that tag removed. After the shirt has been worn and cleaned, the user can then create a label 166 having that identifying barcode, attach the label 166 to the shirt and then store the shirt in a storage unit 16. The controller 142 includes a sub-routine that allows a user to input information that will later be printed onto a label 166 or read onto an RFID inlet 168 for attachment to an item 56. The processor 154 also includes a sub-routine that provides (via the printer 150, the user interface 144 or the like) an inventory of the items 56 in the structure(s) 10.

There may be mutual communication between the data reader 152 and the controller 142. Initially, the circuitry of the reader 152 is programmed to provide identifying and other information and the controller 142 is capable of eliciting such information from the circuitry of the reader 152. The identifying data may include the name of the item 56, size of the item 56 (e.g., one liter bottle), etc. The controller 142 may then use the printer 150 to print this data on the label 166 for the item 56 at any time during the process, including printing the name of the item 56 on the label 166 in barcode form or printing the expiration date, name, etc. of the item 56 on the label 166. In a read/write configuration of the circuitry of the controller 142, the reader 152 may also impart information to, alter information on, or delete information from the controller 142. Likewise, the controller 142 is capable of providing identifying and other information to the RFID circuitry of a particular item 56.

The controller 142 may also include a built-in user interface 178 which includes a display (such as a liquid crystal display), a thumb print reader, alpha-numeric keypad, and/or various knobs, switches, and controls used to activate/operate the structure(s) 10. The display of the interface 178 could employ touch screen technology that would eliminate the need for physical switches, keypads, or the like.

As outlined above, a number of sensors 160 are associated with the processor 154 and distributed throughout the interior of the structure(s) 10 to determine conditions (e.g., temperature, movement, humidity, etc.) within the structure(s) 10. The sensors 160 are associated with the track within the structure(s) 10, actuators, and individual storage units 16. Upon detection by one or more sensors 160 of any unauthorized entry of the structure(s) 10 (such as a hand or other object reaching into the structure(s) 10, pulling on the storage unit(s) 16, forcing a storage unit 16 along the track, etc.), a sub-routine run by the processor 154 performs at least one security function. These security functions include sounding an audio alarm via the alarm 162, displaying a graphical alarm via the display 148, and preventing movement of storage units 16 within the structure(s) by shutting off the actuators that move storage units 16 within the structure(s) 10. The processor 154 can send an email alert to a user via the Internet that informs the user of the security situation. A sub-routine run by the processor 154 also monitors and controls temperature within a number of the refrigerated storage units 16 to prevent spoilage of items 56 therein. In the event the processor 154 is unable to maintain temperature within one or more of the refrigerated storage units 16 within an acceptable range, the processor 154 will perform one or more of the security functions described above, including alerting a user to the spoilage situation.

In use, information may be conveyed to the controller 142 before an item or object is placed into the structure(s) 10. Identification information may be conveyed in several ways including, but not limited to, direct input from a user, a bar code assigned to and/or printed on a item 56 that can be read by a data reader 152 operationally connected to the controller 142, and an RFID transport medium on the item 52 that can be read by the controller 142.

The process of entering information which can be pre-printed on the item(s) 56 can begin when the item(s) 56 are brought into a location containing the structure(s) 10. A user can scan the item(s) 56 with the data reader 152 or use the user interface 144 to manually enter the item(s) 56 into the system 140. The data reader 152, 174, 176 may be positioned within the structure 10, near an upper portion of an opening 12 to the storage unit 16, above the drawer 14 so as to scan the item 56 as the item 56 is placed in the drawer 14 of the storage unit 16. Identification and other object information may be downloaded or written to the controller 142 using various technologies including, but not limited to, bar code and RFID technology. The controller 142 can be part of the structure 10 or function as a standalone unit that does not need to be networked or connected to an IS system located within the home or any other system whereby information may be conveyed to the controller 142. The information obtained by the scan or manually input by the user is stored within the controller 142 and may then be imprinted on the label 166 to be attached to the item and/or written to the RFID chip attached to the item 56, either directly or as part of the label 166. Alternatively, the controller 142 may be networked to the home inventory control system from which the controller 142 can receive constant updates of information, such as power supply.

The item 56 to be stored, depending on its size, will be placed in a storage unit 16 large enough to accommodate its size or, if the item 56 is a perishable item, will be placed in a refrigerated storage unit 16. The label 166, if one is needed, may be affixed to the item 56 after the object information data is transferred to the label 166. The object information can be transferred to the item 56 in a number of ways including, without limitation, by printing human readable text (i.e., alpha-numeric lettering) on the label 166 of the item 56, printing machine readable text (e.g., bar code) on the label 166 of the item 56 or by transmission to the RFID inlet 168 attached to the item 56. Any commercially available RFID chip may be used, including, for example, Hitachi Corporation's mu-chip which is wireless accessible at 2.4-2.45 GHz, can store up to 128 bits of data, and at 0.4 mm square is thin enough to be embedded in a label attached to the item 56 or within a part of the item 56. An antenna for receiving incoming data is connected to the RFID chip.

It is well known to those skilled in the art that RFID circuitry of the type under discussion is provided in a plurality of configurations; for example, read only, read/write, passive, and active. The read only provides previously installed information from the RFID circuit through a compatible reader. The read/write circuit permits the reader to install or alter information stored in the circuit. The passive circuit is one which depends for activation and operating power upon the signal emitted by the reader while the active circuit includes a battery or other internal power source which may be activated by the signal from the reader.

The controller 142 may be powered by an outside source (e.g., a power cord connecting the controller 142 to a wall socket, the electrical system of the structure 10 or the like) or by a battery located within the controller 142. The user interface 144, data reader 152 and/or the printer 150 may be powered in similar fashion. The battery may be a rechargeable battery that is rechargeable while still within the controller 142 by connecting the controller 142 to an outside power source 164.

The controller 142 can come in various forms including, but not limited to, being a part of the structure 10, a personal computer, central server, handheld device, etc. that is electronically, electrically and/or mechanically connected to the structure 10 either by cables, RFID or wireless technology.

In the alternative, the identification and other object information of the item 56 may be downloaded and/or written to a home central server at the time the item 56 is brought into the home either by scanning the item 56 or manually entering the information into the central server which is controlling the structure(s) 10 within the home. The home central server may contain a database of all identification and other information of every item 56 brought into the home where the identification and other object information of the item 56 have been entered into the server. This central server could be linked with other homes owned by the user, city or nationwide, to share data in order to maintain an inventory of all items 56 stored by the user in those locations. In this situation, the data file stored on the RFID chip on an item's label 166 is also stored in the home's central server so that the information may be referred to at a later time. In the alternative, additional information can be stored by including a digital photo of the item 56. This photo could be taken by a digital camera and the information then stored within the home central server. The photo could also be printed on the item's label 166. This would further facilitate identification of stored items 56 for insurance purposes in the event of a disaster as the stored photo provides a visual record of an item 56 that may have been destroyed. This would also allow the digital photo to be displayed on the display 148 forming part of the user interface 144 connected to the controller 142. The display 148 allows the information of the item 56 to be displayed as well as the digital photo of the item 56.

In another alternative, networking capabilities could be added to the controller 142 that would allow the controller 142 to use an always-on wireless method to enable the controller 142 to be in constant communication with the home's central server.

Figure 71:
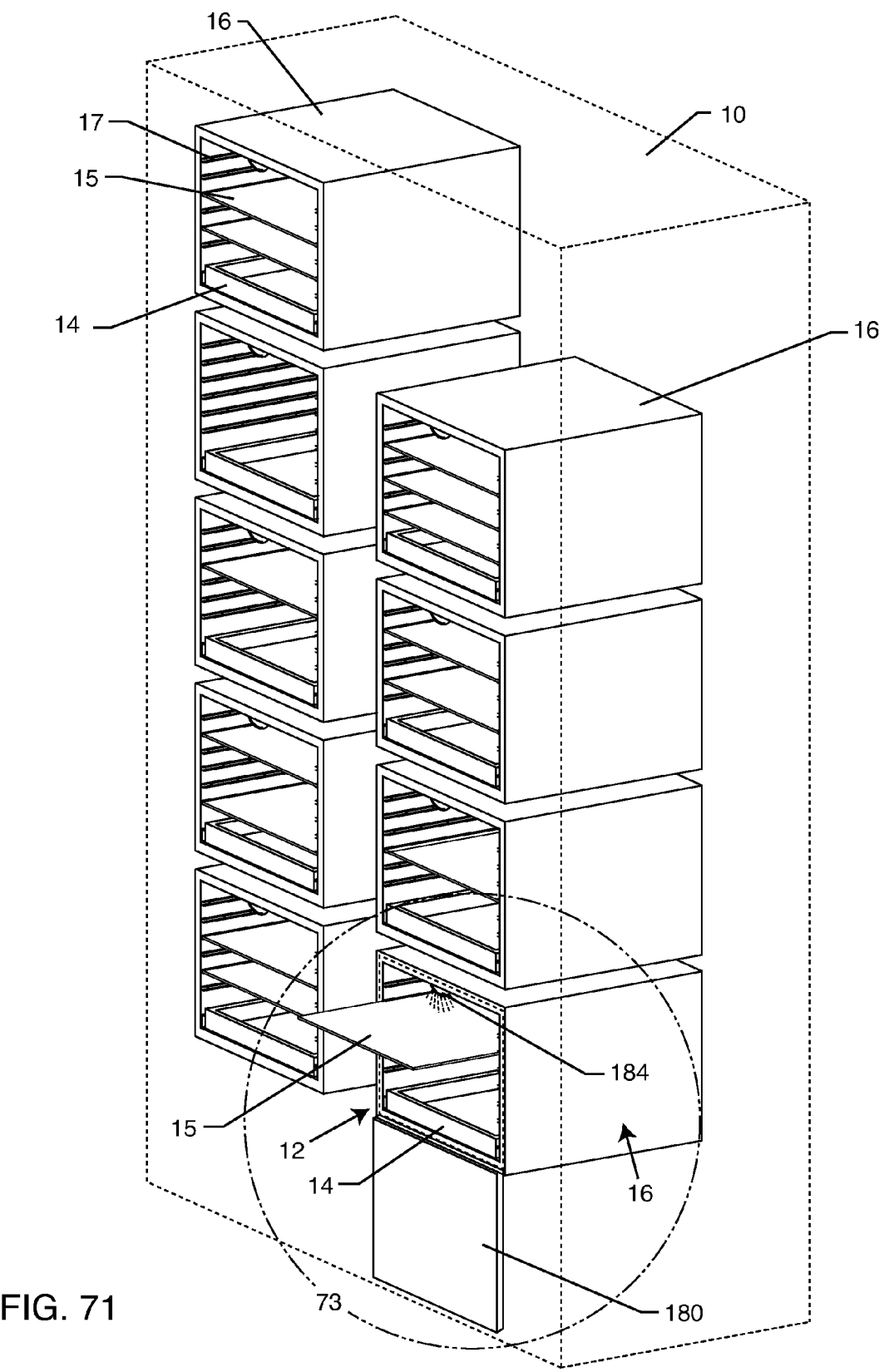
FIG. 71 is a front perspective view of a storage and retrieval system encased within a wall or housing, without illustrating the tracks, for purposes of clarification.
Figure 72:
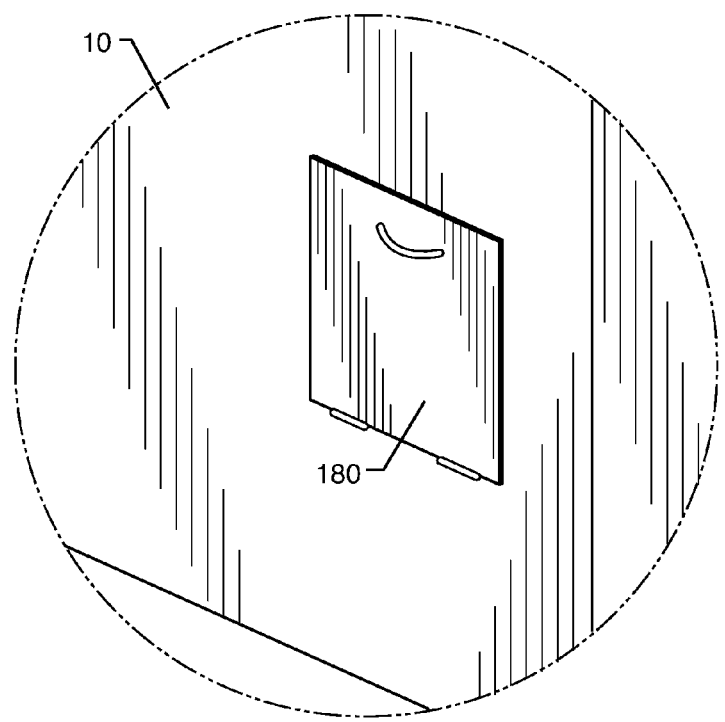
FIG. 72 is an enlarged view of a door in the housing or wall providing access to a storage unit.
Figure 73:
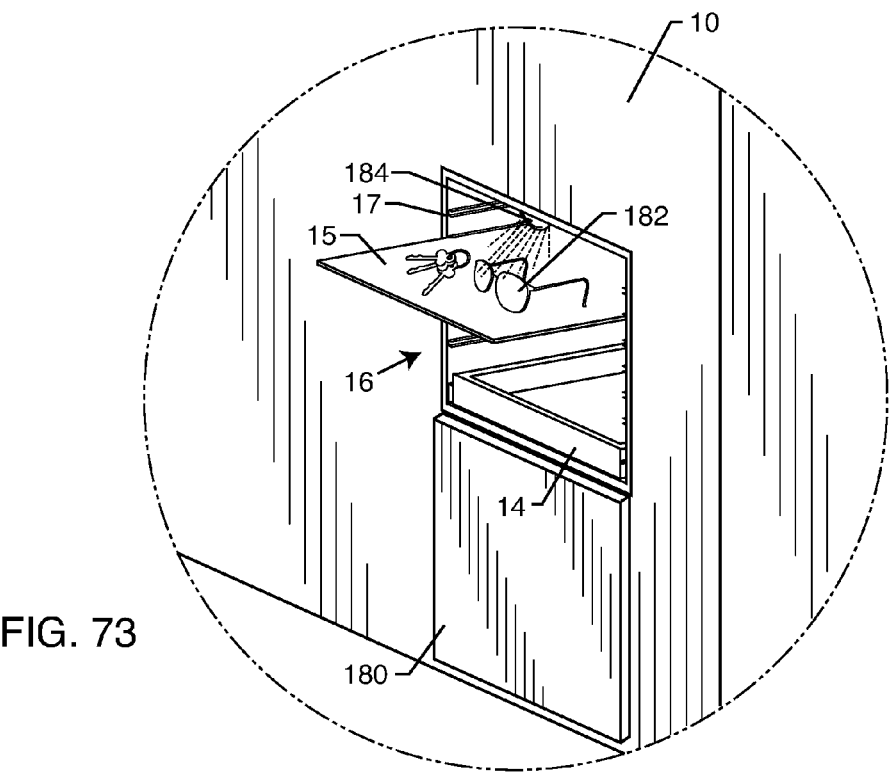
FIG. 73 is an enlarged view of area "73" of FIG. 71, illustrating the retrieval of a desired item from a particular storage unit.
Figure 74:
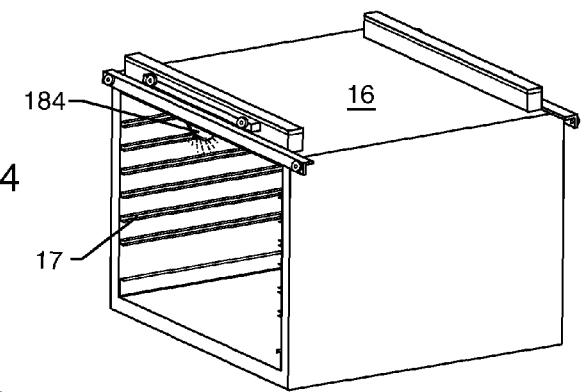
FIG. 74 is a front perspective view of a storage unit for use with the storage and retrieval system.
Figure 75:
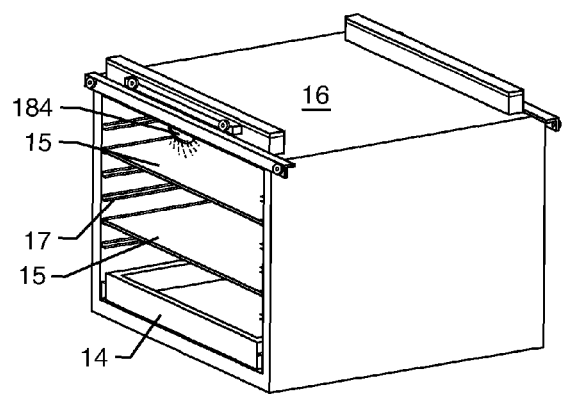
FIG. 75 is a perspective view similar to FIG. 74, but wherein the storage unit has two shelves and a drawer contained therein.
Figure 76:
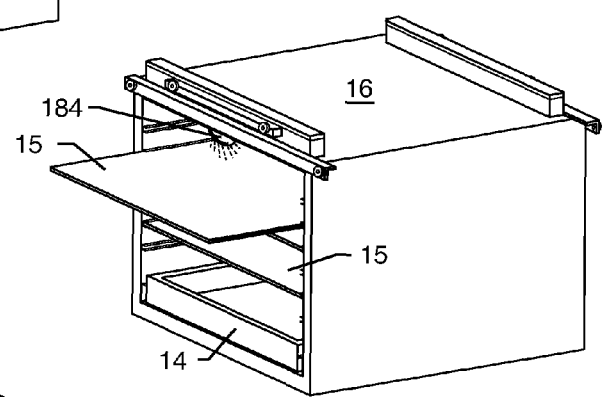
FIG. 76 is a perspective view similar to FIG. 75, illustrating the extension of a shelf having a light shining on at least a portion thereof.
Figure 77:
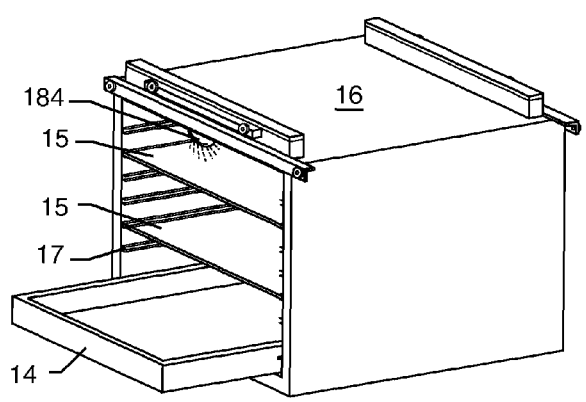
FIG. 77 is a view similar to FIG. 76, but illustrating a drawer of the storage unit extending outwardly.

With reference now to FIGS. 71-73, two columns of a plurality of stacked storage units 16 are illustrated within a structure 10, typically located in a wall space of a house, office or the like. Using the inventory control system 140, as described above, the user selects a drawer or item. The system then automatically moves the storage unit 16 until the desired storage unit having the desired object is disposed in alignment with an opening 12, as described above. It will be appreciated by those skilled in the art that the opening may have a hinged door 180 or the like which must be opened, as illustrated in FIGS. 71 and 73, in order to access the storage unit 16. In a particularly preferred embodiment, the door 180 is capable of opening a full one-hundred-eighty degrees against the side of the wall or the structure 10, so as not to impede access to the storage unit 16, particularly when the user is confined to a wheelchair or the like.

With particular reference to FIG. 73, in a particularly preferred embodiment, the storage unit 16 is capable of holding one or more drawers 14, as well as one or more shelves 15, such as on tracks 17 formed within the storage unit 16. This enables multiple objects to be stored within the storage unit 16, with a drawer 14 or shelf 15 selectively extended, as illustrated in FIG. 73, so as to retrieve the desired object 182. It will be appreciated that the number of drawers 14 and/or shelves 15 depends upon the size and number of objects 182 to be placed within the storage unit 16. In some cases, the storage unit 16 may not include any drawers 14 or shelves 15, the one or more objects merely being placed inside the storage unit 16. However, in other cases, a plurality of drawers 14, a plurality of shelves 15, or a combination thereof, as illustrated in FIGS. 71 and 74-77, can be used.

With particular reference again to FIG. 73, in a particularly preferred embodiment, the inventory control system 140 includes means for locating the position of a particular item in a given storage unit 16. An example of such means includes a light 184 which can be used to view the object 182 in the drawer 14 or on the shelf 15. In a particularly preferred embodiment, the light source 184 is moved or selectively illuminated so as to shine directly onto the portion of the drawer 14 or shelf 15 containing the object. For example, the light source 184 may comprise a single light emitting diode (LED), a plurality of LEDs, or a set of LEDs that illuminate a specific portion of the drawer 14 or shelf 15 where the desired object is to be found. The location of the object can be tracked in several ways. This can be done by entering the placement of the object in the drawer 14 or on the shelf 15, such as in a grid pattern. Another option is to use sensors to determine the location of the object 182. For example, the object 182 can be labeled with an RFID chip, and a sensor, such as a sensing grid in the drawer 14 or shelf 15 that can relay the position of the object 182 in the drawer 14 or on the shelf 15, such that light is directed to that area to assist in retrieving the object. It will be appreciated that this can be particularly useful for the elderly or mentally impaired.

Figure 78:
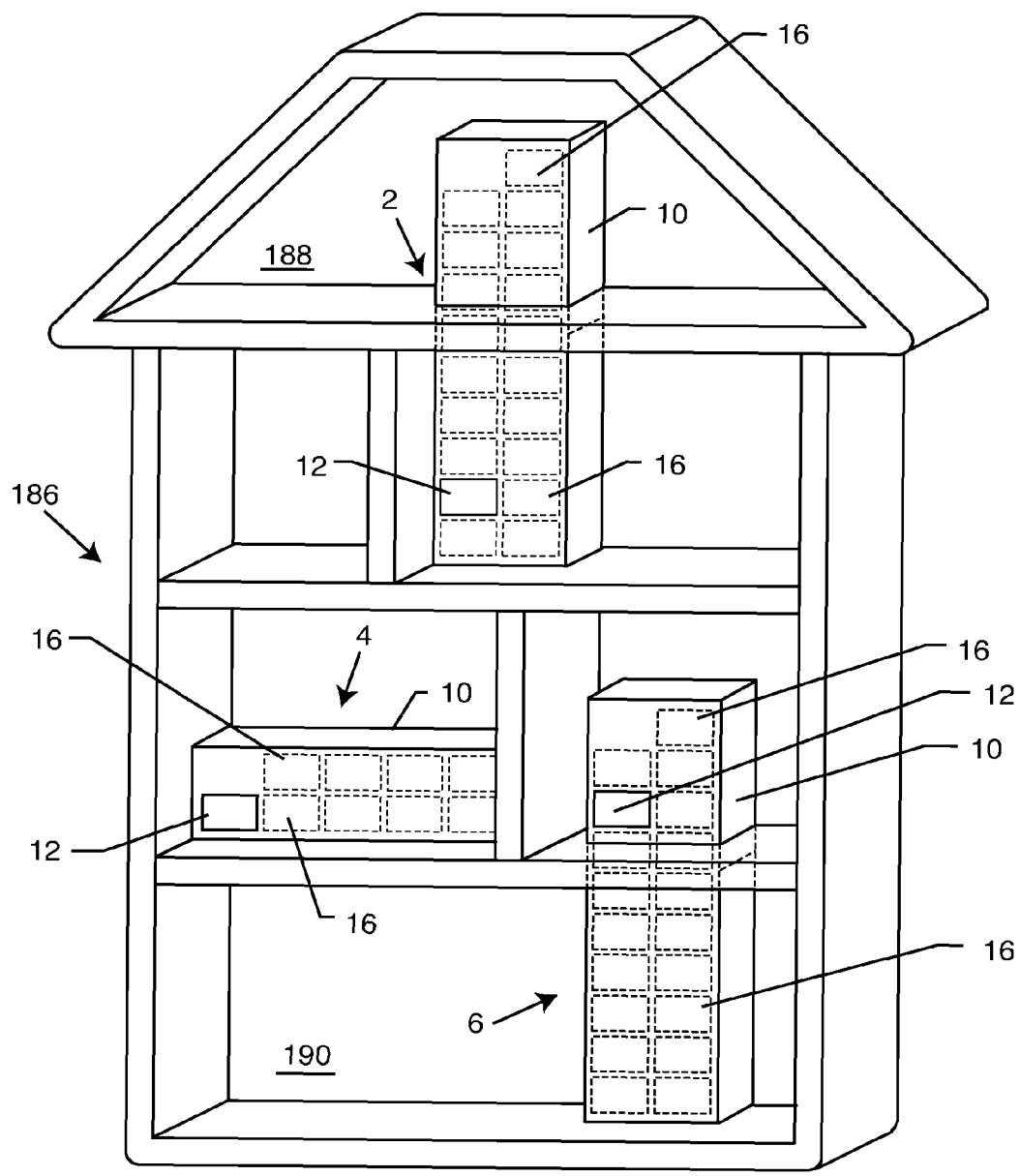
FIG. 78 is a diagrammatic view of a structure having a plurality of storage and retrieval systems operably disposed therein.

With reference now to FIG. 78, a structure 186, representing a residence, an office, or other structure, includes a plurality of systems 2-6. The systems 2-6 are typically built between wall cavities of the structure 186, although they can have a housing structure separate from the walls to have the appearance of a cabinet or the like. It will be appreciated from the drawing that the system can have either a vertical or a horizontal configuration. Moreover, otherwise wasted space, such as in the attic or basement, can be used for storage purposes. For example, the system 2 includes storage units 16 stacked within the structure 10 on the level or floor which include the access point 12, as well as storage units 16 which extend upwardly into an attic 188 portion of the structure 186. Similarly, the system identified by reference number 6 has storage unit 16 extending into a basement 190 of the structure 186. Thus, the otherwise wasted space in the attic 188 or the basement 190 can be used to house the systems 2-6 and the storage units 16 so as to create an effective storage space, while the individual storage units 16 are accessible on the livable and main levels of the structure 186.

With reference now to FIGS. 79-84, a problem encountered with the single track arrangement is that the wheels 38 of the storage unit 16 can fall into the intermediate vertical rails as the storage unit 16 is moved from one end of the track to the opposite end of the track. As described above, the ramps 35, as illustrated in FIG. 3, assist the storage unit 16 from moving between the first vertical set of rails, to the second set of vertical rails. Of course, as shown and described above, this requires that the first set of wheels 38 at a leading edge of the storage unit 16 move from the left intermediate rails 32, past the right intermediate rails 34, and the gap therebetween, and to the far right vertical end rails 30. During this movement, the trailing wheels 38 travel from the far left vertical end rails 28, past the first intermediate rails 32, and into alignment with the second intermediate rails 34, to be disposed in the second vertical track and in the second end column. Notwithstanding the use of the ramps 35, however, there still exists the possibility that the wheels 38 could slip into and become jammed in the intermediate rails 32 or 34.

Figure 83:
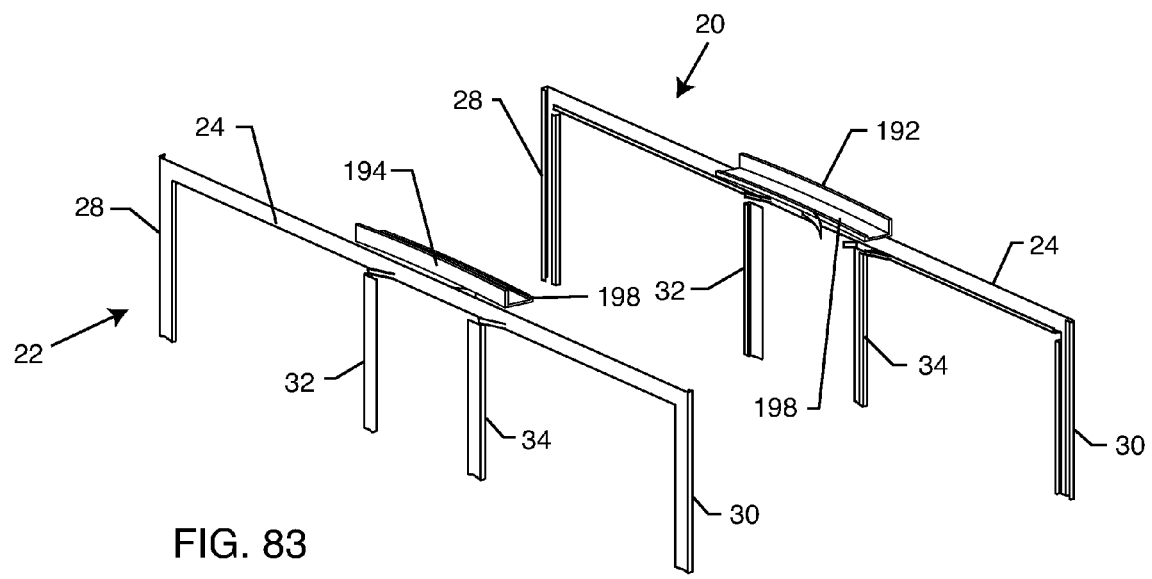
FIG. 83 is a partial perspective view of first and second tracks, each track having a support rail spanning intermediate vertical rails thereof.

Accordingly, first and second support rails 192 and 194 are disposed above the upper rails 24 of the first and second tracks 20 and 22. The upper support rails 192 and 194 have a length at least as long as the gap between intermediate rails 32 and 34, but are shorter in length than the upper rails 24. Also, as illustrated in FIG. 83, the support rails 192 and 194 are preferably bowed somewhat, so as to serve to lift the storage unit 16 as the first set of wheels 38 pass over the gap formed by the intermediate rails 32 and 34.

Figure 84:
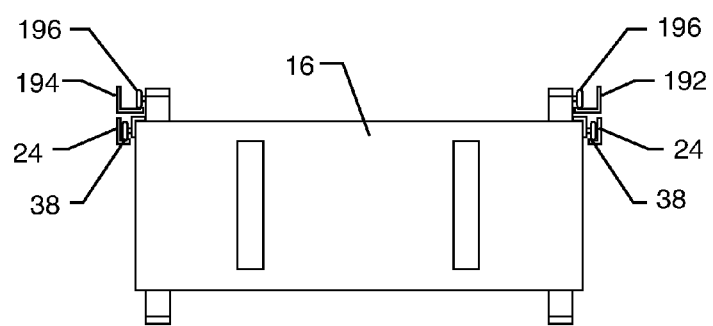
FIG. 84 is a diagrammatic view of a storage unit having its first and second sets of wheels engaging upper rails and support rails.

With reference now to FIGS. 79-81, the storage units 16, in this embodiment, have been modified to include a second set of wheels 196 which are configured and adapted to engage the support rails 192 and 194. More particularly, as illustrated in FIGS. 79 and 80, the second set of wheels 196 are disposed above, and somewhat inwardly, from the main wheels 38. Moreover, as illustrated in FIGS. 81 and 84, the second set of wheels 196 extend outwardly a shorter distance than the main set of wheels 38. This arrangement allows the second set of wheels 196 to clear the upper rail 24 or the lower rail 26 as the storage unit 16 moves upwardly or downwardly in the first or second sets of vertical tracks. As such, the support rails 192 and 194 are either offset from the upper rails 24, or include a lower traveling lift which is somewhat elongated, as illustrated in FIG. 84, so that the second set of wheels 196 can come into engagement therewith and be supported along the lower elongated ledge 198 of the support rail 192 and 194.

With reference now to FIG. 82, two end columns are illustrated without the rails or tracks for purposes of clarity. It will be appreciated that the number of storage units 16 in each column can vary, as well as the fact that there can be additional columns of storage units 16 disposed between the end columns. Nonetheless, an uppermost storage unit 16 in the left end column will need to be moved to an adjacent right column, in this case the far right end column. The means for moving the storage unit 16 have been described above with the use of various actuators.

Figure 85:
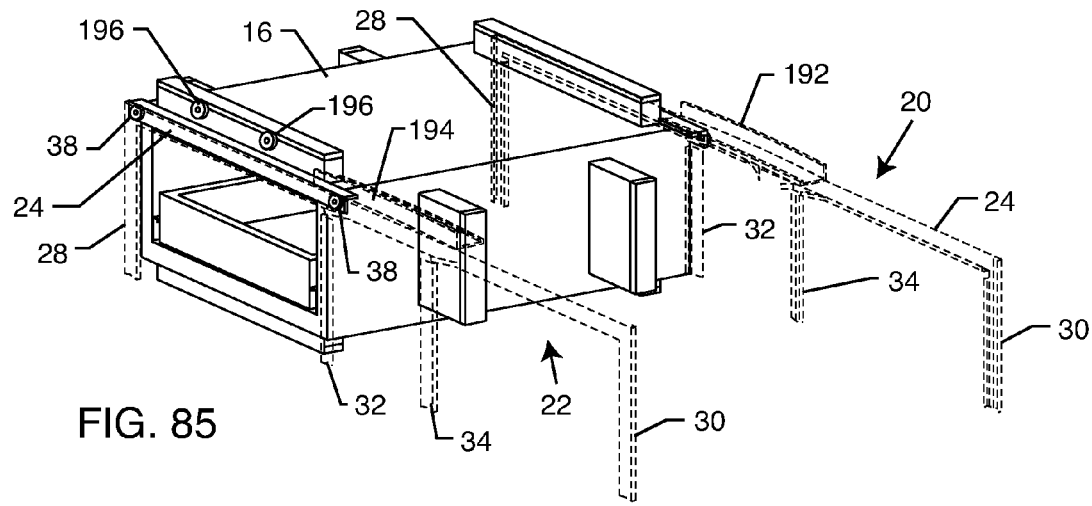
FIG. 85 is a perspective view of a storage unit disposed at a first end of a vertical track of the storage system.
Figure 86:
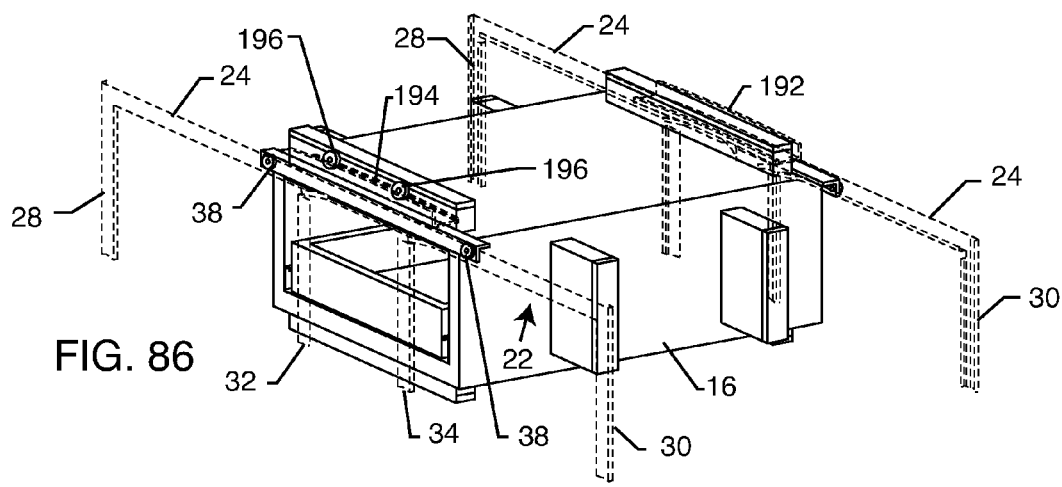
FIG. 86 is a view similar to FIG. 85, illustrating the storage unit's second set of wheels engaging upper support rails as the storage unit passes intermediate vertical rails.
Figure 87:
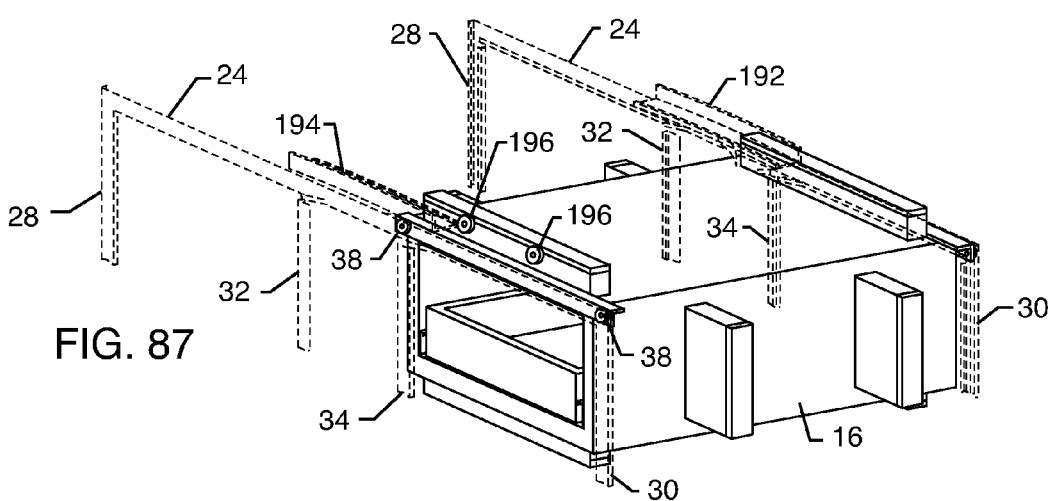
FIG. 87 is a perspective view similar to FIGS. 85 and 86, illustrating the storage unit disposed at an opposite second end of the vertical track of the storage system.
Figure 88:
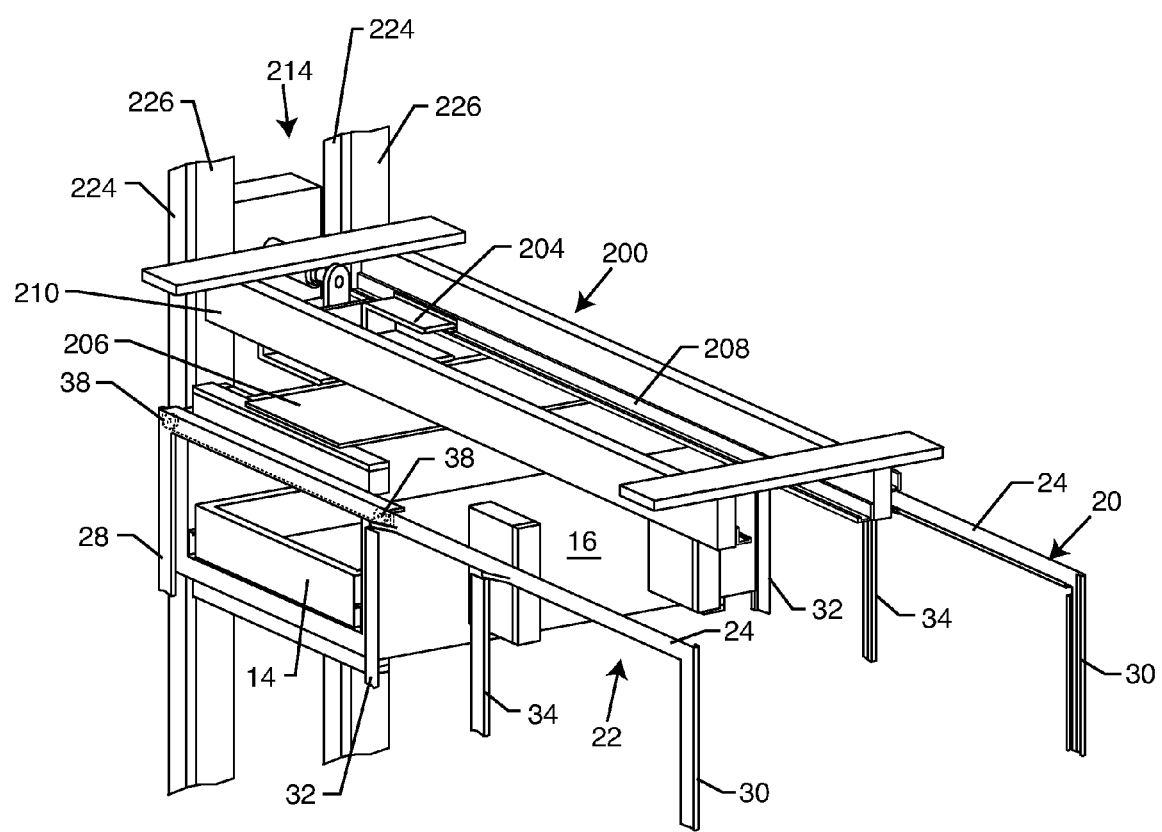
FIG. 88 is a partially fragmented perspective view of a storage and retrieval system incorporating a conveyor apparatus.
Figure 89:
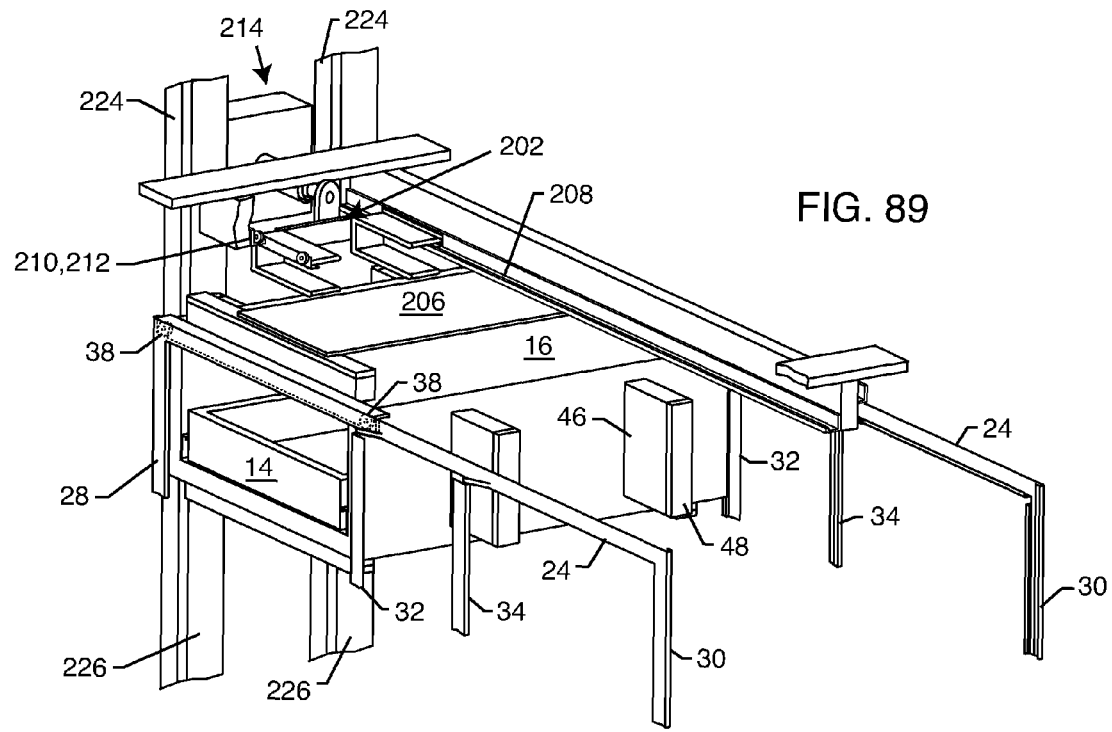
FIG. 89 is a perspective view similar to FIG. 88, but fragmented to show various component parts thereof.

With reference now to FIGS. 85-87, a storage unit 16 disposed at the uppermost position in the far left or first end column is shown moved, such as by the horizontal actuator ram apparatus 70, described above, to the adjacent column, in this case, the far right end column. More particularly, with reference to FIG. 85, the first set of wheels 38 are in engagement with the first end vertical rail 28 and the first intermediate rail 32 of each of the first and second tracks 20 and 22. As the storage unit 16 moves, as illustrated in FIG. 86, the second set of upper wheels 196 come into engagement with the first and second support rails 192 and 194. More particularly, the leading second set of wheels 196 engage the support rails 192 and 194 before the leading main wheels 38 pass over the second inner rail 34. Thus, the storage unit 16 is supported by the second set of wheels 196 on the support rails 192 and 194 as the storage unit 16 passes between the first and second intermediate rails 32 and 34, and the gap therebetween.

With continuing reference to FIGS. 86 and 87, the trailing second set of wheels 196 comes into contact with and rides upon the first and second support rails 192 and 194 before the trailing main wheels 38 come into alignment with the first intermediate rail 32 to prevent the trailing main wheels 38 from falling into the gap thereof and becoming bound. As described above, in a particularly preferred embodiment, the first and second support rails 192 and 194 are slightly bowed so that the main wheels 38 are lifted somewhat from the upper rails 24, particularly when the main wheels 38 are positioned over the intermediate rails 32 and 34. This prevents the main wheels 38 from becoming lodged in the gap thereof. The storage unit 16 is then finally moved to the far end, or second column, wherein the main wheels 38 are in alignment with the second intermediate rail 34 and the second end vertical rails 30, or the second vertical track, to be vertically movable along the length thereof, as described above.

With reference now to FIGS. 88-92, in another embodiment, a conveyor apparatus 200 pulls, and somewhat lifts, the storage unit 16 from the end column to an adjacent column, as illustrated the second end column. More particularly, the conveyor apparatus 200 includes a hook assembly 202 including at least one hook member 204 which is configured and adapted to releasably engage a catch 206 extending from the storage unit 16. In a particularly preferred embodiment, as illustrated, the catch 206 comprises a member extending from a top portion of the storage unit 16, such as a metal or rigid sheet or the like extending across spacers 42 and 44.

Typically, the conveyor apparatus 200 includes a first and second rail 208 and 210 which are disposed above the upper rails 24 of the first and second track 20 and 22 and positioned to engage a set of wheels 212 operably associated and connected to the hook assembly 202. Although the wheels 212 may extend directly from the one or more hooks 204, as illustrated, more typically the hooks 204 are part of a subassembly which extends between the support rails 208 and 210. The wheels 212 are rotatably and operably attached thereof to ride along the rails 208 and 210. Moreover, similar to that described above, in a particularly preferred embodiment the rails 208 and 210 are slightly bowed or curved so as to lift the storage unit 16 over the gaps of the inner rails 32 and 34, so that the first set or main wheels 38 of the storage unit 16 do not become caught therein.

An actuator 214 is operably connected to the hook assembly 202 and adapted to move the hook assembly 202 into engagement with the catch 206 of the storage unit 16 to push, and somewhat lift, the storage unit 16 across the length of the upper rails 24 until the storage unit 16 is disposed in the desired column. In one embodiment, the actuator 214 comprises a telescopic ram 216, having one end thereof attached to the hook assembly 202, and another end thereof operably connected to a power drive or gear box 218, which selectively extends and retracts the ram 216 in a controlled manner.

Figure 90:
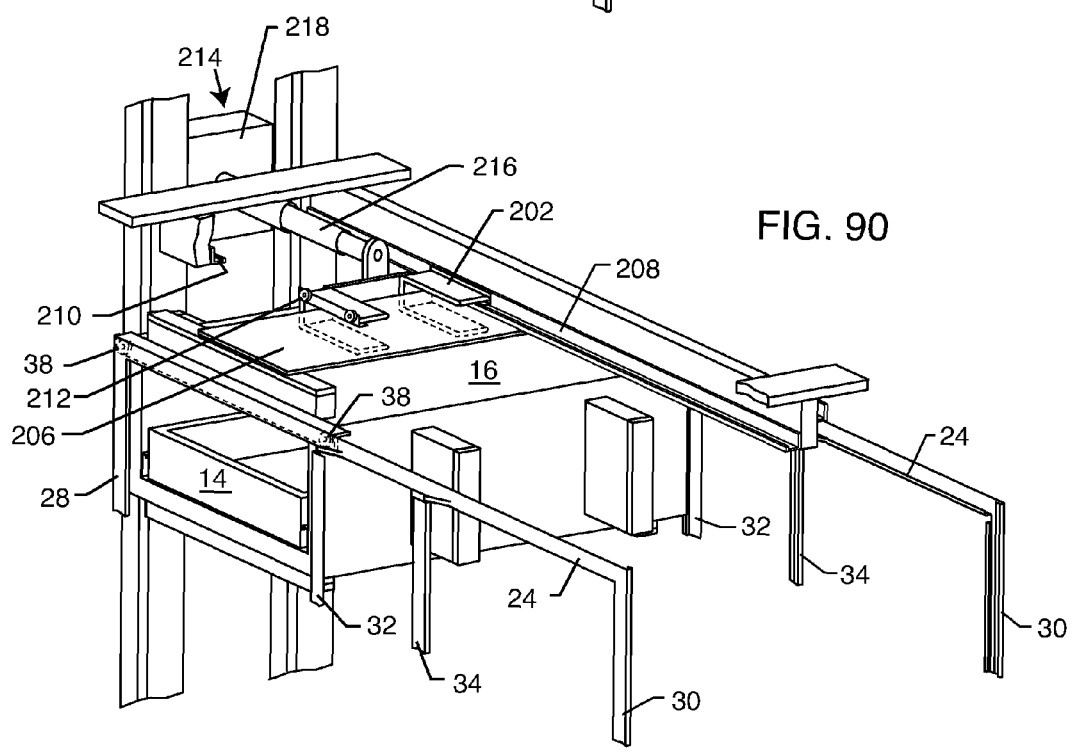
FIG. 90 is a perspective view similar to FIG. 89, but illustrating a hook assembly thereof engaged with a catch of the storage unit.

In FIGS. 88-92, the storage unit 16 is in the first vertical end track with the wheels 38 positioned in the vertical tracks 28 and 32. Here, the storage unit 16 is in the uppermost position of the column of storage units. To move the storage unit 16, the actuator 214 activates and extends the ram 216 outwardly causing the hook assembly 212, and more particularly the one or more hooks 204, to engage the catch 206 of the storage unit 16 (FIG. 90).

As mentioned above, the wheels 212 of the hook assembly 202 are moved along the rails 208 and 210. The main or first set of wheels 38 of the storage unit 16 ride upon the upper rails, or are lifted slightly out of engagement therewith. This prevents the wheels 38 from falling into the inner rail 32 or 34 before the storage unit 16 has been moved to the adjacent column, or the second vertical track in the end column, as illustrated.

Figure 91:
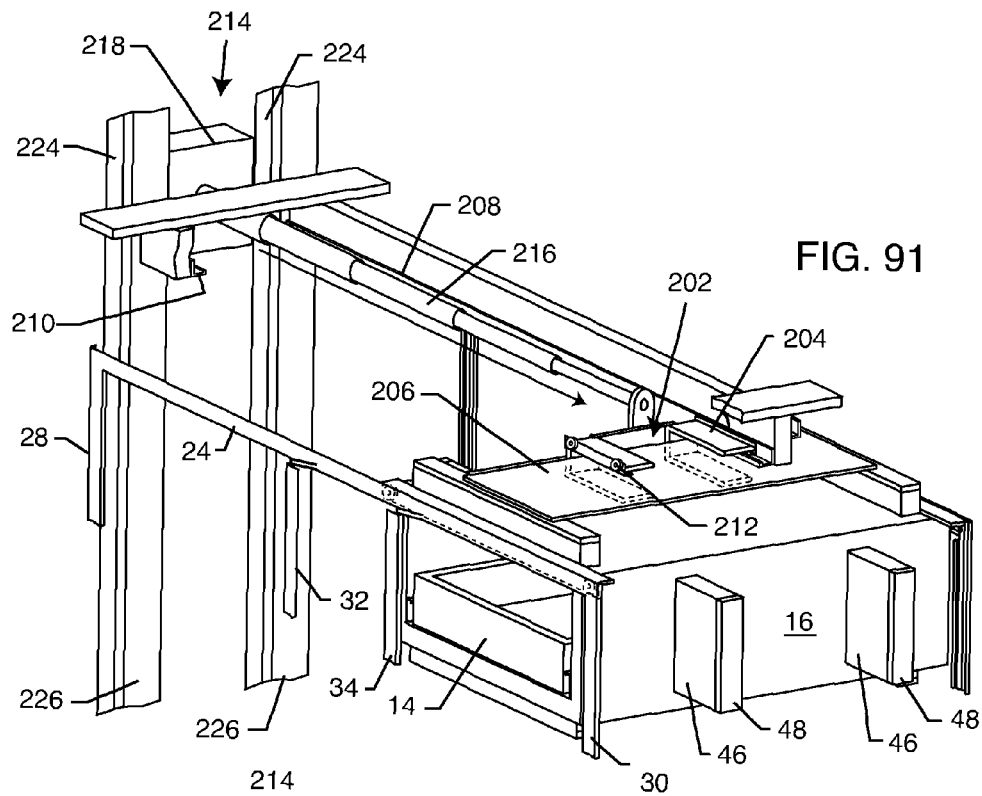
FIG. 91 is a partially fragmented perspective view similar to FIG. 90, but illustrating the storage unit moved from a first vertical track to a second vertical track.
Figure 92:
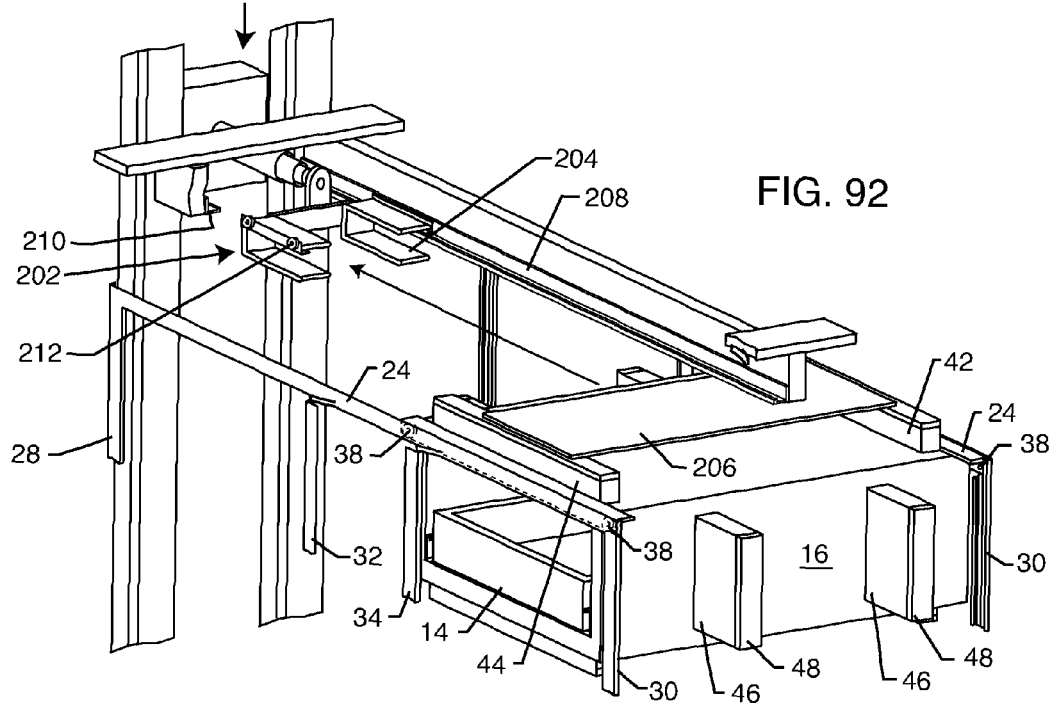
FIG. 92 is a partially fragmented perspective view similar to FIG. 91, but illustrating the retraction of the hook assembly.

In FIGS. 91 and 92, the actuator 214 continues to extend the ram 216 along with the hook assembly 202 and the storage unit 16 until the storage unit 16 is in the proper column, i.e. the far right end column, wherein the wheels 38 align with the rails 30 and 34 of the second vertical track. At this point, the actuator 214 reverses and withdraws the ram 216 to reposition the hook assembly 202 back to its starting point in a reciprocal manner.

FIGS. 93 and 94 illustrate other types of actuators designed to engage the hook assembly 202 with the catch 206 to move the storage unit 16. For example, a worm screw 220 may rotate in a first direction to engage an extension and coupling member 222 of the hook assembly 202. Rotation of the worm screw or drive 220 in a first direction moves the coupling 222, and thus the hook assembly 202 from left to right. Reversing the rotation of the worm screw 220 returns the hook assembly 202 to its original start position.

The storage unit 16 may, particularly when heavy laden with objects, swing somewhat outwardly, particularly when residing in the vertical tracks 28-34. This can present problems in the smooth travel and alignment of the storage units 16 in their various columns. To remedy this drawback, a set of vertical support guides or beams 224 are disposed at opposite ends of the continuous track. FIGS. 88-94 illustrate a first set of such vertical support beams 224 at a first end of the track. A second set of such guides or beams 224 are also positioned at the opposite end of the track. The second set of guides or beams 224 are not illustrated to clarify the operation of the conveyor apparatus 200, disclosed above.

In a particularly preferred embodiment, the support beams or guides 224 are vertical and extend substantially the length of the columns of stacked storage units—that is slightly above the upper rails 24 and slightly below the lower rails 26. The elongated guides or supports 224 typically include a front face material 226 having low friction characteristics, such as Teflon. These Teflon faces 226 come into contact with the Teflon faces of the spacers 46, 48 extending outwardly from each side or end of the storage unit 16. In this manner, as the Teflon faces 226 moves past the spacers 46, 48, there is a relatively low amount of friction which permits the storage units 16 to move vertically downwardly or upwardly as needed. At the same time, the elongated guide members 224 prevent the storage units 16 from pivoting outwardly. It will be appreciated that the Teflon faces 226 can always be in contact with one another when the storage units 16 are in the first and second end columns, or slightly spaced apart from one another such that they only contact when the storage unit 16 moves out of vertical alignment slightly.

FIGS. 95-100 illustrate an alternative embodiment of the inventory control system 140 described above. This inventory control system 140' is designed to track virtually any object, regardless of size, shape, material, etc. The inventory control system 140' is designed to prevent any object from being lost, ever. Importantly, the modified inventory control system 140' can locate objects stored within or outside of the storage and retrieval system described above. Each of these embodiments will be described in more detail below.

Figure 95:
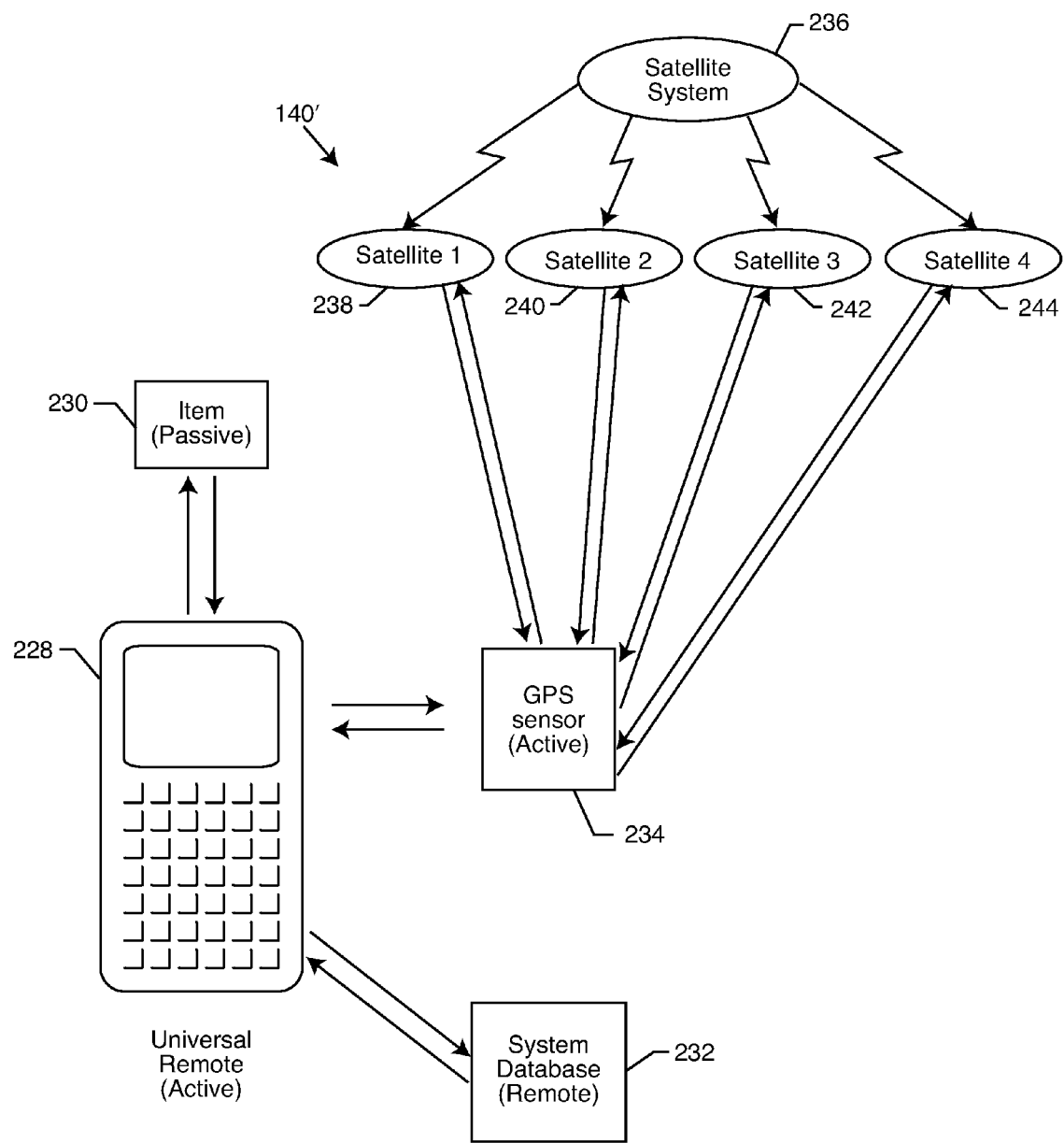
FIG. 95 is a diagram illustrating operation of the inventory control system.

FIG. 95 illustrates communication of numerous devices that operate the inventory control system 140'. The important aspect of the inventory control system 140' is the capability of identifying and locating virtually any item. In the preferred embodiment, a universal remote 228 scans a passive item 230 for storage within a database 232. The universal remote 228 preferably comprises a cell phone, but can be any device generally capable of scanning or reading information on the passive item 230. For example, the universal remote 228 may include a scanner compatible with a barcode, a reader compatible with RFID circuits, a camera for taking photographs of the passive item 230, or a receiver for receiving data through automatic or manual user entry in the event the passive item 230 is incapable of being read or scanned. The universal remote 228 may be wireless (e.g., such as the aforementioned cell phone, or a personal digital assistant (PDA), smartphone, computer, netbook, etc.) or may be a device permanently or removably affixed to a portion of a structure (e.g., a house) or in association with the storage and retrieval system described above. The universal remote 228 is capable of transmitting and/or receiving wireless signals, such as radio frequency signals and/or infrared light beams. The transmitters and receivers integrated into the universal remote 228 are preferably configured to send/receive high frequency GPS signals and low frequency RFID signals. Of course, a person of ordinary skill in the art will readily recognize that the devices of the inventory control system 140' may operate at any one of a number different wireless frequencies, including AM radio frequencies, shortwave frequencies, citizen's band (CB) frequencies, radio frequencies, television station frequencies, FM radio frequencies, and high-level television station frequencies. For instance, in the United States, a cell phone-based universal remote 228 may operate between the 824-849 MHz. If the universal remote 228 utilizes cordless telephone technology for shorter-range communication, the universal remote 228 may operate at 900 MHz. In another preferred embodiment described herein, the universal remote 228 may be capable of operating between 1227-1575 MHz for purposes of compatibility with global positioning systems (GPS). The universal remote 228 may also communicate through landlines or other wired technology, instead of wirelessly.

Preferably, the universal remote 228 is in electronic communication with the database 232. The database 232 is typically placed remote from the universal remote 228 and the passive item 230 for security purposes or as a backup system. For example, the database 232 may be placed in an attic or the basement of a house, or in a storage closet or other location that a business may designate to house electronic items such as computers. In one embodiment, the universal remote 228 is in wireless communication with the database 232 over a WiFi network, a cellular network, or a cordless phone-type wireless communication network. Importantly, the universal remote 228 and the database 232 should be in real-time bi-lateral communication (i.e. the universal remote 228 can initiate and send information to the database 232 and the database 232 can initiate and send information to the universal remote 228). Accordingly, information regarding the passive items 230 entered into the inventory control system 140' is stored both locally on the universal remote 228 and remotely in the system database 232. In one embodiment, the database 232 may comprise an off-site backup database that is primarily used to retrieve information in the event that the universal remote 228 is broken or misplaced; or a second universal remote 228 is required for use with inventory control system 140'.

The universal remote 228 also operates seamlessly with a GPS sensor 234 to locate the general location of passive items 230 located outside of, for example, the aforementioned storage and retrieval system. At the same time, the GPS sensor 234 is also in wireless communication with a satellite system 236. The preferred satellite system 236 generally comprises at least three satellites, a first satellite 238, a second satellite 240 and a third satellite 242. The satellites 238, 240, 242 operate together to locate the general location of the passive item 230 via triangulation. For example, the satellites 238, 240, 242 are able to locate the general latitude, longitude and elevation of the passive item 230. A fourth satellite 244 may supplement the first-third satellites 238, 240, 242 in the event that one loses communication, breaks or otherwise becomes non-functional or drifts out of range. In essence, the fourth satellite 244 fills in and replaces one of the non-operational satellites 238, 240, 242. The satellites 238, 240, 242 relay the latitude, longitude and elevation information to the GPS sensor 234. From there, the GPS sensor 234 actively communicates with the universal remote 228 to send location information thereto. The universal remote 228 uses the item location information and the position of the universal remote 228 relative thereto to establish an approximate distance/route so the user can find the item 230. The universal remote 228 may connect to the Internet such that the coordinates of the item 230 provided by the GPS sensor 234 integrate into an online map system (e.g. Google maps). The online map may guide the user from the user's current position to the location of the item 230. In this regard, the GPS sensor 234 helps the user locate the passive item 230 with the universal remote 228. The GPS sensor 234 communicates general location information to the universal remote 228 to identify a general area wherein the passive item 230 may be located. If there are two conflicting GPS sensors present, such as when two neighbors may use the inventory control system 140', one of the GPS sensors changes to a different frequency (i.e. a backup frequency) to ensure unique communication with the items 230 and the universal remote 228. All items 230 in a single inventory control system 140' carry the same frequency, but are individually identifiable by a unique code—the code designates the RFID number unique to the product itself. When the user enters the general location of the passive item 230, the universal remote 228 is able to actively scan for the passive item 230 via RFID or the like. This is part of the retrieval of the item in the inventory control system 140', as described in more detail below.

Figure 96:
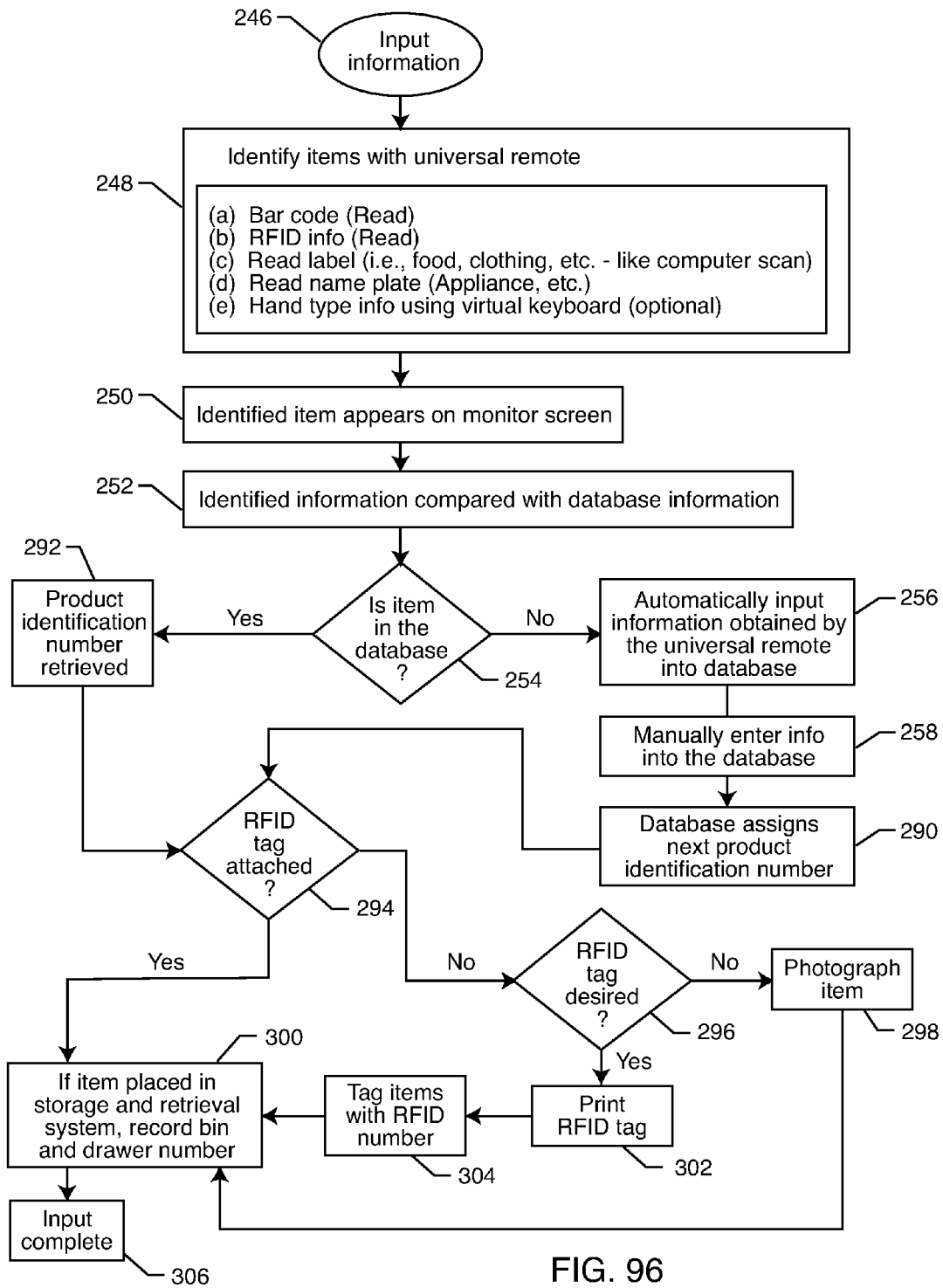
FIG. 96 is a flowchart illustrating inputting an item into the inventory control system.

Initially, the passive item 230 must be entered into the inventory control system 140', for storage such as in a memory module in the universal remote 228 and/or the system database 232. Preferably, the inventory control system 140' acquires item information through use of the universal remote 228, which is an active unit, with the item 230, which is passive. The universal remote 228 may initiate obtaining information from the passive item 230 through activation of a scanner, reader, etc. FIG. 96 is a sample flowchart for inputting information (246) into the inventory control system 140'. The first step is to identify the item with the universal remote (248). The universal remote 228 can actively read a barcode or an RFID circuit on the passive item 230 (if attached thereto). Alternatively, the universal remote 228 can read a label (i.e., food, clothing, etc.—like a computer scan), or a nameplate associated with the passive item 230 (e.g., an appliance, etc.). The user may also directly enter information into a virtual keyboard associated with the universal remote 228. For example, the keyboard may be a well-known computer keyboard, a modified keyboard attached to a wall or the keyboard may appear on a touch-sensitive LCD screen.

Once the identifying information of the item is entered into the inventory control system 140', the identified item appears on a monitor screen (250). In one embodiment, the identifying information may be displayed on the universal remote 228 itself. A person of ordinary skill in the art will readily recognize that the inventory control system 140' may convey identifying information to the user via a number of different ways, including display devices and audio devices. At this step, the user can verify that the inventory control system 140' identified the correct item. For example, the inventory control system 140' may display product identification information such as the type of product, name brand, picture, etc. If the information displayed by the inventory control system 140' is correct, the user accepts the information and the inventory control system 140' compares the item information with other product information already stored in the database (252). This process requires determining whether the item is in the database (254). In the event that the item is not in the database, the system 140' automatically inputs information obtained by the universal remote into the database (256). Information is only automatically obtainable when the passive item 230 includes a scannable barcode, a readable RFID circuit or the like. Typically, food items and other products at least include a scannable barcode. Manual input of information may be required in the event the user endeavors to store items that do not include barcodes or RFID chips, such as clothing. Preferably, at some point in the future, all products will contain a readable RFID chip that the universal remote 228 can automatically read. For example, companies such as Wal-Mart and Best Buy already require suppliers to include an RFID chip with each product.

Figure 97:
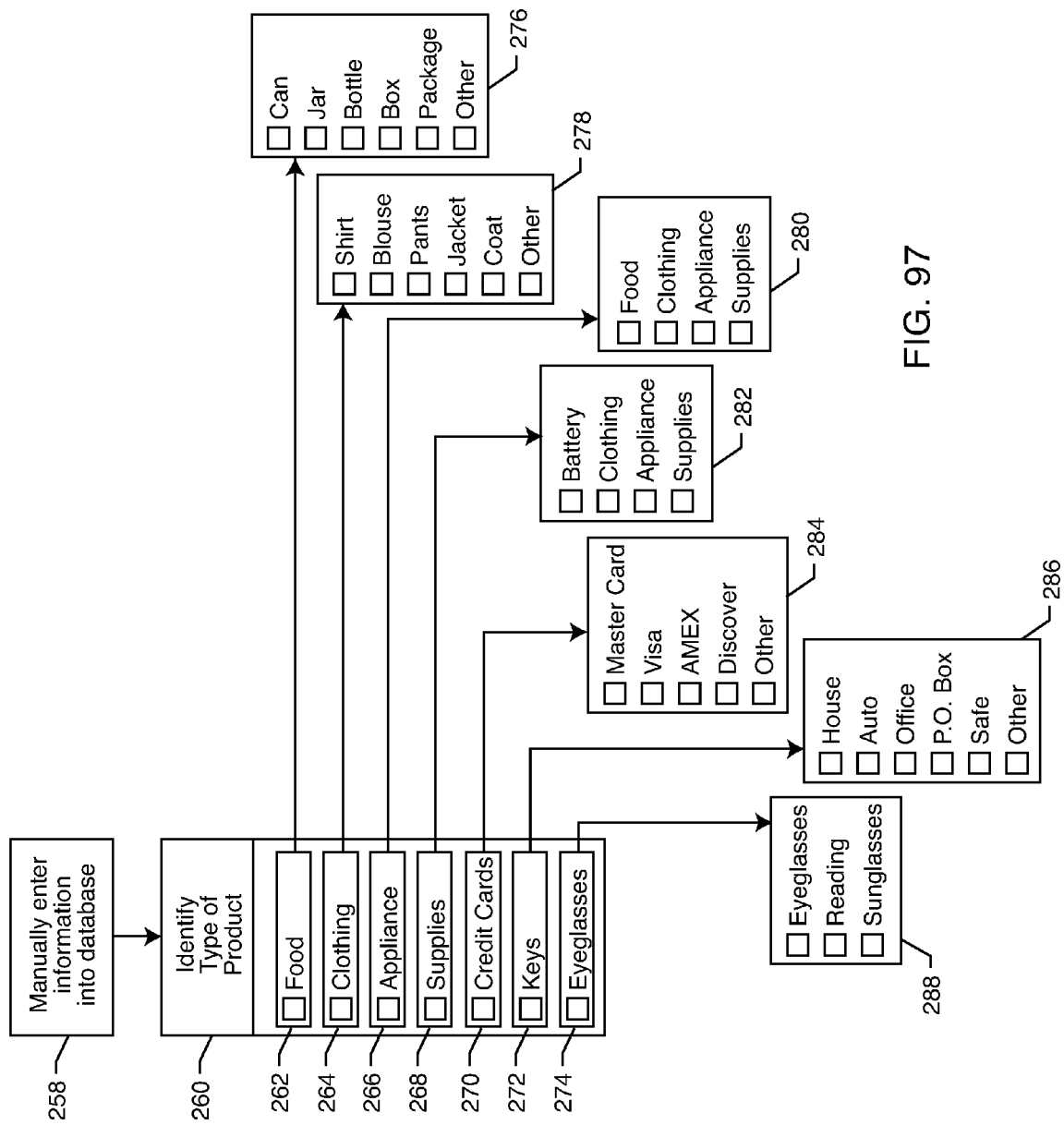
FIG. 97 is a flowchart illustrating manually entering information into the inventory control system database.

If the passive item 230 does not include any scannable or readable information, or that the information automatically obtained by the universal remote 228 is insufficient, the user has the option of manually entering information into the database (258). For instance, FIG. 97 is a flowchart illustrating the type of options that a user may select from to manually enter information into the database (258). FIG. 97 is merely a sample of the types of options that a user may have to select. A person of ordinary skill in art will readily recognize that the types and number of options will vary widely depending on the deployment of the inventory control system 140'. For example, some models of the inventory control system 140' may be limited in application to food. Accordingly, the menu system from which the user selects to manually enter goods is tailored to food items only. In general, the inventory control system 140' is applicable to virtually any environment and can record virtually any tangible item. For identification purposes, the item should be large enough to receive an RFID chip or a similar barcode. Although, the inventory control system 140' should not be limited to the size or functionality of RFID circuits or barcodes because emerging technologies may enable the identification of smaller items that are otherwise unable to currently receive identification information on items such as circuits. The universal remote 228 and the database 232 are preferably remotely updatable with new menus as new products enter the market. A software update may easily occur over the Internet, via a flash update, or a system software update. A user may also selectively customize the presentation of the various menu options described with respect to FIGS. 97 and 98, depending on the use and deployment of the inventory control system 140'.

FIG. 97 is one embodiment wherein the monitor may display a series of menus so the user can identify a type of product (260). In the exemplary embodiment shown in FIG. 97, the user is presented with the options of selecting a food item 262, a clothing item 264, an appliance item 266, a supply item 268, a credit card item 270, a key item 272 or an eyeglasses item 274. A person of ordinary skill in the art will readily recognize that the product identification step (260) may include various other types of items from which the user may select. These selectable options may include general categories, such as those items 262-274 as shown in FIG. 97, or may pertain to more specific goods depending on the application of the inventory control system 140'. For example, the embodiments described herein utilize the inventory control system 140' in a wide range of goods that may commonly be found in a home. The inventory control system 140' may be deployed in specific environments, such as a medical office, hospital, law office, manufacturing environment, grocery store, retail outlet, etc., wherein the menus may be specific to particular products specific to that particular practice. Accordingly, a person of ordinary skill in the art will readily recognize that the inventory control system 140' will have both broad use (e.g. household use) and specific deployments (e.g. industry specific needs or home specific items such as groceries).

In the embodiment shown with regard to FIG. 97, the food item 262 may include a food item submenu 276 that includes cans, jars, bottles, boxes, packages or other types of food items. The food item submenu 276 may include further submenus and/or other options for manually inputting information into the database to properly identify specific features of the food item 262 being stored within the inventory control system 140'. In terms of the storage and retrieval system, information such as height, weight, length, width, expiration date, etc. are important for food items 262 so that the storage and retrieval system can efficiently stow and retrieve the goods. The inventory control system 140' may alert the user of pending perishable goods based on quantity and expiration date. Moreover, integration of a local database into the universal remote 228, which preferably doubles as cellular telephone, enables the user to access inventory information virtually anywhere. At the grocery store, the user can immediately identify any goods stored in the inventory control system 140' so the user does not buy unneeded groceries. This concept transcends multiple practices in work or office environments. For example, in supply chain management, a purchase order can be automatically set up to purchase more of a particular part when the inventory control system 140' detects that the part is running low. Additionally, the inventory control system 140' provides the supply chain manager with an instant and real-time assessment of the entire inventory within the supply chain. Accordingly, the inventory control system 140' virtually eliminates any need to individually count parts traveling through the supply chain.

With respect to the remainder of the menus and submenus in FIG. 97, the clothing item 264 may include a clothing item submenu 278 including shirts, blouses, pants, jackets, coats and/or other types of clothing storable within the inventory control system 140'. Likewise, the appliance item 266 may include an appliance item submenu 280 including options for food, appliances, supplies, etc.; the supplies item 268 may include a supplies item submenu 282 including options for batteries, clothing, appliances, supplies, etc.; the credit card item 270 may include a credit card item submenu 284 including options for Master Card, Visa, American Express, Discover Card, or other credit cards; the key item 272 may include a key item submenu 286 for house keys, car keys, office keys, P.O. box keys, safe keys, and other keys that may be used in the home or office; and the eyeglasses item 274 may include an eyeglasses submenu 288 including options for regular eyeglasses, reading glasses and sunglasses. The information manually input into the database may be presented in a number of different formats that enables a user to properly identify the item in the inventory control system 140'.

Once the information for an unknown item is entered into the database, either automatically in step (256) and/or manually in step (258), the database assigns the item a product identification number (290), as shown in FIG. 96. The product identification number is a locator number that the inventory control system 140' uses to properly identify items previously entered in steps (256) and (258). At step (290), the item is fully entered into the inventory control system 140' and is associated with a product identification number. Similarly, if the item was already in the database, the product identification number is simply retrieved from the database (292) and the quantity updated.

Then it must be determined whether the item has an RFID tag attached (294). Preferably, the RFID tags are attached by the manufacturer, and not the user, at a required, standard location. This eliminates any need to manually apply a consecutive, sequential number to each RFID tag attached to individual items. The tags may include photo identification, date made or written, expiration date, a description of the product, author, or other product or tag information. In general, the tags may include virtually any information associated with the item. Other information that can be stored on the RFID tag and/or the product includes: product name, container type (e.g. bottle, can, box, package, etc.), container size (e.g. quarts, grams, etc.), storage characteristics (optional), product height, (i.e. for maximum drawer utilization to greatly increase storage capacity), expiration date (if applicable), refrigeration requirements, product picture (e.g. of the bottle, can, labels, clothing, appliance, etc.), part or serial number (e.g. for an appliance, etc.), material (e.g. clothing, etc.), date the product was made, or date the document was written. The only foreseeable limit is the size of the memory module built into the RFID tag. Product identification information can be used in association with the inventory control system 140' to store and/or locate an item therein. Standardization in the placement and frequency of the RFID tags further enhances the compatibility of various products with the inventory control system 140'.

When an RFID tag is not attached to the item, the next step is to determine whether an RFID tag is desired (296). In some circumstances, the user may not want to attach an RFID tag to the item (such as silverware, cutlery or pots and pans). In this particular case, the user should photograph the item (298) for entry into the inventory control system 140'. The user then manually programs the inventory control system 140' to identify a particular location that the item is located. For example, a user may take a picture of a cooking pot and identify in the inventory control system 140' that the pot is located in a particular cupboard. Alternatively, if the item is placed in the storage and retrieval system, the user should record the particular bin and/or drawer number (300) where the item is stored. The user may manually enter information into the database (258) as described above. Accordingly, the user is able to subsequently find the untagged item by accessing location information stored in the inventory control system 140' quickly and easily with, e.g., the universal remote 228.

Alternatively, if an RFID tag is desired, the user must print an RFID tag (302) according to the number assigned by the database in step (290). The printed tag preferably includes an adhesive or other means for attaching the tag to the item (304). Accordingly, the user may place the item nearly anywhere so the item can later be located through use of the aforementioned universal remote 228, the GPS sensor 234, and/or the satellite system 236. In one embodiment, the tagged item may be placed in the storage and retrieval system described above. Items such as cans, bottles, boxes and jars may each be stored in a drawer in the storage and retrieval system designed for the size of each respective item. Here, it is preferred that the RFID tag be attached to the top of the can, the top of the bottle, the top of the box or the top of the jar. Alternatively, for clothing items such as shirts, pants and coats, the RFID tag may be attached to the inside top collar of a shirt, bottom of a pants leg or inside the top collar of the coat. The shirts, pants and coats may subsequently be placed in bins or on hangers within a closet. Similarly, in an office environment, the RFID tags may be attached to the side of a letter, file or document for easy reading by the universal remote 228 when organized in a Pendaflex folder hung from a frame. Such folders may also be incorporated into the storage and retrieval system described above. Additionally, other items such as watches, eyeglasses and keys (e.g., car keys and house keys) may each respectively receive an RFID tag to the underside of a watch face, bottom of the frame end, or on a key case. The watch, eyeglasses and keys may each be stored in respective drawers and bin numbers within the storage and retrieval system. Then, when the user wants to retrieve any of the above-identified items, the storage and retrieval system automatically knows which bin and drawer number to access and present to the user, so the user is not otherwise forced to search for the items. Thereafter, input is complete (306).

Figure 98:
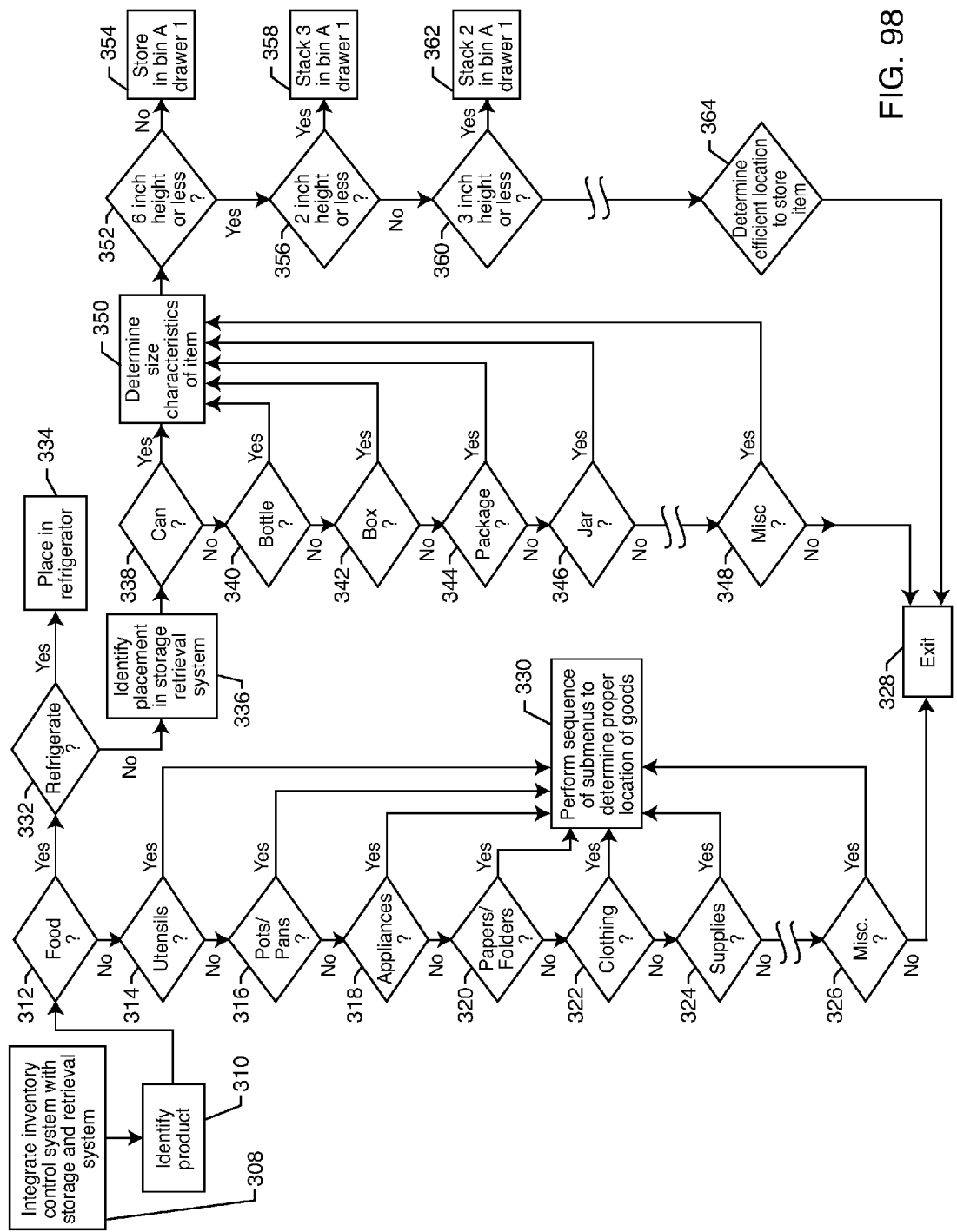
FIG. 98 is a flowchart illustrating a sample set of logic questions designed to determine the most efficient way to store an item or items in the storage and retrieval system.

FIG. 98 is a sample flowchart illustrating one set of logic instructions for integrating the inventory control system 140' with the storage and retrieval system (308). For example, the first step is to identify the product or item (310) to be stored within the storage and retrieval system. The logic diagram illustrated in FIG. 98 may be an internal logic processor that automatically steps through each of the determination steps to dictate to the user which bin and/or drawer number the item is to be placed. Alternatively, when the characteristics of the product or item to be entered into the storage and retrieval system are relatively unknown, the logic diagram of FIG. 98 may provide a way for the inventory control system 140' to acquire information about the product to efficiently ascertain the bin and/or drawer number in which the product or item is to be stored. As part of identifying the product or item (310), the inventory control system 140' may initially determine whether the item is food (312). If the item is not food, the inventory control system 140' may step through a series of different categories to determine if the product or item is utensils (314), pots/pans (316), appliances (318), papers/folders (320), clothing (322), supplies (324), or some other miscellaneous item (326) capable of being stored within the storage and retrieval system. In the event the inventory control system 140' is unable to place the item into a category, including the miscellaneous category, the item may be deemed incapable of storage within the storage and retrieval system and the system may merely exit (328). Subsequently, the system 140' notifies the user that the item cannot be stored within the storage and retrieval system. Otherwise, the inventory control system 140' performs a sequence of submenu logic steps to determine the most efficient location to place the goods in the corresponding bin and/or drawer numbers (330). Process step (330) may occur automatically, as would be the case when the product is automatically identified by the universal remote 228 by scanning the barcode or reading the RFID tag, or manually through manual input of the product characteristics by the user. Preferably, the inventory control system 140' works in conjunction with the mechanics of the storage and retrieval system described above to automatically present to the user the corresponding bin and drawer number where the item is to be efficiently stored. Considerations for storage locations may include criteria such as the size of the product packaging, the type of product (e.g. whether it needs refrigeration), the location of other similar items, frequency of accessing the item, etc. A person of ordinary skill in the art will readily recognize that virtually any type of criteria can be programmed into the logic of the computer system operating the inventory control system 140' for determining the efficient location of goods entered into the storage and retrieval system. A processor may compute storage efficiency in real-time.

The logic sequence generally described with respect to step (330) in FIG. 98 is described in more detail when it is determined that the product or item is food (312). In this scenario, after determining that the product is food (312), it must be determined whether the food needs to be refrigerated (332). In the event the food needs refrigeration, the food item is accordingly placed in a refrigerator (334). The refrigerator may either be integrated into the storage and retrieval system, as described above, or may be a separate, regular standard refrigerator. In the case that the refrigerator is part of the storage and retrieval system, the inventory control system 140' preferably determines the most efficient location within a refrigerated bin and/or drawer number for placement of the food item. Alternatively, the user may simply open the standard refrigerator (unassociated with the storage and retrieval system) for placement therein. In this embodiment, the user will later use the remote control 228 to specifically locate the positioning of the item within the standard refrigerator, as will be described in more detail below. One particular advantage of integrating the inventory control system 140' with the storage and retrieval system is that the user may ascertain the type and quantity of goods within the system in real-time. In terms of refrigeration, the user need not open the refrigerator, thereby decreasing its efficiency by exposing the internal compartments to ambient air temperatures. Rather, the user need only access a menu on the remote control 228 or other device capable of displaying the payload of contents in the refrigerator. This feature is not necessarily reliant only on the storage and retrieval system, but can also be used in conjunction with a standard refrigerator. Goods in the standard refrigerator are located (and monitored) generally through remote communication with the GPS sensor 234, as described with respect to retrieving goods below.

Alternatively, in the event that the food item does not need to be refrigerated (332), the inventory control system 140' identifies placement in another, regular compartment of the storage and retrieval system (336). For instance, the programmed logic may step through any one of a number of different determination steps to ascertain the type and size of the product to be stored in the storage and retrieval system. For instance, the inventory control system 140' may determine whether the food item is a can (338), a bottle (340), a box (342), a package (344), a jar (346), or another miscellaneous type of food item (348). In the event the inventory control system 140' is unable to ascertain the identity of the food item, the system may return a message to the user indicating as such and thereafter exit (328). This should only occur in rare circumstances, such as a new product having unusual packaging that does not permit placement in any bin and/or drawer. The determination steps (338)-(348) otherwise help the inventory control system 140' ascertain the proper location to store the food product. Preferably, food products are stored with other like food products. This increases the efficiency and organization of the storage and retrieval system. In terms of efficiency, if the food item is a can, the user may be able to stack multiple cans on top of one another depending on the size of the can, the bin and/or drawer. Alternatively, items such as bottles may not permit stacking and, therefore, require storage in different bin and/or drawer numbers. Grouping products based on dimensioning, especially the footprint of the product package, enables the storage and retrieval system and the inventory control system 140' to store more products within a smaller space.

Accordingly, after identifying the type of food product, the inventory control system 140' determines the size characteristics of the item (350). For example, the inventory control system 140' may first determine whether the food item is six inches or less in height (352). In the event that the food item is not six inches or less in height, the inventory control system 140' presents the user with the option of storing the food item in bin A, drawer 1 (354). Alternatively, if the food item is six inches or less, the inventory control system 140' may next determine whether the food item is two inches or less in height (356). In the case that it is, the user is able to stack at least three of the food items in bin A, drawer 1 (358). If the food item is more than two inches in height, the next logic step may be to determine whether the food item is three inches or less in height (360). In the event that the food item is three inches or less in height, the user is directed to stack two of the food items in bin A, drawer 1 (362). The inventory control system 140' may take into consideration one or more other characteristics of the food item when determining the location to place the food item in the storage and retrieval system. The inventory control system 140' will also consider the type and size of the products already within the storage and retrieval system to maximize efficient placement therein. Accordingly, this logic is generally designated in step (364). Once the food item is placed in the storage and retrieval system, the inventory control system 140' exits (328). The next time the same item is scanned into the inventory control system 140', the storage and retrieval system automatically presents a preferred bin and/or drawer to the user since the product characteristics are already known. Of course, the user can override any automatic function at any time.

Figure 99:
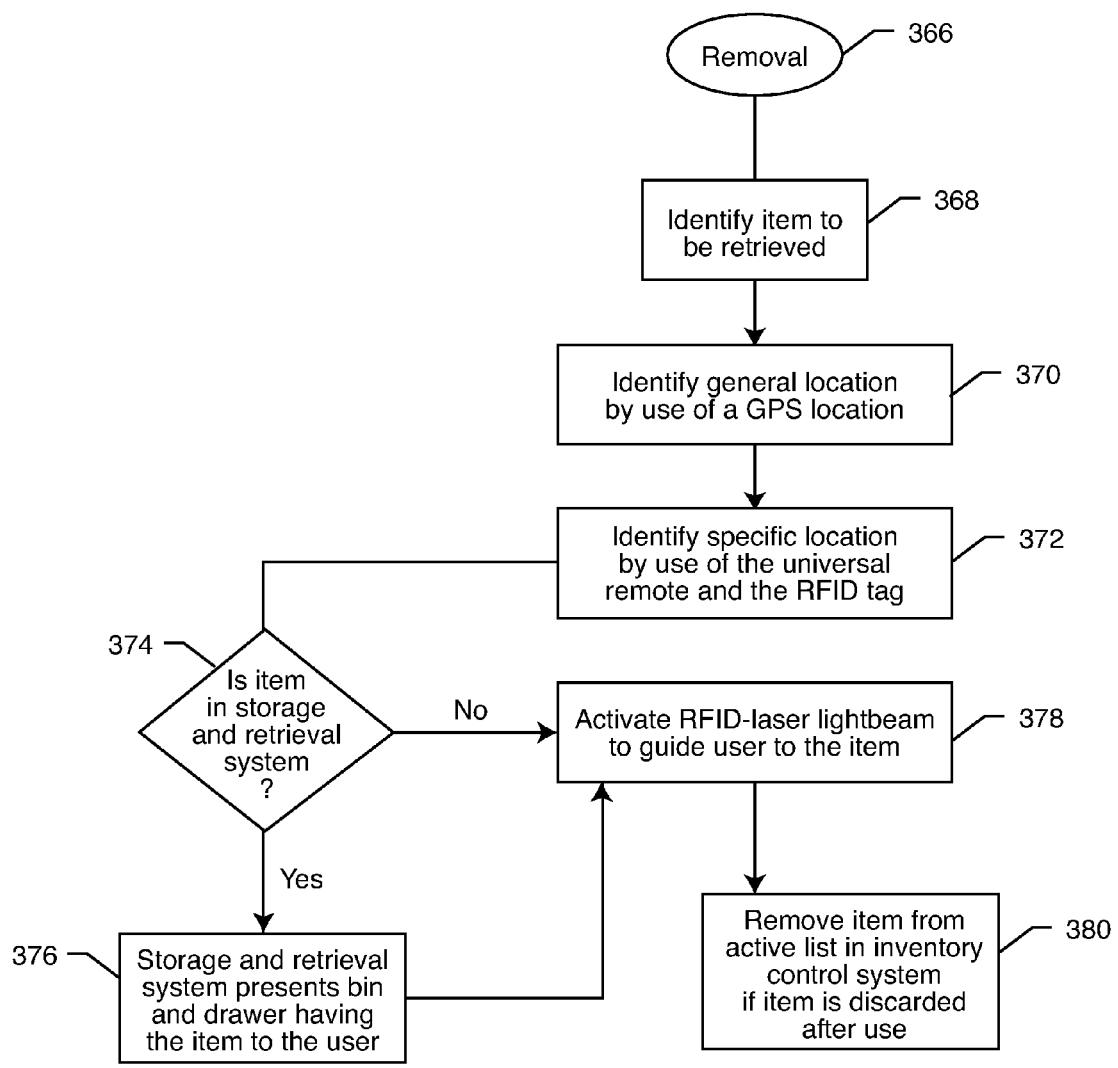
FIG. 99 is a flowchart illustrating removal of an item from the inventory control system.

Another important aspect of the inventory control system 140' is the capability to locate and retrieve items originally entered into the system. FIG. 99 is a flowchart illustrating a process of removal (366). The first step is to identify the item to be retrieved (368). Recall that the inventory control system 140' generally includes the universal remote 228. Accordingly, the user may search for an item to be retrieved by interfacing with a search program programmed into the universal remote 228. Information of items within the inventory control system 140' may be stored in a database local to the universal remote 228 or remote in the system database 232. When the information is remote, the universal remote 228 directly communicates with the database 232 in real-time. The user may search by virtually any type of product feature identified, e.g., in steps (260)-(288), (312)-(326), (338)-(348) or (352)-(360). Searches may be category-based, keyword-based, feature-based (e.g. purchase date, expiration date, etc.) or by some other menu-based logic search.

Items located outside of the storage and retrieval system may be generally located through use of the universal remote 228 and the GPS sensor 234. One of the GPS sensors 234 is preferably within reading range of the item 230 at all times. For example, a user may strategically place multiple GPS sensors 234 throughout a house. Preferably, the GPS sensors 234 cover the entire premises as would a home WiFi internet signal. In a preferred embodiment, the item 230 includes a passive RFID tag that can be read by an active GPS sensor 234 capable of sending and receiving RFID signals, among others. The GPS sensor 234 may further communicate with the satellites 238-244 of the satellite system 236, as described above, to locate the general area of the item 230. For example, the GPS sensor 234 and the satellite system 236 could determine that an item is located on the second floor of a three story house. In this embodiment, the satellite system 236 uses triangulation, which includes an approximate elevation of the item, to locate the general location of the item in the house. The GPS sensor 234 can send and receive high frequency GPS signals to the satellites 238-244 and the universal remote 228. As described above, the GPS sensor 234 ascertains the general location of the item 230 through implementation of triangulation, wherein the satellites 238, 240, 242 work together to identify the latitude, longitude and elevation of the item 230. The GPS sensor 234 acquires this information from the satellite system 236 and thereafter communicates the location to the universal remote 228. The universal remote 228, through a GPS-enabled map system or through an internet connection, can display the location of the user relative to the positioning of the item 230. The user is then able to navigate with the universal remote 228 to the approximate location of the item 230 identified by the GPS sensor 234. Once in the general vicinity of the item 230, the user activates the RFID transmitter on the universal remote 228 to specifically hone in on and pinpoint the exact location of the item 230.

Accordingly, the next step is to identify the specific location of the item 230 by use of the universal remote 228 and the RFID tag (372). The universal remote 228 includes an RFID-laser light beam that directs the user to the specific location of the item 230 when in range. The user can retrieve the item by following the laser-light beam to the location of the item 230. In some cases it is necessary to determine whether the item is stored in the storage and retrieval system (374). Accordingly, when the item 230 is stored within the storage and retrieval system, the storage and retrieval system presents the bin and drawer having the desired item to the user (376). The user may then activate the RFID-laser light beam to guide the user to the item (378). The laser light beam on the universal remote 228 preferably creates a line-of-sight beam in the direction of the item 230. When in the storage and retrieval system, the laser light beam points to a specific product having the identified RFID label thereon. When not in the storage and retrieval system, the laser light beam preferably directs the user to a specific location where the item 230 is located. Here, the universal remote 228 also creates a line-of-sight to the item with the laser light beam. Of course, the item 230 must be within range of the radio frequency transmitter on the universal remote 228 for the laser light beam to direct the user to the specific location of the item 230. Hence, the importance of using the GPS sensors 234 to locate the general vicinity of the item 230.

In a preferred embodiment of the inventory control system 140', for items stored outside of the storage and retrieval system described above, it is preferred that various GPS sensors be disposed in the general vicinity of where items are to be stored. For example, a GPS sensor 234 could be located in the garage, in the basement, and/or in specific rooms such as a closet, a bedroom, a pantry, or a refrigerator. The important part is that the GPS sensor 234 be within transmittable range to identify the general location of the item at any given time. This is extremely useful and efficient for the user because the user does not spend countless hours searching for items in the wrong portion of a home, for example. Tagging items 230 with RFID tags also prevents loss of the item 230 due to misfiling or misplacement. When the item 230 is within range of either the GPS sensor 234 or the universal remote 228, the user is able to immediately locate the place of the item in real-time. For example, items placed in a standard refrigerator (e.g. not a storage and retrieval-equipped refrigeration unit), as described briefly above with respect to FIG. 98, a GPS sensor 234 attached to the refrigerator notifies the user of certain products within its vicinity (i.e. in the standard refrigerator). Accordingly, the user is capable of determining the general area that a particular product is located (i.e. the standard refrigerator). Upon opening the refrigerator, the universal remote 228 activates the RFID-laser light beam to point directly to the RFID tag specific to the product itself. The laser light beam preferably establishes line-of-sight to the item for immediate retrieval. Thereafter, the item is removed from the active list of the inventory control system if the item is discarded after use (380). Otherwise, the GPS sensors 234 continue to track the location of the item while in range.

The monitor on the universal remote 228 may also be designed to periodically show or display a list of items that need attention. For example, the universal remote 228 may display items about to expire, or items that may expire in the near future (e.g. two or three days). The inventory control system 140' may be equipped with a notification system that alerts the user of goods that may expire within a certain time period. Of course, the user is able to customize the alerts (e.g. frequency, audio, visual, etc.).

Figure 100:
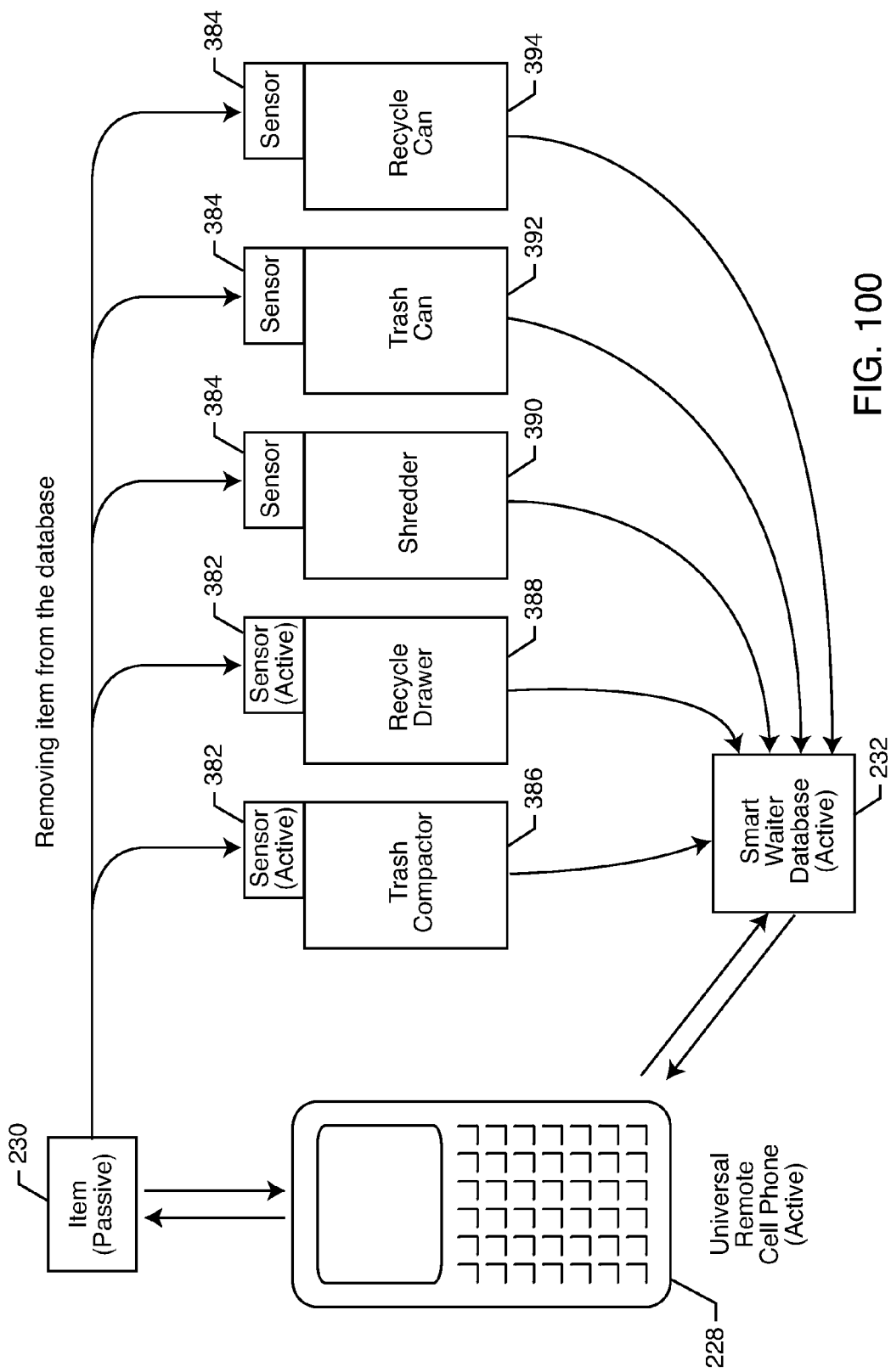
FIG. 100 is a diagram illustrating several ways of electronically documenting that an item was removed from the inventory control system.

FIG. 100 is a schematic diagram illustrating removal of the item 230 from the active list in the inventory control system 140'. As shown in FIG. 100, the system database 232 preferably remains in communication with the universal remote 228. The universal remote 228 or GPS sensor 234 may also be in communication with the item 230 (assuming either are within range). The item 230 can be removed from the active list in the inventory control system 140' via manual entry by the user in the event the item 230 no longer resides in the system 140'. This may occur, for example, when a piece of fruit (such as an apple) is eaten. More preferably, items are removed from the active list through deployment of an active sensor 382 or a powerable sensor 384. The active sensor 382 is just that, always active. Thus, when the user places the item 230 in either a trash compactor 386 or a recycle drawer 388, the active sensor 382 records placement of the item 230 therein. The active sensor 382 then immediately communicates to the system database 232 that the item 230 has been placed in a location (i.e. the trash compactor 386 or the recycle drawer 388) that effectively removes the item 230 from the inventory control system 140'. The system database 232, being in communication with the universal remote 228, immediately updates the database stored within the universal remote 228 so that the user may access the inventory in real-time. Typically, the active sensor 382 used with the trash compactor 386 is used to identify items 230 such as food and other household goods. Additionally, the active sensor 382 associated with the recycle drawer 388 may be associated with other common household goods, such as boxes, papers, cans, etc. The scope of the active sensors 382 are preferably localized and may only be activated when the item 230 passes a plane or other laser that causes the active sensor 382 to read the item 230. Moreover, the powerable sensor 384 may be mounted or used in association with a shredder 390, a trash can 392 or a recycle can 394. The powerable sensor 384 enables the user to selectively turn the sensor 384 "on" or "off", depending on the use. For instance, the sensor 384 associated with the shredder 390 is normally "off", unless the user is shredding papers (i.e. the item 230) having an RFID circuit thereon. In this case, the powerable sensor 384 becomes active when the user turns the shredder 390 to the "on" position. Accordingly, the sensor 384 identifies the item 230 before the RFID tag is destroyed by the shredder 390. The trash can 392 and the recycle can 394 include similar powerable sensors 384, but may also include the active sensor 382. Accordingly, each of the sensors 382, 384 are in communication with the system database 232 and/or the universal remote 228. The sensors 382, 384 immediately update the system database 232 and/or the universal remote 228 to show that the item 230 has been discarded. The inventory control system 140' preferably updates in real-time so the user can immediately identify the types and quantity of items in the inventory control system 140' at all times.

Thus, the item 230 is automatically removed from the active database via the active sensor 382 or the powerable sensor 384 at the place the item 230 is discarded. Alternatively, the item 230 is manually scanned or read by the universal remote 228 when thrown away elsewhere (i.e. when the active sensor 382 or the powerable sensor 384 is not present), given to charity, or sold in a flea market. The item removed from the active database may be kept inactive for product usage reports, etc., or otherwise completely removed from the database. For example, deleting an item 230 from the database could be similar to a "recycle bin" protocol of a computer.

Figure 101:
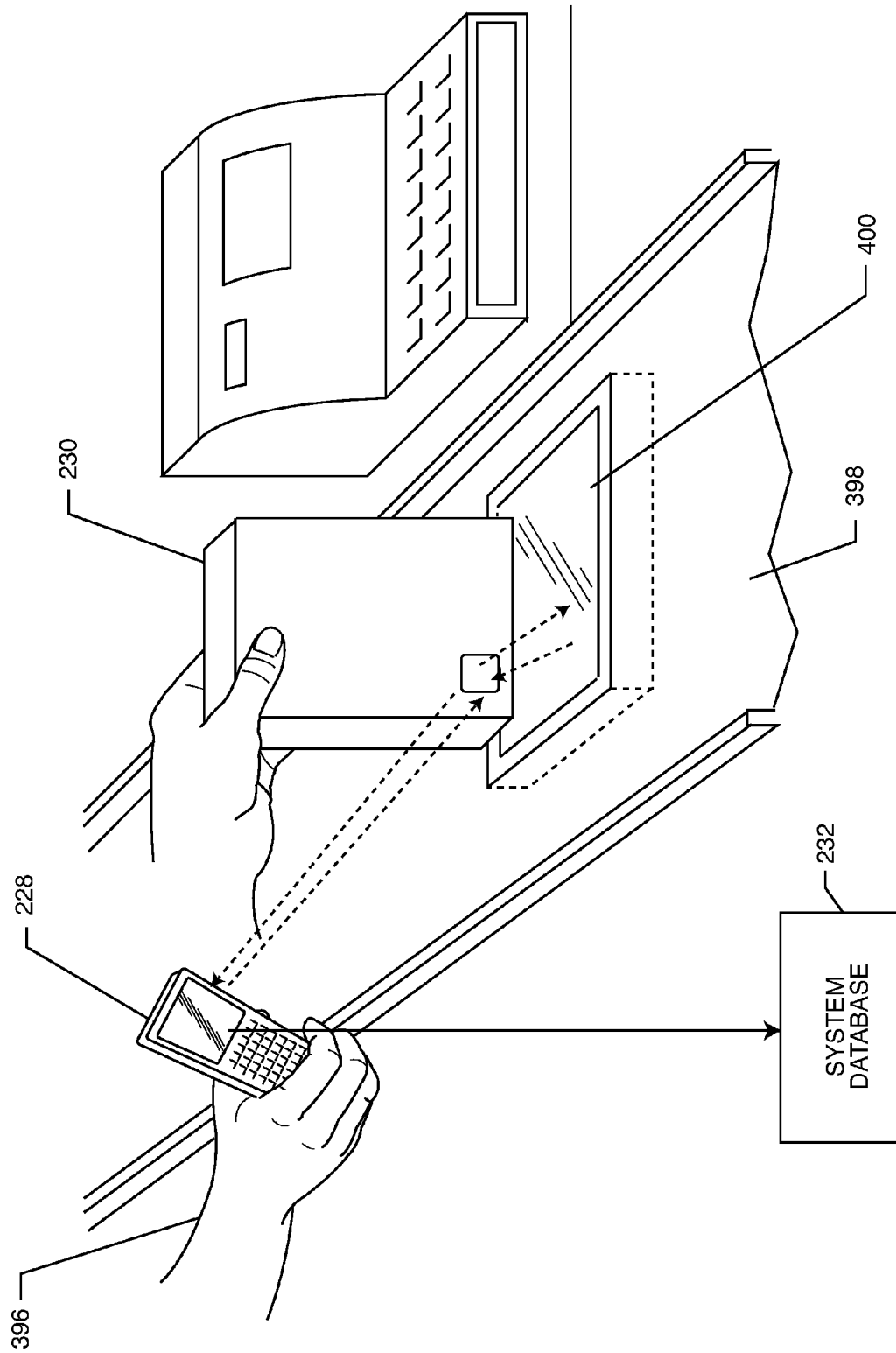
FIG. 101 is a schematic illustrating automatic entry of a purchased item into the inventory control system at the time of checkout.

In another aspect of the inventory control system 140', a user may automatically enter items into the system database 232 simultaneously while checking out at the store. FIG. 101 illustrates a user 396 scanning the item 230 at a checkout counter 398. In this embodiment, the item 230 is equipped with an RFID circuit automatically read by a scanner 400 integrated into the checkout counter 398. When the RFID tag is read at the checkout counter 398, the RFID information is automatically read by the universal remote 228 carried by the user 396. Thereafter, the universal remote 228 communicates the information associated with the item 230 to the system database 232. This particular feature of the inventory control system 140' instantly adds newly purchased products to the system database 232. Accordingly, the user 396 is not required to re-scan any of the purchased items at home. Rather, the inventory control system 140' immediately enters and begins tracking the purchased items with the universal remote 228 and any one of a plurality of the GPS sensors 234. As described in more detail below, features of the universal remote 228, the GPS sensors 234 and the system database 232 ensure that the user 396 does not haphazardly lose or misplace the purchased items, especially after leaving the store. Input of the item 230 into the inventory control system 140' at the time of purchase automatically immediately identifies the location of the item 230 such that the user 396 may retrieve the item 230 at any given time in the future.

Figure 102:
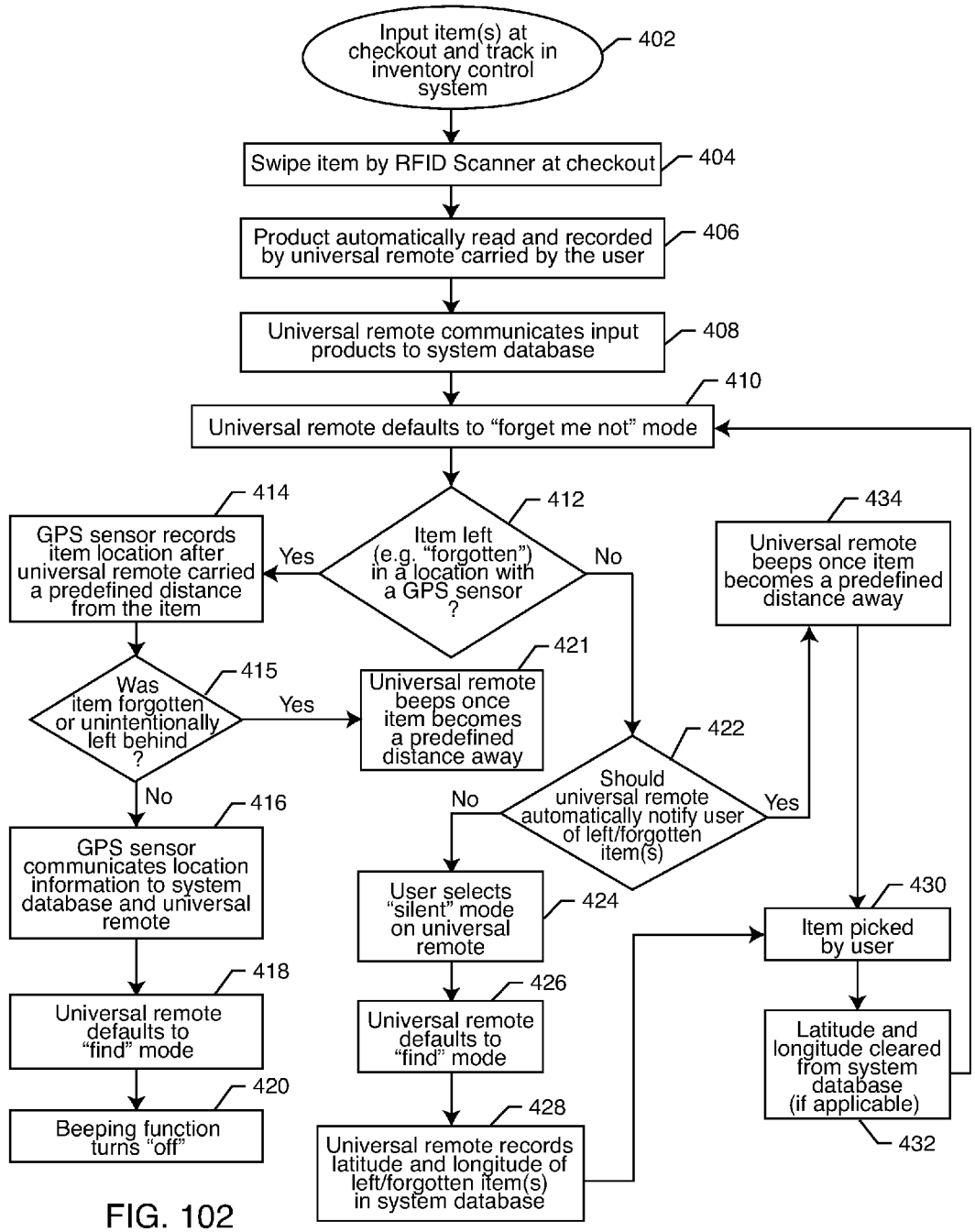
FIG. 102 is a flowchart illustrating inputting an item into the inventory control system at checkout and thereafter tracking the item.

FIG. 102 is a flowchart illustrating a sample process of inputting items into the inventory control system 140' at checkout and thereafter tracking the item within the inventory control system (402). Initially, as generally described above with respect to FIG. 101, the user 396 first swipes the item by an RFID scanner 400 at checkout (404). The universal remote 228 carried by the user 396 acknowledges the purchase of the item 230 at the time of scanning (406). The universal remote 228 stores item information in a local database and may simultaneously communicate that information to a remote database (408), such as the system database 232. At this stage, the universal remote 228 defaults to a "forget me not" mode (410). In this setting, the universal remote 228 maintains communication with the purchased items 230. While the items 230 are within radio contact with the universal remote 228, nothing happens. This feature is to ensure that the user 396 does not accidentally leave or forget a particular product at the checkout counter 398. In the event one or more items 230 lose communication with the remote 228, the user is alerted that the item 230 may have been left behind, misplaced, or forgotten.

While the embodiment described with respect to FIG. 102 pertains to purchasing goods at a retail outlet, the "forget me not" feature is applicable in a number of different settings. For example, the user may set the universal remote 228 to the "forget me not" mode when in a restaurant or bar. All items within range of the radio frequency transmitter in the universal remote 228 are immediately identified and thereafter tracked. As long as the items carried by the user remain within the radio frequency range of the universal remote 228, nothing happens. Items such as credit cards or keys (and possibly cash in the future) are constantly monitored by the universal remote 228. This prevents the user from leaving, for example, a facility without items that were initially within the radio frequency range of the universal remote 228. This might be applicable in a bar setting wherein a user may give a bartender a credit card to start a tab. At the end of the evening, in the event the user walks out of the bar without the credit card, the universal remote 228 immediately notifies the user once the credit card loses radio frequency communication with the universal remote 228—i.e. the credit card falls outside of some predefined monitoring distance. In this regard, the user may immediately identify the missing item by viewing information provided by the universal remote 228. In this embodiment, the universal remote 228 may display a picture or other information regarding the missing item. In the above example, the user immediately knows to go back to the bartender to retrieve the credit card. This particular feature of the inventory control system 140' is applicable to virtually any type of product carrying RFID identification. The universal remote 228 may monitor items such as clothing, purses, computers, wallets, billfolds, glasses, etc.

The user may also customize the "forget me not" mode, such as which items are monitored and the maximum distance between the universal remote 228 and the item before the universal remote 228 activates a notification warning to the user. In this embodiment, the user may initially activate the "forget me not" mode on the universal remote 228 at a location such as a restaurant. The universal remote 228 may provide the user with a list of items currently being monitored in the "forget me not" mode. In this list, the user may have the option to deselect monitoring of a particular item or items. This might be useful, for example, if the user decides to throw away a particular item (in which case the item is removed from the inventory control system 140' altogether, as described above), or in the event that the user decides to allow the item to leave the predefined monitoring range (e.g., to allow another person to borrow a piece of clothing, such as a coat). In this scenario, the user does not want the universal remote 228 activating at the end of the night when the borrowed garment is taken beyond the monitoring range of the universal remote 228. Of course, the user may customize the distance the item may be taken before the universal remote 228 activates some visual or audio alarm.

Items purchased at checkout or otherwise desired to be monitored via the "forget me not" mode has several additional features in view of use with the storage and retrieval system and GPS sensors 234. As shown in FIG. 102, the universal remote 228 initially defaults to the "forget me not" mode (410). This is generally true whether the items were purchased or otherwise monitored at a different location. When an item leaves the monitoring range of the RFID transmitter/receiver of the universal remote 228, it must be determined whether the item was left (e.g. "forgotten") in a location with a GPS sensor 234 in range (412). If the item is left within the range of a GPS sensor 234, the GPS sensor 234 records the item location after the universal remote is carried a predefined distance from the item (414). It is then determined whether the item was "forgotten" or unintentionally left behind (415). If the item was not forgotten or was intentionally left behind, the GPS sensor 234 immediately communicates location information to the system database 232 and the universal remote (416), and then having received this information, the universal remote 228 defaults to the "find" mode (418). Accordingly, the notification function (e.g. beeping, vibrating, flashing, etc.) of the universal remote 228 turns "off" (420). Steps (414)-(420) are designed to permit the user to leave an item outside of the RFID transmission range of the universal remote 228 without the universal remote 228 beeping or otherwise notifying the user that the item was left behind. Alternatively, if the items were "forgotten" or unintentionally left behind, the universal remote beeps once the item becomes a predefined distance away (421). These features are particularly ideal after the user 396 purchases goods at a retail outlet and then places those goods within the user's home, e.g., for storage and retrieval at a later date. The user is not required to enter any information or change any settings. Rather, the user simply walks away and the GPS sensors 234 immediately identify the location of the item 230. This prevents the item from being lost in the event the user accidently forgets an item at a location outside of the GPS sensor 234 range, such as at the grocery store, since the GPS sensor 234 immediately communicates location information to the system database 232 and the universal remote 228 in step (416). The user can still immediately identify the general location of the item even though the universal remote 228 is no longer in RFID transmission range. In this aspect of the inventory control system 140', there is no danger that the item will be lost or otherwise misplaced.

Alternatively, when it is determined in step (412) that a GPS sensor 234 is not located within the area that the item is left, it must first be determined whether the universal remote 228 should automatically notify the user that the item was left and/or forgotten (422). In some situations, the user may endeavor to place an item at a location outside of the RFID transmission range of the universal remote 228; and in a location outside of the transmission range of any GPS sensor 234. In this scenario, the user may select a "silent" mode on the universal remote (424). The universal remote 228 then defaults to "find" mode (426). In this mode, when the universal remote 228 leaves the RFID transmission range of the item, the universal remote records the latitude and longitude of the item in the system database (428). The universal remote 228 has an active GPS sensor circuit therein (not shown). The universal remote 228 will be able to later locate the item via a universal remote navigation map after recording the latitude and longitude of the item placed outside the range of the GPS sensors 234. This means the stationary GPS sensors 234 on the refrigerator, house, closet, or storage and retrieval system are not needed. The roving GPS sensor circuit on the universal remote 228 is a suitable replacement. This feature ensures that the location of the item is not later forgotten. The user can access the longitude and latitude information from the system database 232 to later retrieve the item 230 from the location identified by the universal remote 228. Accordingly, the user may later go back and pick up the item (430). Once the item is picked up, the latitude and longitude information previously stored in the system database 232 is cleared (432).

Alternatively, the universal remote 228 notifies the user (e.g. by beeping, vibrating or flashing) once the item becomes a predefined distance away from the user (434) if the item is forgotten in step (422). The latitude and longitude information is typically not recorded in this scenario because the user goes back and picks up the forgotten items (430). Accordingly, it may not be necessary to clear the latitude and longitude information in step (432) before the universal remote 228 defaults back to the "forget me not" mode. Regardless of whether the item was purposely left behind or "forgotten", once the item is back within range of the universal remote 228, the universal remote 228 defaults back to the "forget me not" mode (410).

The inventory control system 140' ensures that any item can be located and retrieved by (a) simply walking to the item and retrieving it (e.g., a house, office, refrigerator, walk-in closet, etc.); or (b) having the item brought to the user at the access location of the storage and retrieval system described above. The key is that the inventory control system 140' has location information of any particular good purchased or otherwise entered into the system 140' at any given time.

Another feature of the inventory control system 140' is the security of the information stored within the universal remote 228 and the system database 232. Security may be necessary in the event that someone steals the universal remote 228 or someone attempts to access the database 232 to retrieve inventory information therein. The inventory control system 140' can be secured with, e.g., a (a) password; (b) thumbprint; or (c) retinal scan. In the first embodiment, the user may need to enter a password into the universal remote 228 to access the inventory information therein. Alternatively, the universal remote 228 may include a thumbprint reader, whereby the information in the inventory control system 140' may only be accessed by the user that initially sets up the system 140'. Alternatively, and most preferably, the universal remote 228 may include a retinal scanner that takes a photograph of the user's eye during the initial setup. Accordingly, the universal remote 228 is only responsive to that individual after a subsequent retinal scan confirms that the user operating the universal remote 228 is the actual user that set up the inventory control system 140'. Alternatively, multiple persons may be granted access to use the universal remote 228 in the event that multiple passwords, thumbprints or retinal scans are entered into the system 140'. This feature is particularly useful when the inventory control system 140' is used by several people in a family (e.g. husband, wife, kids, etc.). That way, all individuals associated with the inventory control system 140' can store and retrieve items at will, in accordance with the embodiments described above.

FIGS. 103-110 illustrate another embodiment of the inventory control system. Here, the inventory control system is in the form of a software application designed for use with, preferably, portable electronic devices such as cell phones, PDAs, laptops, netbooks, tablet computers, wristwatches, etc. Although, a person of ordinary skill in the art will readily recognize that the software application can be used in association with virtually any electronic device that can process information. For purposes of this application, the device running the software application will be referenced as the aforementioned "universal remote". Preferably, the software application is offered through one or more online application stores such as the Apple App Store or through the Android Market. This inventory control system application is particularly advantageous because it operates with speech recognition software to anticipate and respond to certain directions given by the user. One drawback known in the art is that traditional menu systems are linear. That is, the user must step through a sequence of hierarchal menus to obtain the information desired (see, e.g. FIG. 107). If the information the user endeavors to obtain is buried deep within the menu system, the user must still step through a set of known menus before obtaining the desired information. This type of organization is time consuming for applications that retain a lot of data—such as the inventory control system described herein. In the event the user fails to go through the specific and proper sequence of menus, the user will arrive at the wrong information. As a result, the user must either step back through the set of menus or restart the process all over again. From an efficiency standpoint, getting information this way can be tedious. Another drawback is that efficiency is reliant on the user retaining an accurate memory of the hierarchy of menus within the system. For people, especially those with memory problems such as Alzheimer's, these systems are simply inadequate.

Moreover, navigation of prior art menu systems can be tedious as well since these systems are only designed to respond to expected responses. For example, a user may endeavor to obtain information from a company that offers information over the phone. All too often, users step through a sequence of menu options only to arrive at an unsatisfactory option. As a result, the user must step back through the menu system or start over. Some companies even publish these hierarchal menu systems to help users contact a specific department faster. Obviously, it would be easier to locate that "department" at the first step without needing to navigate a complex hierarchy of menu options. The inventory control system described below simplifies the process of finding information stored in a hierarchal database without the need of memorizing menus or options.

One advantage of the inventory control system described herein is that it is able to process spoken information to find a product or carry out an operation. In essence, the speech recognition technologies used to reproduce words is utilized in a search function that allows the user to find information without going through the tedious menus described above. Speech recognition is currently used in dictation applications where words spoken into a microphone are reproduced in a word processor. Speech recognition may include single command instructions to operate an electronic device such as a computer. In each application described above, the words spoken are tied to a specific word, action or purpose—similar to stepping a user through the aforementioned hierarchal menu system.

Figure 103:
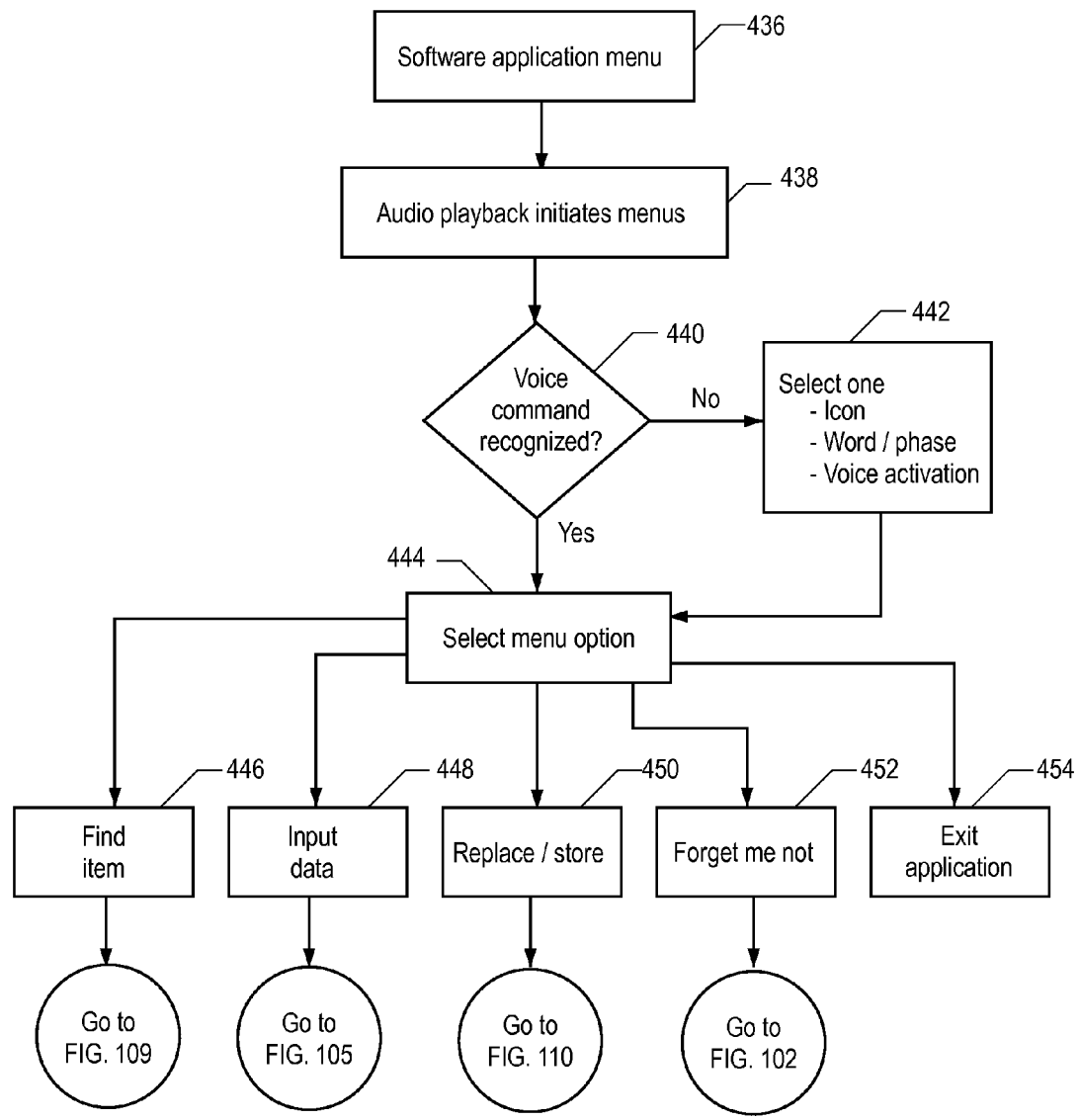
FIG. 103 is a flowchart illustrating a command-activated inventory control system.

Specifically with reference to FIG. 103, a flowchart illustrating the inventory control system starts by accessing a software application menu (436) capable of operating on any one of the aforementioned electronic devices (e.g. the universal remote). Here, the user is preferably greeted with an audio playback that initiates the menu system (438). For example, the user may hear the phrase: "How can I help you today?"

Additionally, the universal remote may include a visual display, such as an LCD or LED screen, that shows the text of the information in the event the user may be hearing impaired. Next, the user is asked to make a selection. Here, the user is able to instruct the inventory control system to perform some action. For example, as described in detail below, exemplary uses for the inventory control system are to (a) find an item; (b) input data; (c) locate or place an item for storage; (d) initiate the above-described "forget me not" feature; (e) remove an item from the system database; or (f) exit the program altogether. Preferably, the voice recognition engine keys into a specific command such as "find", "input", "locate", etc. to determine the proper course of action for the user. Of course, the commands are not simply limited to one word such as "find". In this respect, the system may endeavor to activate the "find" function should the user say "acquire", "attain", "get", "obtain", "procure", etc. In this respect, the speech recognition software identifies the command and the inventory control system determines the course of action. If the speech recognition software is unable to recognize the command, the user may be given the option to repeat the command, use a keyboard to input the command, or choose from a list of commands or icons representing commands.

The next step is for the inventory control system to determine whether the voice command was recognized (440). In this respect, the system may instruct the user to "speak clearly". The inventory control system speech recognition software is preferably configured to operate in more than one language. For example, the user may set the desired language, or the software itself may automatically detect the language being spoken. In this respect, the inventory control system software can be used by multiple authorized users from bilingual families, for example. In some circumstances, such as loud environments, the microphone on the universal remote may not be able to ascertain the command spoken by the user. In other circumstances, the software may simply be unable to ascertain the words spoken by the user (e.g. if the user mumbles). In the event the speech recognition software is unable to ascertain the command, the user may enter information into the universal remote through use of a touch screen (e.g. menus, a virtual keyboard, icons, etc.), a mechanical keyboard, mouse, stylus, or other data-input device that may be integrated, selectively attachable to or otherwise in wireless communication with the universal remote operating the inventory control system software. These options may include the ability for the user to select, e.g., an icon, word/phrase or simply request reactivation of the speech recognition feature (442). Thereafter, a menu option is selected (444). As briefly mentioned above, the menu options preferably include finding an item (446), inputting an item (448), replacing or storing an item (450), utilizing the "forget me not" feature (452), or simply exiting the inventory control system software (454).

Figure 104:
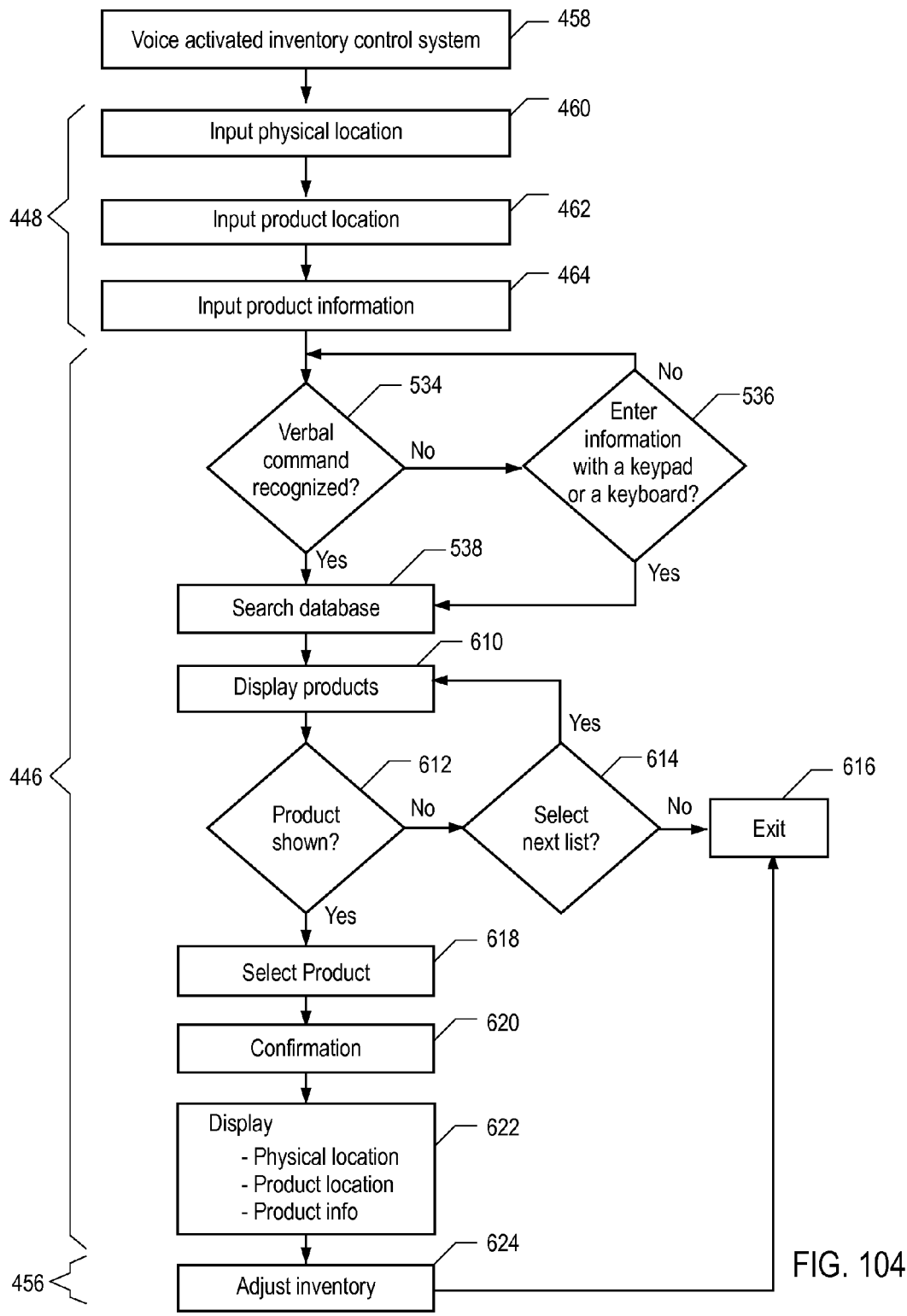
FIG. 104 is a flowchart illustrating a process for inputting product information, searching for that product information a database, and adjusting product quantities in the database as necessary.
Figure 105:
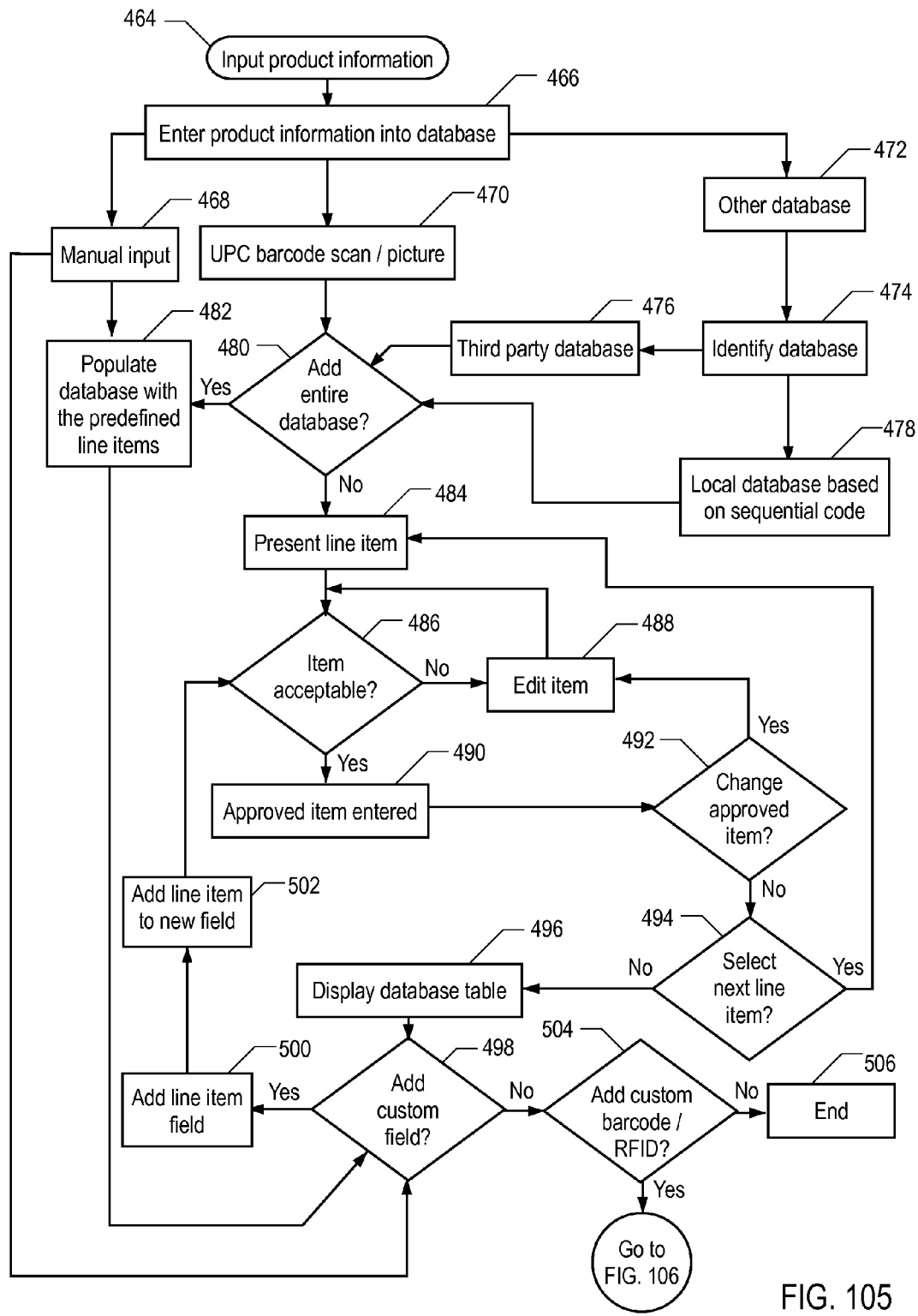
FIG. 105 is a flowchart illustrating a process for inputting product information into the database.

FIG. 104 illustrates a general flowchart for inputting (448), retrieving (446), and adjusting the inventory (456) of the products stored in the inventory control system database. At first, the information in the inventory control system database may be empty. That is, upon acquisition of the software, the user first needs to input information into the database so that items and products within the control of the user can be inventoried—and later tracked and retrieved. After obtaining the software, the user accesses the voice activated inventory control system (458). Since the database is likely initially empty, the user needs to access the input data step (448) via steps (436)-(444) described above with respect to FIG. 103. In FIG. 104, the input data step (448) includes acquiring the physical location of the product, the product location at that physical location, and the product information itself. For example, the user may endeavor to input information regarding food products stored within a pantry. The user would first input the physical location (460) of the product—in this case being the user's home. Next, the user endeavors to place that item within a pantry within the home. Here, the user inputs the product location (462)—i.e. the pantry. At this point, the user knows the general physical location of the product and a more specific location at that physical location where the product may be stored. For example, these first two steps (460) and (462) are particularly useful in enabling the user to quickly locate the specific location of a particular item when the user endeavors to find an item.

The inventory control system database may include a variety of pre-populated physical locations (e.g. home, work, car, etc.) and product locations (e.g. a closet, pantry, refrigerator, cabinet, drawer, etc.). Of course, the database itself is not limited to these pre-populated categories, and preferably, user would even be able to delete or rename these categories in order to provide maximum customization. Importantly, the user should be able to identify the locations by speaking a name—and each user may associate the same or similar locations within a residence by different names (e.g. compare "mud room" with "entryway"). Providing for such customization allows the user to speak into the microphone such that the speech recognition software is able to accurately identify the location where the item or product may be located. The inventory control system software would then convey such location information back to the user by some form of audio or visual notification. Additionally, the user may add physical or product locations to the database. For example, a user with a vacation home in Oregon and a vacation home in Michigan will have the option of adding these as separate physical location categories. In this case, the user may have a general category for "homes" and have more specific categories for "California Primary Residence", "Oregon Vacation Home" and "Michigan Vacation Home". These categories are obviously unique to this particular user as most users will not have three homes, one in California, one in Oregon and one in Michigan. This is useful in that the user may identify the items/products located at each physical location. The user may add/delete/rename categories regarding the product location and the product information as well.

Once the user inputs the physical location (460) of the item, the user next inputs the product location (462) of the product at that physical location. As briefly mentioned above, the product location information is customizable based on the needs of the user. For example, a person with a wine cellar may endeavor to use the inventory control system to track the type, quantity and location of wine in the cellar. Here, the physical location of the wine may be the residence of the user or another storage facility. When stored at the home, the user may specifically identify that certain wine is located in the basement, refrigerator, or the wine cellar. For wine in the cellar, the user may even specify a particular row/column. Each of these categories (e.g. the "basement", "wine cellar", "row/column") may be pre-populated by the software database or may be customized by the user. For instance, the system database may include an option to add a category for "wine cellar" to the product location information. The software itself may suggest pre-populated categories for product location information—such as rows and/or columns. The user may have the option to add these suggested categories, rename the categories, add categories, or simply decline to use the more specific category and, instead, use only the general "wine cellar" category as the product location information. The product location information is preferably as specific as technology allows so that the user can pinpoint the exact location of any item stored within the inventory control system database, and retrievable as described above. For example, the above-described GPS system would enable a user to identify the general vicinity or location (e.g. the physical location) where a product is stored. Then, localized RFID readers, having a higher sensitivity but shorter range, can pinpoint the product location at that physical location.

After the user inputs the physical location (460) and inputs the product location (462), the user then inputs the product information (464). The process for inputting the product information (464) is shown in more detail in FIG. 105. The first step is to enter product information into a database (466). There are several ways of inputting information into the database that include manual input (468), UPC barcode scan/picture input (470) and input from another database (472). For instance, product information may be input manually (468) by speaking product information into the microphone. Here, the inventory control system software may ask the user to respond to one or more of a series of questions regarding the product and the product information. Alternatively, the user may manually enter information by using other input devices such as a keyboard, keypad, touch screen, mouse, stylus, etc. The keyboard and/or the keypad could be a virtual (e.g. a touch screen or software-driven), a non-virtual (e.g. a mechanical keyboard or hardware-driven), or a Braille keyboard/keypad. Input could also be accomplished by automatically reading an RFID chip or other information transmitting device on the product. The universal remote should include a barcode reader such as a camera, an infra-red device, a laser light beam device, or another mechanism known in the art. Information obtained from the barcode or RFID chip is stored in pre-populated or custom fields for later retrieval, as described in more detail below.

In a particularly preferred embodiment, the inventory control system software can input information through use of a UPC barcode scan or picture (470). In this embodiment, the universal remote may include a standard bar code scanner that can read the UPC barcode to obtain product information therefrom. Alternatively, and particularly preferable, the universal remote includes a camera that can take a picture of the bar code. The bar code information is deduced by analyzing the picture. The inventory control system application may be integrated with other applications such as the "Red Laser" iPhone application (or others such as Zebra, Crossing or Shop Savvy) to analyze the barcode being scanned. The barcode information may then be cross-referenced in a local or third party database (e.g. Google Shopping) to obtain product specific information. In another embodiment, the universal remote may be equipped with an electronic reader that can communicate with an active or passive RFID tag that may be attached to the product. Here, the universal remote sends out a query to the RFID chip embedded or attached to the item being input into the database. Information on the RFID chip is automatically relayed back to the universal remote for entry into the database. The inventory control system software preferably automatically populates the database with information sent from the RFID chip on the product. Fields specific to the product, not previously populated in the database, may either be automatically created without authorization from the user, automatically created with authorization from the user, or individually manually approved. The software may include an option where the user may toggle among options depending on the product being entered into the inventory control system.

Alternatively, the inventory control system software may utilize some other database (472) to obtain product information. For example, in the event the user selects to obtain information from another database (472), the user is prompted to identify a database (474). Here, the user may select a third party database (476) or a local database based on a sequential code (478). Preferably, the prompting step (474) is part of the system settings, a configuration menu, or otherwise provided in an "advanced users" setting. In this respect, the system should work out of the box such that the user does not need any knowledge in electronics to get the program to work. The third party database (476) may include an online database capable of communicating with the universal remote or home database. Alternatively, the user may integrate the inventory control system software with other third party database access software. In either embodiment, the third party database information is automatically accessed when using the inventory control system. The inventory control system software is preferably connected to or in communication with a network having internet access. The user may have a subscription to a third party database that can populate product information based on a unique code, a product description or even the barcode on the product. Such a database may be accessible from a generic third party, the product manufacturer, or the company that sold the product to the end user. In each case, the inventory control system software accesses the relevant database through a computer network such as the internet, an intranet or other data communication means such a cellular networks. The third party database (476) may be particularly ideal in the event the user buys products from a particular manufacturer, or is a regular shopper at a particular store (e.g. a grocery store).

Alternatively, the user may access a local database of product information based on a sequential number code (478) automatically generated as items are input and stored in the inventory control system database. Here, products that are tagged with a unique barcode/RFID chip in accordance with FIG. 106 may be automatically identified from the inventory control system database. For instance, when a new product is entered into the inventory control system, a miniature barcode may be printed and affixed to the product. The barcodes may include preprinted sequential labels, similar to preprinted return address stick on labels, or printable labels. Information used in association with the labels may also include the physical location and specific location, e.g., a cabinet. The "cabinet" may also include a number identifier in the event there is more than one cabinet at the physical location where the product is stored. Other pertinent information such as product name, location, description, and UPC Barcode are preferably included with the label. The miniature barcode label is attached to the product once the user confirms all the information has been entered. The user can later scan the barcode on the product to pull product specific information from the local database. Deriving product information this way may operate in the same or a similar manner as retrieving product information from the third party database described with respect to step (476). The barcode/RFID label is particularly useful for replacing or storing products, as described below with respect to FIG. 110.

In the case of when the user decides to enter product information by using a UPC barcode scan/picture (470), a third party database (476) or the local database based on a sequential code (476), the next step is to determine whether the user wants to add all the information in the entire database (480) to the local database of product information. In some cases, it may be desirable to simply accept full database upload and allow the inventory control system software to populate the database with predefined line items (482). This is especially so when the user has already input the product into the database such that product information can be easily recalled therefrom with the assigned sequential code/number. Additionally, the user may have the option to add an additional or custom field, delete a field, rename or otherwise modify any of the line item fields in the database, as described in more detail below. The system may show the status of the barcode transfer as information is imported to the system database.

In the event the user decides not to import the entire database, the system presents a line item (484) to the user. The line item may include a field that identifies some sort of information to be stored within the database. For example, in the event the product is a food item, the field may include an "Expiration Date". The line item populated by the system for that field may include the date of expiration, such as "Mar. 5, 2011". Other fields, for example, may include type, quantity, size, etc. The number of fields that can be incorporated into the inventory control system database is virtually limitless—especially since the user can add and delete fields as desired. Information from the database is preferably automatically populated within the line item field. Thus, the user is given the opportunity to decide whether the populated field is acceptable (486). If the item is not acceptable, the user is given the opportunity to edit the item (488). Once the line item field entry is acceptable, the user approves the item (490). The system may highlight the accepted line item field entry and import a field number associated with that entry into the database. Preferably, the user is notified that the entry was accepted and entered. For example, the information in the selected field highlights (e.g. flashes) as it is imported into the inventory control system database. All line item fields that are transferred then are marked in bold. The user is next presented with an option to accept and enter the line item into the database (492). At this stage, the user may still have the option to go back and edit the item (488) if the user decides to change some entry in the field. The user may edit a particular line item field by simply identifying (through speech or keypad entry) the number associated with the field code to be edited. Alternatively, if no changes are needed at this stage, the line item entry is entered into the database and the user is presented with the next step of determining whether to select another line item (494). If additional information is needed to be entered into the database, the inventory control system software may automatically return the user to step (484) wherein the software presents the user with another line item of information to be entered into the database. Alternatively, instead of being automatically rerouted to step (484), the user may manually continue to add line items of information into the database.

The inventory control system software may notify the user that all the information has been entered into the system database by stating that the "source entry is complete". Once all the line items of information have been input into the system database, the inventory control system software displays a database table of information to the user (496). The display may show the name of the product, the type of product (e.g. food), a picture of the product, along with other selectively viewable information. Preferably, the user is able to customize the display settings such that the information conveyed matches the information the user endeavors to review. For example, for food items, the display may show the name, quantity and expiration date of the food item. For electronics, the display may show the name, location, and warranty. A person of ordinary skill in the art will readily recognize that there are many different ways to customize the menu and display system depending on the type of entries in the system database.

The user is then given the option to determine whether to add a custom line item field (498). This option exists in the event that the UPC barcode scan/picture, the third party database, or the local database does not include all the designed fields of information regarding the product being input into the inventory control system database. Thus, the user may proceed to add a line item field (500). The user may specify the name for this field or may choose from one of several suggested fields. Preferably, the field name is some alphanumeric combination that relates to some product quality or characteristic being stored in association with that field. Although, the field name may be made up of virtually any combination of letters, numbers, or symbols. Once the field name has been determined, the user then proceeds to add information to the new line item field (502). The process of accepting the item (486), approving the item entered (490), determining whether to change the item (492), determining whether to select another line item entry (494), displaying the (updated) database (496), and determining whether to add another custom field (498) repeats itself. Only after the user has entered all the desired information does the system determine whether the user wants to add a custom barcode/RFID (504) to the product entered into the system. If not, the system exits the input procedure (506). Otherwise, the system procedures to the step for adding custom barcode/RFID information to the product (508) in FIG. 106.

Figure 106:
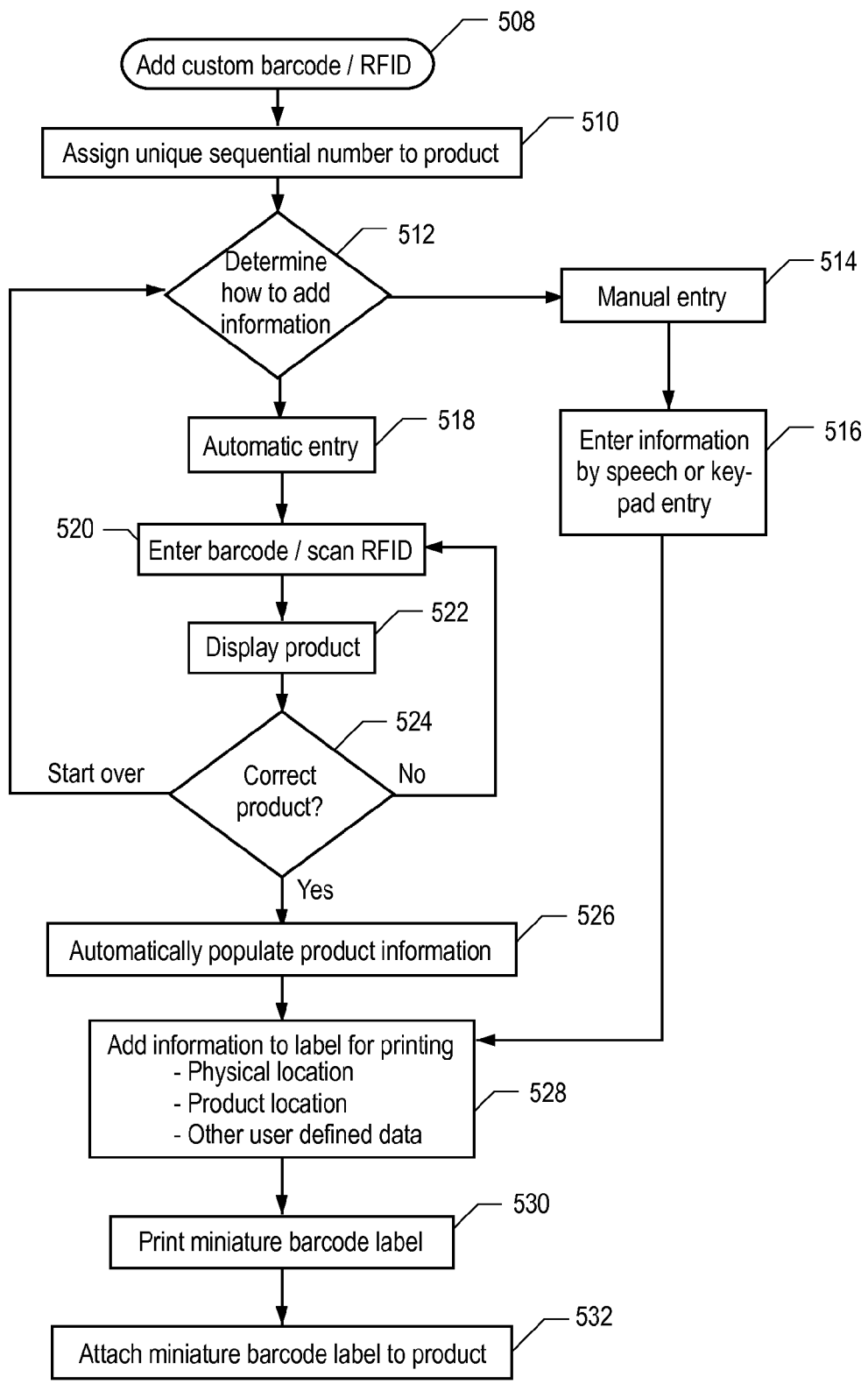
FIG. 106 is a flowchart illustrating a process for adding a custom barcode/RFID chip to a product.

FIG. 106 illustrates a flowchart for assigning a custom barcode or an RFID chip to an item or product to be identified with the inventory control system described herein. The first step here is to assign a sequential number to the product (510). The local inventory control system may utilize such a numbering system to keep track of products—and to number like products. For example, the inventory control system may preferably include a set of miniature barcode labels that are in a pattern format—and not the line format of UPC barcode labels. In one aspect, the miniature barcode labels may include a set of preprinted sequential labels similar to preprinted return address stick on labels that are arranged on sheets. Upon purchase or other acquisition of the inventory control system software, one or more (e.g. an original and a duplicate) sheets of these preprinted sequential labels may be provided to the user. Additional sheets may be purchased or provided in exchange for a monthly fee. The information printed to the miniature barcode labels could be the same or at least preferably similar to the information stored in the inventory control system database. For example, the miniature barcode labels could include information such as a form field for "Box" with values of "Box" #1, 2, 3, etc.; a form field for "Cardboard Box" with values of "Car. Box" #1, 2, 3, etc.; a form field for "Folder" with values of "Fold." #1, 2, 3, etc.; a form field for "Pendaflex Folder" with values of "Pen." #1, 2, 3, etc.; a form field for "Drawer" with values of "Draw." #1, 2, 3, etc.; a form field for "Shelf" with values of "shlf" #1, 2, 3, etc.; a form field for "Cabinet" with values of "Cab." #1 or #2 (if there are more than one cabinet in a room); a form field for "Closet" with values of "Clst" #1 or #2 (e.g. if there is more than one closet in a room); and a form field for "3 Ring Looseleaf Binder" with values of "3 Ring" #1, 2, 3, etc. A person of ordinary skill in the art will readily recognize that there may be many different ways to uniquely identify product location information and information associated with the product on the miniature barcode. In this respect, the user may have the option of adding personalized information to the miniature barcodes through use of a printer, such as location information and product information. In one embodiment, the printer is a modular printer that may be transported with the universal remote operating the inventory control system software. Alternatively, the printer could be a household printer or other printer networked or otherwise in wireless communication with the universal remote running the inventory control system software.

In the case that information can be added to the miniature labels and then printed, the next step is to determine how to enter the information into the inventory control system software for printing (512). As with the above-described embodiments, it is preferred that the user enter the information through use of the aforementioned speech recognition software or automatically with a barcode or RFID chip. With speech recognition, the user may, at any point while navigating the menus or providing the system with instructions or information, use voice commands to operate different aspects of the inventory control system software. For example, with respect to step (512), the user may use voice commands to "enter information"—and then describe the information to be entered into the form field for printing. Likewise, the user may use similar commands to enter information into the line item fields described with respect to steps (464)-(506) described with respect to FIG. 105. Additionally, the user may use keyword voice commands (e.g. verb-based commands) to skip to different functions (e.g. finding an item (446), inputting data (4448), replacing/storing information (450), activating the "forget me not" feature (452) or simply exiting the application (454)). The voice recognition software preferably reacts to commands, activates certain features, navigates menu options, and searches for products. This is advantageous over prior art embodiments that require the user to simply step through linear menu systems. This particular feature is described in more detail below with respect to FIGS. 107-108.

In the event the user chooses to input information manually (514), the user may simply use voice commands through the speech recognition software to add information; and, alternatively, the user may use a keypad or keyboard to enter information (516) into the inventory control system. On the other hand, the user may choose to automatically enter information (518). Here, it is preferred to scan/photograph a barcode or read an RFID chip (520). The universal remote may automatically deduce information on the product, as described above, as a result of scanning the barcode or reading the RFID chip. The software will then display the product (522) so the user can verify that the inventory control system has identified the correct product (524). If the product is incorrect, the user may be taken back to step (520) to re-enter the barcode or re-scan the RFID chip in an effort to correctly identify the product. Alternatively, the user may endeavor to "start over" and go back to step (512) to repeat the input and selection process. It may be desirable to "start over" in the event the user is unable to automatically correctly identify the subject product. Accordingly, the user will be able to go the route of manual entry (514). In the event the product is correctly identified, the system automatically populates the product information (526).

The next step is to add information to the custom label for printing (528). Preferably, information such as the physical location of the product and the product location, as described above, are printed on the label. Information may be printed to the label by a printer or otherwise written on the label by the user. Other user defined information such as bin or drawer number, quantity, expiration date, etc. may also be imparted to the label at the time of printing. At step (528), the user preferably has the option of customizing the information to be included on the label. For example, the inventory control system software may be in communication with a home or work printer to print information to one or more blank labels.

In other embodiments, the user may simply fill write-in information in blank fields on the label.

The labels themselves are selectively attachable to the item or product to be entered into the inventory control system database. The labels may have a non-removable or removable adhesive on one side that selectively secures the label to the product once peeled off a retaining sheet. The labels may also have an embedded RFID chip that can communicate with the universal remote in the event it is queried by an interrogation signal emitted from a reader. This facilitates automatic information exchange with the label. Additionally, this allows the inventory control system to automatically track the location of various products entered into the system database when those labels are within range of the readers (e.g. within a home). Once the information has been imparted to the label (e.g. by printing, written, digital communication with an RFID chip, etc.), the printed miniature barcode label (530) is ready for attachment to the product (532). In this case, the term "print" may include simply sending information from the reader to the miniature barcode label for storage on an RFID chip—or other embedded communication device.

Figure 109:
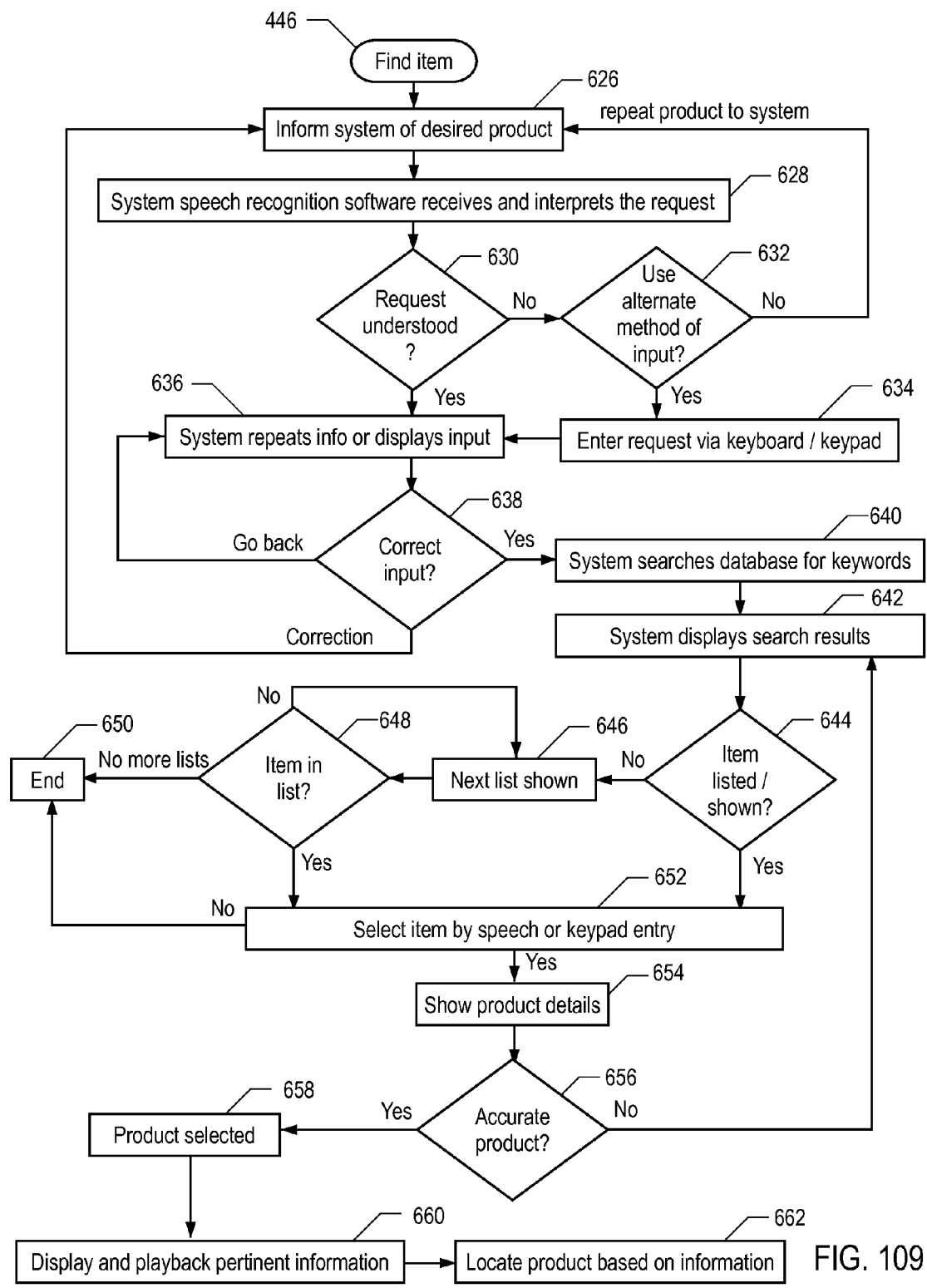
FIG. 109 is a flowchart illustrating a process for finding an item or product in a database.

After all the product information is entered into the inventory control system database in accordance with step (448) and more specifically with respect to steps (460)-(464), the inventory control system is then set to receive voice commands to find, replace, store, delete, or track items entered therein. FIG. 109 further illustrates a set of steps for finding an item (446). Specifically, the system must determine whether the verbal command from the user was recognized (534). At this step, the verbal command may instruct the inventory control system software to perform any of the above-mentioned functions—i.e. find an item (446), input an item (448), replace or store and item (450), activate the "forget me not" feature (452), or exit the inventory control system (454). In the event the system is unable to ascertain the verbal command, the system user must determine whether to enter the information with a keypad or a keyboard (536). If the user decides not to enter the information with the keypad or keyboard, the system then goes back to step (534) and allows the user to re-enter the command verbally. Alternatively, the user may simple make use of the keyboard or touch screen keypad to enter information. The non-verbal input device may be particularly useful in the event there is background noise that may disrupt proper interpretation of information spoken into the universal remote microphone.

For the purpose of FIG. 109, the verbal command or keyboard/keypad entry is in the form of a request to "find", "locate", "search", etc. Any one of these words may activate the find an item (446) function. For example, the universal remote may receive a verbal command to "find my running shoes". The universal remote parses out this command into two segments: (1) the "find" portion of the request; and (2) the keywords pertaining to the "running shoes". In the first instance, the software knows that the user endeavors to active the steps associated with the find an item (446) as described above. The second portion of the request identifies the product the user endeavors to find—i.e. the "running shoes". Accordingly, the software system searches the database (538) to find items/products similar to "running shoes". The system software may include a logic engine similar to that of an internet search engine such as Google. In this respect, the system will search for more than just "running shoes", like variants such as "shoes, running", "running" alone, "shoes" alone, and the combination of similar words and phrases that may be interpreted by the logic engine as being similar to the spoken phrase "running shoes".

Figure 107:
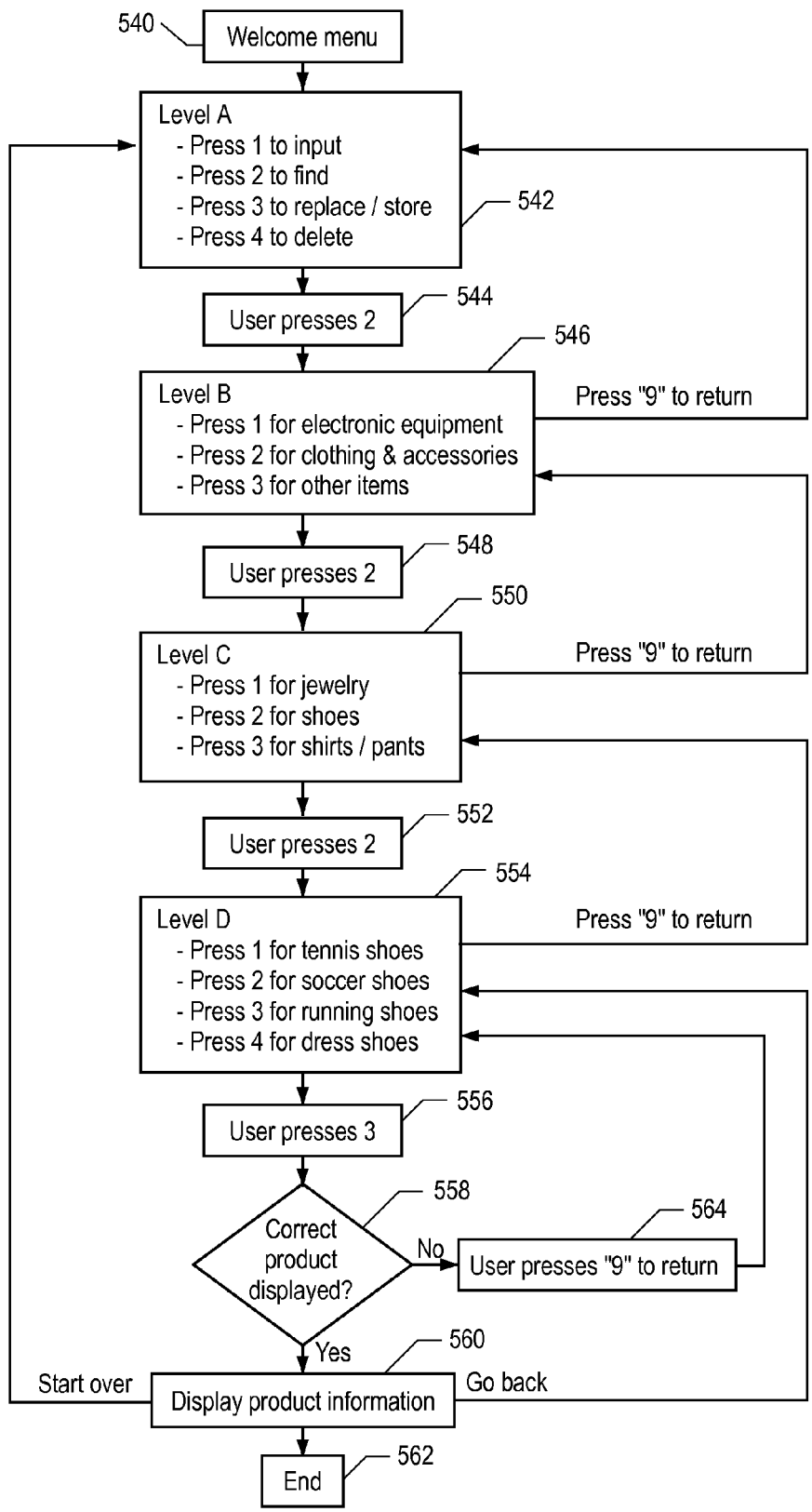
FIG. 107 is a flowchart illustrating a prior art process for accessing information in a hierarchal database.

The search function (538) goes through each hierarchal category used to organize and identify the products stored in the inventory control system database. In this respect, the user may customize the organization of the products in the database without being required to remember or memorize the hierarchy. For example, FIG. 107 illustrates a prior art flowchart that requires a use to step through multiple menus to obtain information related to "running shoes". In this example, the user begins interaction by accessing a welcome menu or other welcome screen (540). The welcome menu may be a display screen or an audio playback as is commonly encountered with phone-based hierarchal systems. The user is presented with a series of selectable options in Level A that include: "Press 1 to input", "Press 2 to find", "Press 3 to replace/store", or "Press 4 to delete" (542). In this example, the user endeavors to "find" an item and therefore presses "2" (544). The user is then taken to Level B, which displays a new list of options that includes: "Press 1 for electronic equipment", "Press 2 for clothing & accessories", or "Press 3 for other items" (546). Since the user endeavors to find "running shoes", the user presses "2" (548). The user is next taken to another level, Level C, and presented with more categories that include: "Press 1 for jewelry", "Press 2 for shoes", or "Press 3 for shirts/pants" (550). The user selects option "2" (552) to continue toward obtaining information on the "running shoes". In level D, the user is presented with a series of shoe products that include: "Press 1 for tennis shoes", "Press 2 for soccer shoes", "Press 3 for running shoes", and "Press 4 for dress shoes" (554). Having arrived at the category desired (i.e. "running shoes"), the user presses "3" (556). At each level the user was required to listen or review each option to select the most accurate option to obtain information on "running shoes". In this example, the user had to navigate at least four levels to obtain information on "running shoes". Next, the user may receive a prompt to determine whether the correct product is displayed (558). If the product displayed is correct, the user may continue to be shown the product information (560). After viewing the product information, the user may simply exit (562) or choose to "start over" and go to step (542) or "go back" to step (554) to reselect another one of the options at Level D. Alternatively, the user may, in step (558), decide that the product is incorrect and, instead, choose to press "9" to return (564) to Level D to make another selection. In fact, the user may have the option to select or press "9" at anytime (e.g. at any of Levels B, C or D) to return to the previous menu. These are the typical hierarchal organizational systems known in the art.

Figure 108:
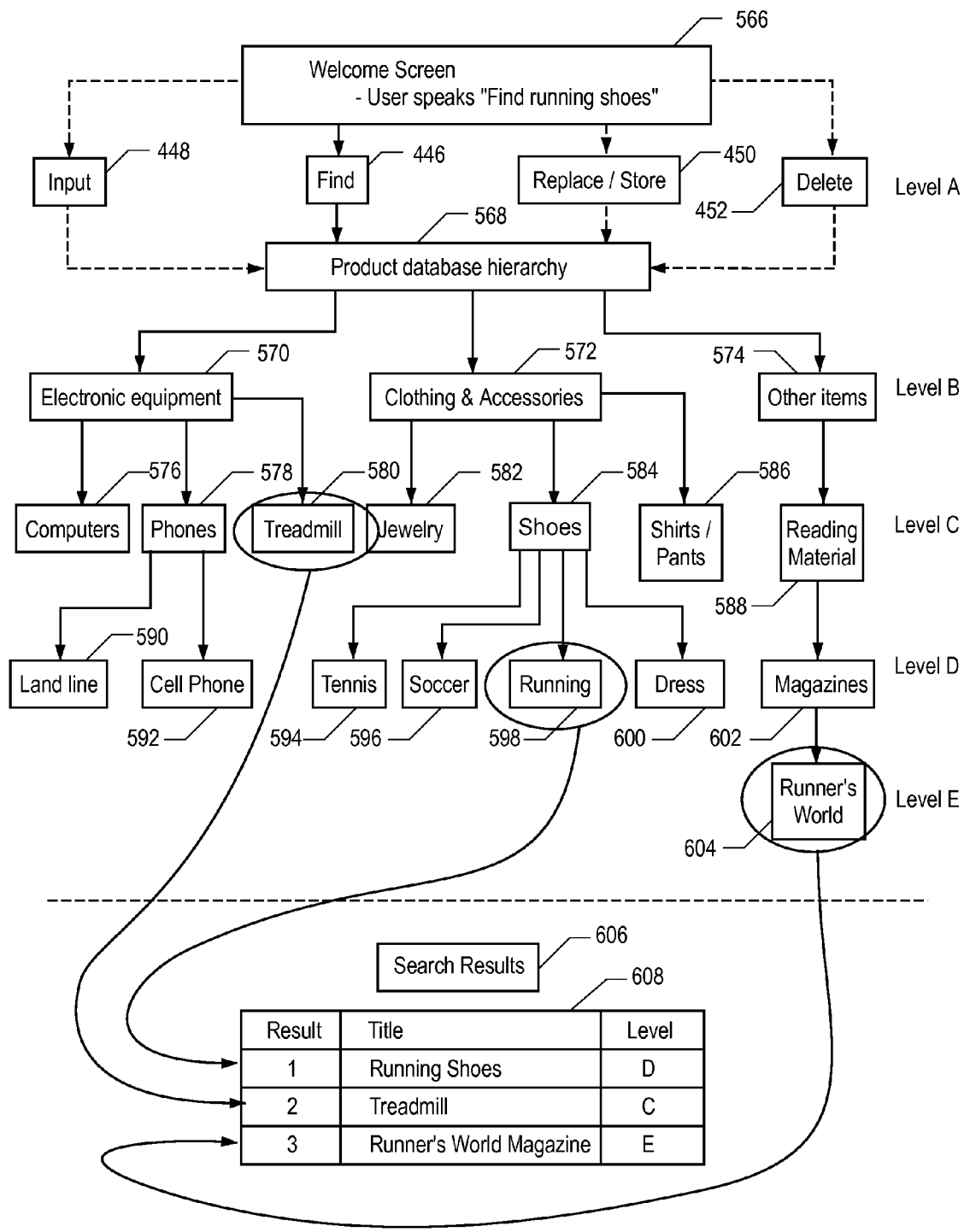
FIG. 108 is a flowchart illustrating a process for accessing information in a hierarchal database in accordance with the inventory control system process described herein.

The inventory control system described herein greatly improves upon the system described with respect to FIG. 107. For example, FIG. 108 illustrates application of the "find" mechanism. Here, the user starts with a welcome screen (566) that invites the user to issue a command. As described with respect to step (534) in FIG. 104, the user speaks the phrase "find running shoes". In this case, the options identified in Level A in FIG. 107 are merely shown for purposes of illustration. Because the user spoke the word "find" —the software automatically knows to take the path of finding an item (446) as opposed to inputting an item (448), replacing or storing an item (450) or deleting an item (452). This is shown in FIG. 108 by the solid lines connecting the welcome screen (566) with the find an item option (446) as opposed to the dotted lines connecting the welcome screen (566) with each of steps (448), (450) and (452). Immediately, the inventory control system software accesses the product database hierarchy (568) to begin searching for relevant information pertaining to the phrase "running shoes".

Levels B-E in FIG. 108 are substantially similar to the hierarchy of menu options previously discussed with respect to FIG. 107. As shown in FIG. 108, Level B includes options for electronic equipment 570, clothing & accessories 572, and other items 574. Each of these categories include sub-categories identified in Level C as computers 576, phones 578 and treadmill 580 for the electronic equipment 570; jewelry 582, shoes 584, and shirts/pants 586 for the clothing & accessories 572; and reading material 588 for other items 574. Further sub-categories in Level D may include landline 590 or cell phone 592 for phones 578; tennis 594, soccer 596, running 598 or dress 600 for shoes 584; and magazines 602 for reading material 588. Even further, Level E may list Runner's World 604 as a sub-category of magazines 602. With the product database hierarchy adequately set forth in the diagram in FIG. 108, it is easy to see that the search can access multiple levels of information at a time. Preferably, all the information associated with the products, the product categories and any related sub-categories are indexed in real-time to improve the accuracy and speed of any resultant search.

When the find step (446) is activated in FIG. 108, the search function identifies the most relevant search results and pulls that information out of the hierarchal database for display to the user as the search results display 606. In this example, the most accurate search result for "find running shoes" are the running shoes themselves. The shoes are listed first in a search results table 608. As such, the next best match for "running shoes" may be the association of running shoes with a "treadmill". Accordingly, the table 608 identifies the treadmill as "Result 2". Likewise, the search results may also display Runner's World magazine as a search result because of the similarity between the word "running" spoken in step (566) and the "Runner's" portion of the magazine name. Plus, there is an inherent association between a magazine on running and "running shoes" themselves. According, this result is number 3. The levels are shown next to each search result for illustration purposes only—i.e. Level D pertaining to Running Shows, Level C pertaining to Treadmill and Level E pertaining to Runner's World Magazine. This shows that the "find" function is able to obtain search results from multiple different levels. To search, the user may use different types of search functions to better define the scope of the search results. For example, the user may use Boolean connectors, terms and connectors, natural language, or other search functions that might be recognized by the system (e.g. eliminating certain words from the results). Preferably, the system identifies relevant products using open source or proprietary organic search algorithms, such as the search algorithm employed by Google. Accordingly, the user may select one of the search results through interaction with a touch screen or by verbally selecting "Result 1" or "Running Shoes" to obtain the product details and the location of that item.

One advantage of the search function described above with respect to FIG. 108 is that the user is not required to remember the exact product name, the exact product location, or even the location of the product within the hierarchal database. This is particularly advantageous and more efficient than the more traditional menus system described with respect to FIG. 107 because the user is not required to remember or track through the various sub-categories of information. Instead, the user only needs to remember some form of description of the item endeavoring to be located. The search does not even need to be specific to the name or product description, but could instead include other pertinent information like "expiration date" for food. In this example, the inventory control system database may present the user with a list of food items in an order of product expiration. In this respect, a person of ordinary skill in the art will readily recognize that there may be many different ways to present search results to the user based on any searchable information stored within the database.

The search results display 606 is synonymous with the display products step (610) shown in FIG. 104. Here, the user may view the search results table 608 (FIG. 108) to determine whether the product desired is shown (612). In the event the product is not shown, the user may have the option of selecting another list (614) in the event there are more products to list than the page can display. Although, preferably, the list is a continuous list that simply scrolls through all the possible search results. If there is another list to select, the user is taken back to another display of products in step (610). If there are no other products, the user may simply exit the program (616). If the product is shown, e.g. the "Running Shoes" shown in FIG. 108, the user may then select the product (618). The user then receives confirmation (620) and is shown the pertinent product information in step (622), such as the physical location of the product, the product location at that physical location and pertinent product info entered into any one of the line item fields described above. If a product is added or removed from the system at this point, the inventory control system may automatically adjust the inventory (624).

FIG. 109 illustrates a flowchart showing the logic steps behind the operation of the find an item (446) function described above, such as with respect to FIG. 108. When the user speaks the phrase "find running shoes," the inventory control system software parses out the "find" language from the rest of the statement that requests "running shoes". The "find" language initiates the find an item step (446) shown in FIG. 109. The next step of informing the system of the desired product (626) preferably occurs automatically when "running shoes" is differentiated from "find" when the user issues the "find running shoes" command. Accordingly, the system speech recognition software receives and interprets the request (628). Next, the software determines whether the request was understood (630). If no ascertainable information can be gathered from the spoken word or phrase, the user interface prompts the user to use an alternate method of input (632). If the user declines to use alternate input, the system is unable to continue with the request and the user is taken back to the step of informing the system of the desired product (626). Here again, the user has the option of speaking into a microphone to give commands or provide a description of the product. Alternatively, the user may choose another means for entering information such as by use of a keyboard or keypad (634). Other forms of input may be used such as a touch screen, stylus, mouse, etc. The system will repeat successfully entered information to the user (636) to ensure that the information processed is accurate to the request of the user. The user then determines if this information is correct (638). The user may have the option to "Go Back", in which case the system merely repeats the information or again displays the input (636). Alternatively, the user may say "Correction", in which case the user is taken back to step (626) to re-enter the information.

When the keywords recognized by the speech recognition system or otherwise entered by the keyboard/keypad are correct, the system searches the database for the keywords (640), e.g. in accordance with the search steps shown and described with respect to FIG. 108. Similarly, the search results are then displayed (642) (e.g. see the table 608 in FIG. 108). The user may scroll through one or more results to find the desired product. If the user determines the product is not listed or shown (644), the user may opt to show the next list (646). The user again scrolls through the list of options to determine whether the desired product is listed (646). If the user decides that the desired product is again not shown (648), the user may repeat the process of obtaining another list (646) until the product is shown and can be selected. Otherwise, the user may need to simply end the search (650) because the product is not in the database. If this is the case, the user may need to input the product (446) in accordance with the embodiments described with respect to FIGS. 105-106. If the scroll feature is able to show each product in the search without the need to obtain additional lists or pages and the desired product is not listed, the user moves immediately to step (650), thereby bypassing steps (646)-(648). If the desired item is shown in the list in either of steps (644) or (648), the user may select the item by speech or keypad/keyboard entry (652). The database information is then retrieved and presented to the user (654). The user may be shown information such as a product description, a small photograph of the product, the product's location, quantity, etc. The user then decides whether this product is accurate (656). If this is the incorrect product, the user is taken back to the display list of products (642). Preferably, the user is taken back to the previous list of products so the user does not need to go back through each list. In the event all the products are listed on one scroll page, the user is taken back to the last viewed scroll point. Alternatively, the user may confirm the product selected is accurate (658), wherein the universal remote will display and playback pertinent information regarding the product (660) so that the user may locate the product based on that information (662).

Figure 110:
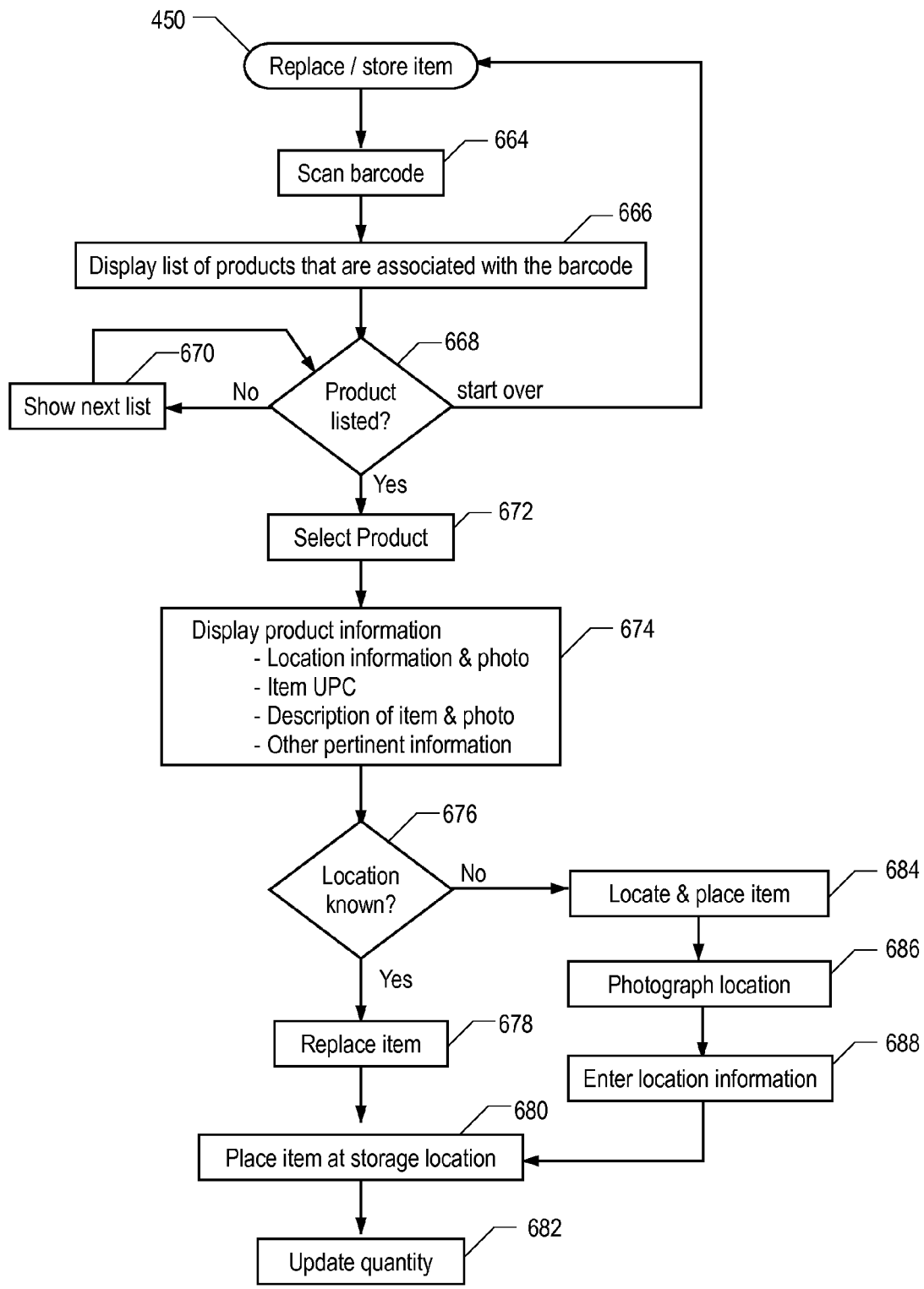
FIG. 110 is a flowchart illustrating a process for replacing or storing an item in accordance with the inventory control system process described herein.

Additionally, FIG. 110 illustrates a flowchart of replacing/storing an item (450) in the inventory control system database. Here, the first step is to scan the product barcode (664) with the universal remote. Preferably, product information can be obtained from the barcode in order to match this product with other products that may be stored in the system database. In terms of these steps, it is assumed that the product already exists in the database such that the universal remote is able to display a list of products that are associated with the barcode (666). The list may have more than one product associated with the scan (664) because the same product may be stored in more than one location. Step (666) allows the user to obtain real-time location and quantity information for the scanned product. Next, the user must determine whether the product is listed (668). If there are too many products to list on one page, the user may need to select the next list of products (670). Accordingly, the user may repeat this process until the desired product/location combination appears. Although, preferably all the products are listed on a single continuous scroll page. Alternatively, in the event the product is not shown, or if the user simply wants to start over, the user may speak or otherwise enter information (e.g. by a "gesture", as described below) into the inventory control system that enables the user to "Start Over" and go back to step (450).

In the event the desired product is listed, the next step is for the user to select the product (672). The universal remote processes the request and displays product information to the user (674). Preferably, the product information includes location information and photo, the item/product UPC and a description and photograph of the item. The display may include other pertinent information that the user may choose from time to time. Of course, the display of information is fully customizable, as described above. The system next checks to determine whether a storage location is known (676). If the location is known, the user proceeds to replace the item (678) by placing the item at the location (680) and the quantity stored in the database is accordingly updated (682). Alternatively, in the event the location is not known (676), the next step is to locate and place the item (684). Here, the universal remote may suggest locations to place the item. When used with the smart waiter storage and retrieval system described above, a bin or drawer may be automatically presented to the user based on characteristics of the product. Preferably, the suggested location contains similar products—especially for food products. The user is then prompted to take a photograph of the location (686) for entry with the other location information (688) in the database. The location and photographic information are captured to provide the user with the most information possible in order to facilitate finding the product at a later date. Accordingly, the user places the item at the storage location (680) and the quantity in the database is updated (682). Conversely, anytime a product is taken out of the inventory control system, the quantity in the database is updated to reflect the decreased quantity. Upon removal, any barcode, RFID chip or other information transmitting device would be deactivated. Moreover, if the quantity of an item reaches zero, the user may have the option of leaving the identification information in the database or completely deleting the product in its entirety. Custom alarms may also be set to alert the user when select products reach a certain threshold (e.g. a threshold quantity or expiration date).

GPS location can be utilized to specify the general location (e.g. the physical location) of the product. The GPS system may provide the system database with the general coordinates (e.g. triangulation coordinates) of the product location. This may enable the user to immediately identify if the product is stored in the home, office, warehouse, or in another city. Other technology may further be utilized to distinguish between a pantry, refrigerator, and closet in a house. Preferably, a photograph of the location accompanies the GPS location so the user may immediately recognize and identify the location. Alternatively, the location may be identified with a number so that the universal remote does not need to transfer picture information each time a product is referenced.

The inventory control system may also make use of local RFID (or another data transmitting device) and local miniature bar codes to identify particular locations and the products that may be stored in association with that particular location. For example, products stored within a closet may be associated with a closet RFID chip. As such, the user may be able to open the closet and scan the closet RFID chip to find out exactly what is inside. The universal remote will display a list of items for the user to review. The user may even do a product search confined to items in the closet. This will prevent the user from searching for and obtaining results for products in the wrong closet. The user may conduct a similar search by grouping more than one location together (e.g. adjacent rooms). The location could be taken to any extreme desired, depending on the sensitivity of the technology being used. Ideally, each product could be located on specific shelves or within certain drawers. Additionally, the miniature barcode may be attached to the closet instead of or in addition to the RFID chip. Here, the barcode is simply used for identifying the closet in the database. For security purposes, it may be particularly preferred that the barcode only provide identification information as opposed to storage information. This feature would prevent anyone from simply scanning the barcode and obtaining information regarding the contents of the closet. Reading the barcode would notify the user that this is the correct closet.

The inventory control system also preferably includes a backup system for protecting data. In one embodiment where the database server is located onsite (e.g. at the user's home), the backup data could be uploaded to an online database. Alternatively, the backup database may be stored locally on the database server, on another hard drive within the database server, or on another computer system at the user's house (preferably isolated from the database server). Information stored locally on the universal remote should also be backed up periodically to the database server or another remote server. In one embodiment, the universal remote may activate a backup routine upon encountering a selected "event". Such an event could be time-based (e.g. every 24 hours), action-based (e.g. every time the phone is turned "off"), power-based (e.g. when the phone is plugged into a charger), event-based (e.g. each time the universal remote connects to a WiFi network or other internet connection), etc. Features from each of these examples may be mixed and matched. For example, the universal remote may backup every time it connects to a WiFi network with a minimum of 24 hour intervals between backups. In each of these examples, an event sensed by the universal remote causes the system write a backup copy of data in the inventory control system.

Another feature of the inventory control system includes implementation of bodily gestures that can be utilized to move through the menu systems. In particular, a user may "swipe" a touch sensitive screen in one direction to go back to the previous screen, or "swipe" the touch sensitive screen in an opposite direction to go to the next screen. Alternatively, it may be possible that the user simply move the hand in one direction or the other to change screens (e.g. a motion similar to waving). Here, the hand movement may be monitored by a camera to record the desired command. Accordingly, virtually any bodily gesture that can be measured by the universal remote can be programmed to operate certain functions of the inventory control system—i.e. the commands are not simply limited to changing screens.

Additionally, the universal remote could include a biometric security system to ensure that unauthorized users are not able to access the inventory control system database. For example, the universal remote may be secured using the technology described in U.S. Patent App. Ser. No. 61/439,685, the contents of which are herein incorporated by reference. Specifically, the user may need to authenticate use of the universal remote with a thumbprint, an iris scan, or through use of facial recognition technology (e.g., Apple iPhoto facial recognition). For maximum security, the user may need to pass all three security means (i.e. thumbprint scan, iris scan and facial recognition scan). Otherwise, access to the universal remote and/or the database will be denied. Additionally, the biometric security system would prevent anyone from accessing the contents of the universal remote or the database. The universal remote could not be unlocked without the owner. If the universal remote had an RFID tag, it could be tracked and retrieved. Unauthorized tampering may cause the universal remote to self-destruct or be rendered useless.

If the remote were stolen, the "forget me not" feature would activate to alert the user that the universal remote has been taken outside the transmission range. In fact, this "forget me not" feature could be utilized with any product stored within the home. That is, any product (one that has not been trashed) carrying an RFID tag or other data transmission device that is taken outside of the range of readers will notify the user that an item has been impermissibly removed. Removal may sound an alarm or generate some other form of notification (e.g. a text message). In this case, readers would need to be disposed within some predefined monitoring range to monitor the location of the products. The products may be more specifically located by the readers through deployment of RFID triangulation, similar to GPS triangulation technology. Preferably, the product longitude, latitude and elevation could be located.

Although several embodiments have been described in detail for purposes of illustration, various modifications may be made to each without departing from the scope and spirit of the invention. Accordingly, the invention is not to be limited, except as by the appended claims.

What is claimed is:

1. An inventory control system process, comprising the steps of:
    storing product information in an electronic database;
    securing a universal remote for use in association with the electronic database with biometric data;
    authenticating a request to access the electronic database through the universal remote with the biometric data;
    accepting location information through the universal remote for storage in the electronic database in association with the product information;
    receiving a command associated with information in the electronic database through the universal remote;
    analyzing the command for an instruction and one or more keywords;
    searching the electronic database for one or more products associated with the one or more keywords; and
    generating a list of products related to the one or more keywords in the command for display on the universal remote, and
    accessing, modifying, retrieving or deleting information in the electronic database in response to the instruction.

2. The process of claim 1, including the step of categorizing the product information and the location information in a hierarchal electronic database.

3. The process of claim 2, wherein the searching step includes simultaneously searching multiple levels of the hierarchal electronic database.

4. The process of claim 1, including the step of reading a barcode or communicating with a data transmission device associated with the product.

5. The process of claim 4, including the step of populating the electronic database with information from the barcode or the data transmission device.

6. The process of claim 1, including the step of assigning the product a sequential number.

7. The process of claim 6, including the step of programming a local barcode or a local data transmission device with the sequential number.

8. The process of claim 1, including the step of communicating information between the electronic database and the universal remote.

9. The process of claim 8, including the step of receiving the command through a microphone integrated into the universal remote.

10. The process of claim 8, wherein the universal remote wirelessly communicates with the electronic database.

11. The process of claim 1, wherein the biometric data comprises a thumbprint, a retina, or a facial feature.

12. The process of claim 11, wherein the authenticating step includes the step of scanning the thumbprint, the retina or the facial feature.

13. The process of claim 1, wherein the location information comprises a physical location and a product location at the physical location.

14. The process of claim 13, including the step of printing a barcode selectively attachable to the physical location or the product location.

15. The process of claim 13, wherein the physical location comprises a GPS coordinate.

16. The process of claim 1, wherein the command comprises a verbal command, a keyboard entry or a touch screen entry.

17. The process of claim 1, including the step of correlating a field number with the product information.

18. The process of claim 1, including the step of customizing a line item field in the electronic database.

19. The process of claim 1, including the step of updating the product quantity after modifying, retrieving or deleting information in the electronic database.

20. The process of claim 1, wherein the generating step includes the step of retrieving a photograph of the product, a photograph of the physical location of the product, a UPC code, or a product description.

* * * * *